United States Patent [19]
Fakhraie-Fard et al.

[11] Patent Number: 5,157,665
[45] Date of Patent: Oct. 20, 1992

[54] INTEGRATED SERVICES DIGITAL NETWORK (ISDN) TEST DEVICE

[76] Inventors: Mostafa Fakhraie-Fard, 6 Mockinbird Ct., Merrimack, N.H. 03054; Richard P. Dumond, 111 Meredith Dr., Tewksbury, Mass. 01876

[21] Appl. No.: 533,895
[22] Filed: Jun. 6, 1990
[51] Int. Cl.$^5$ .............................................. G06F 11/00
[52] U.S. Cl. .................................. 371/20.1; 371/20.5; 371/16.2; 371/15.1; 370/110.1; 370/13
[58] Field of Search .................... 371/20.1, 20.5, 16.2, 371/15.1, 20.6; 370/110.1, 13

[56] References Cited
U.S. PATENT DOCUMENTS

| | | | |
|---|---|---|---|
| 4,138,599 | 2/1979 | Munter | 371/15.1 |
| 4,878,048 | 10/1989 | Gottesman et al. | 340/825.01 |
| 4,910,729 | 3/1990 | Coffelt et al. | 370/17 |
| 4,989,202 | 1/1991 | Soto et al. | 370/13 |
| 4,998,240 | 3/1991 | Williams | 370/17 |
| 5,023,869 | 6/1991 | Grover et al. | 370/84 |
| 5,027,343 | 6/1991 | Chan et al. | 370/17 |

Primary Examiner—Jerry Smith
Assistant Examiner—Ly V. Hua
Attorney, Agent, or Firm—Pandiscio & Pandiscio

[57] ABSTRACT

A portable, hand-held test device which is adapted to be utilized with Integrated Services Digital Network (ISDN) equipment and alternatively connected to either a Terminal Equipment (TE) device or a Network Termination (NT) device, and which is capable of alternatively emulating either a TE device or an NT device during a line activation sequence, whereby (1) when the test device is connected to a TE device and is instructed to emulate an NT device, the test device can determine if the TE device is operating in accordance with ISDN standards, and (2) when the test device is connected to an NT device and is instructed to emulate a TE device, the rest device can determine if the NT device is operating in accordance with ISDN standards. The test device is also adapted to test various lengths of RJ45 cabling within the network to determine whether the RJ45 cabling is functioning properly and, if it is not, to determine certain things about the nature of the malfunction. In addition, the test device is particularly well suited to (1) quickly and easily testing numerous TE devices, or numerous jacks on NT devices, in rapid succession, (2) quickly and easily identifying which one of a plurality of cable ends is connected to a particular TE or NT device, (3) monitoring an ISDN data exchange between a particular TE device and a particular NT device and displaying information regarding the same to the user, and (4) being connected to either a TE or NT device and which is capable of looping back to that device data originating at that device.

8 Claims, 32 Drawing Sheets

Frame Structure at Reference Points S and T (CCITT I.430)

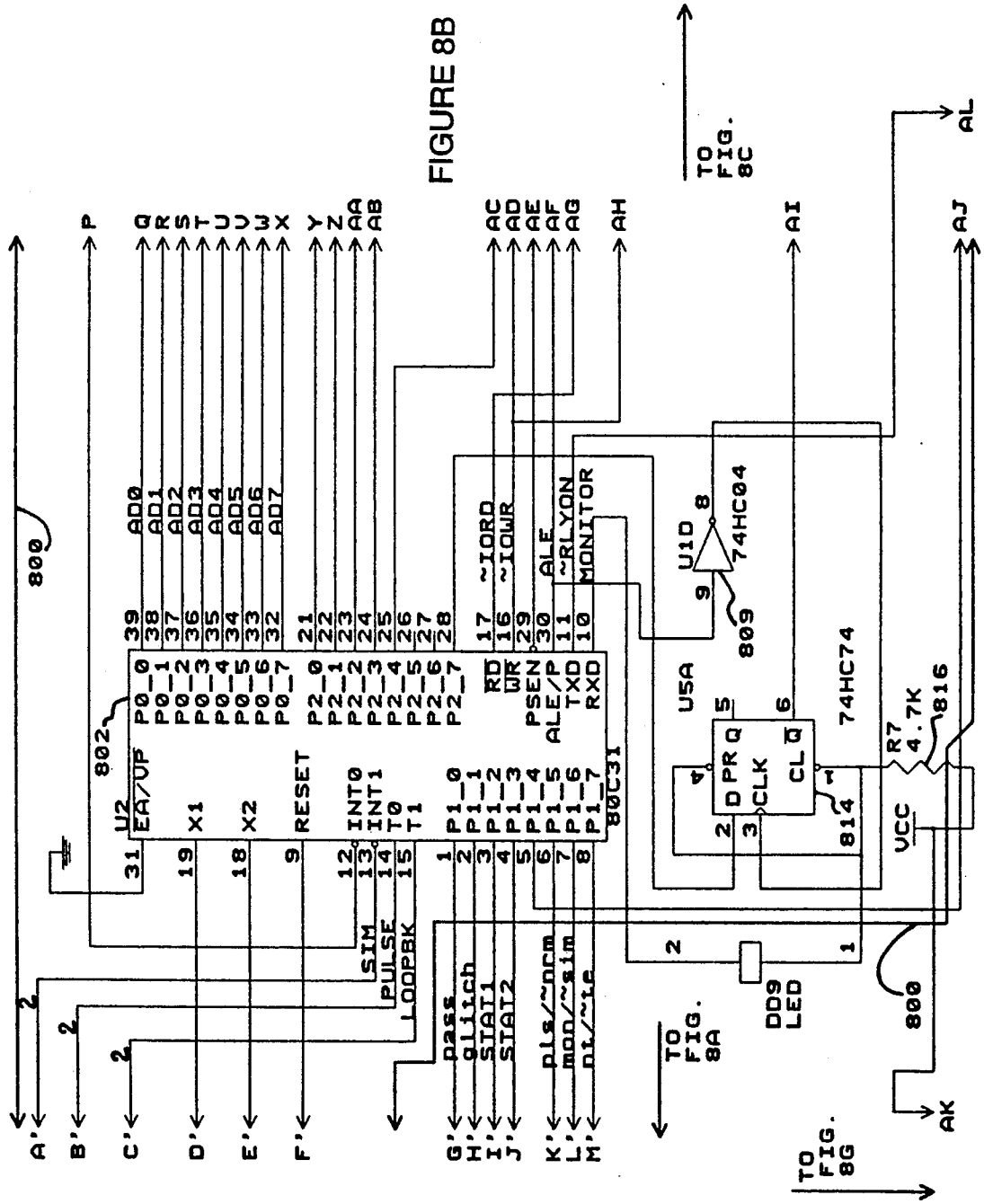

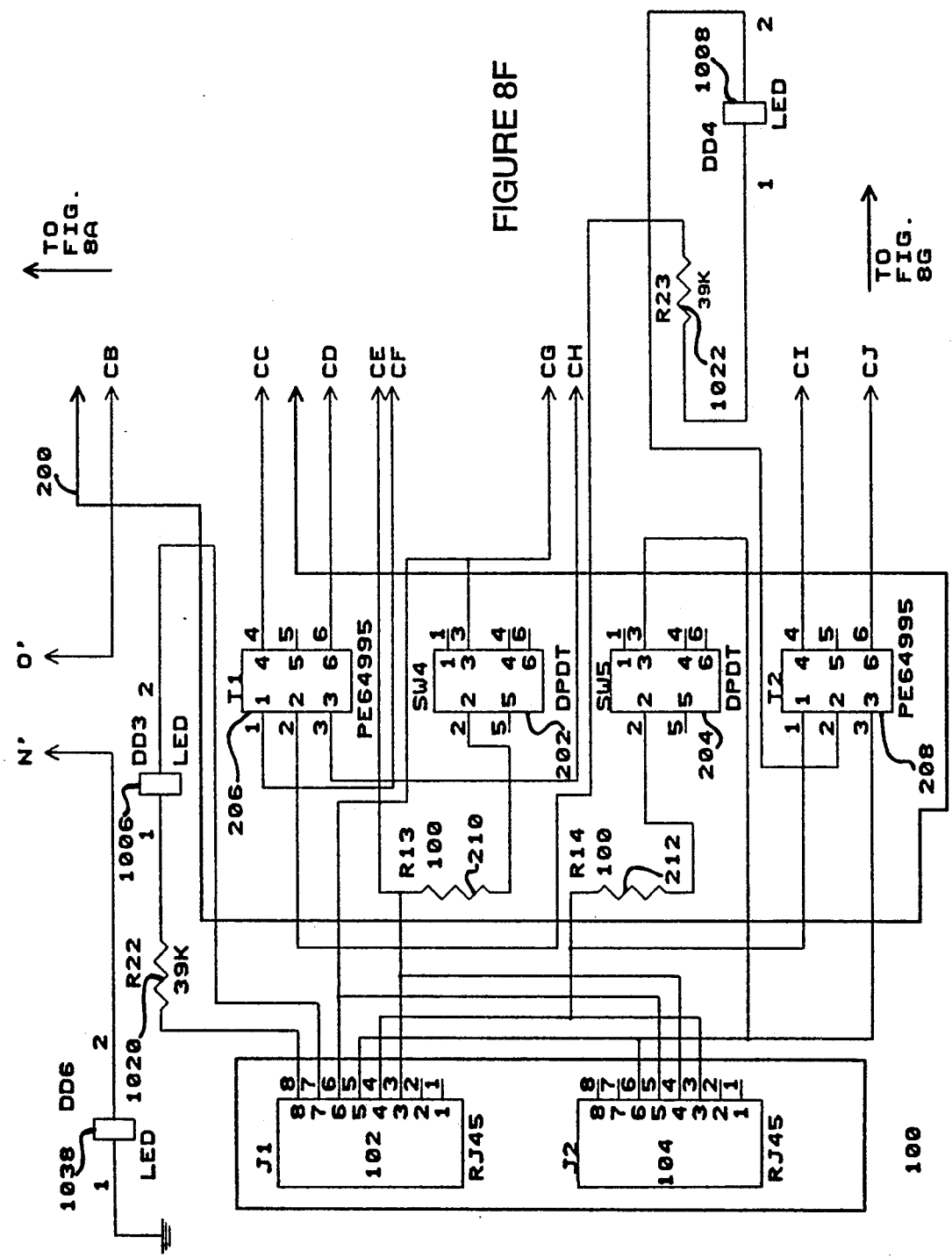

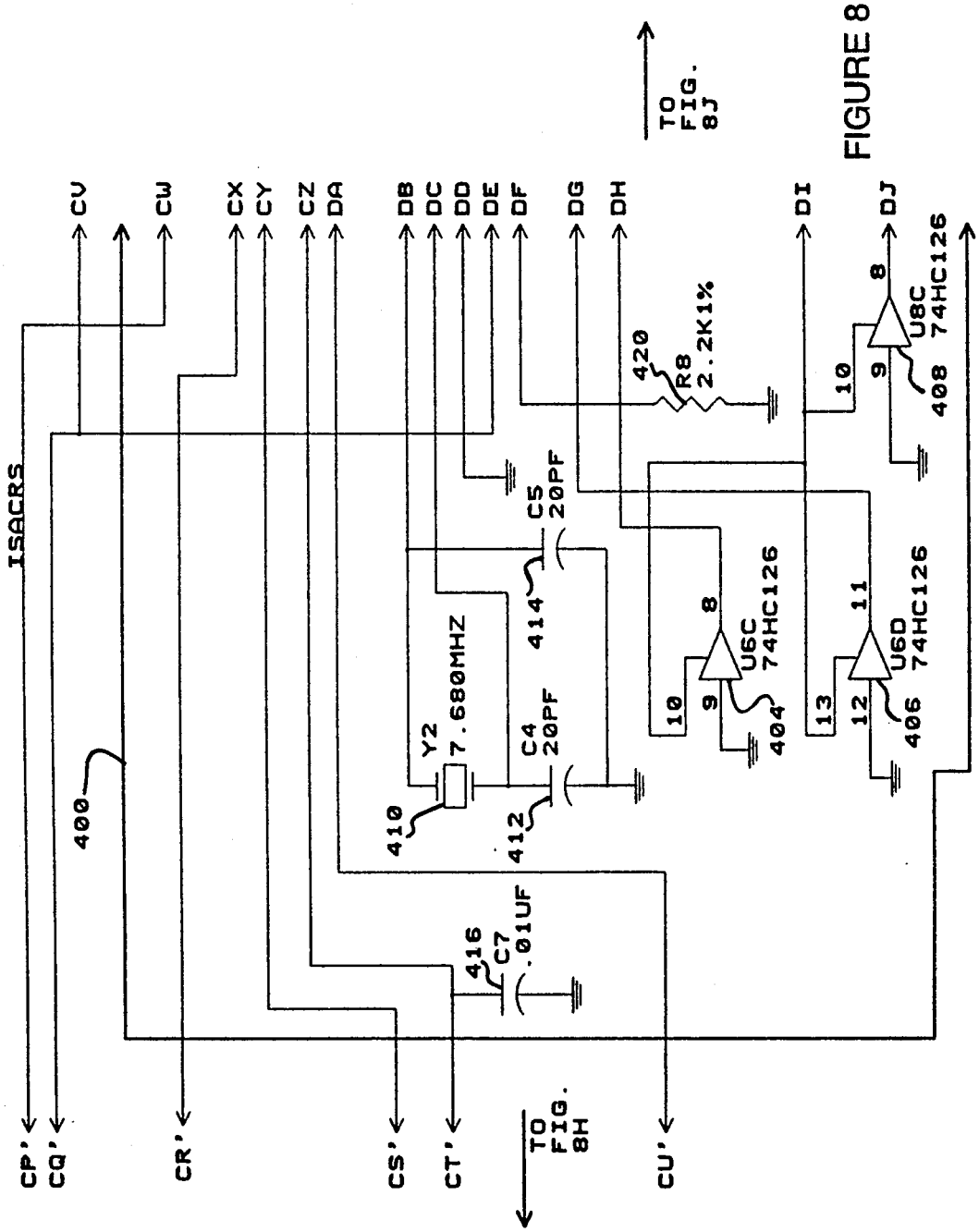

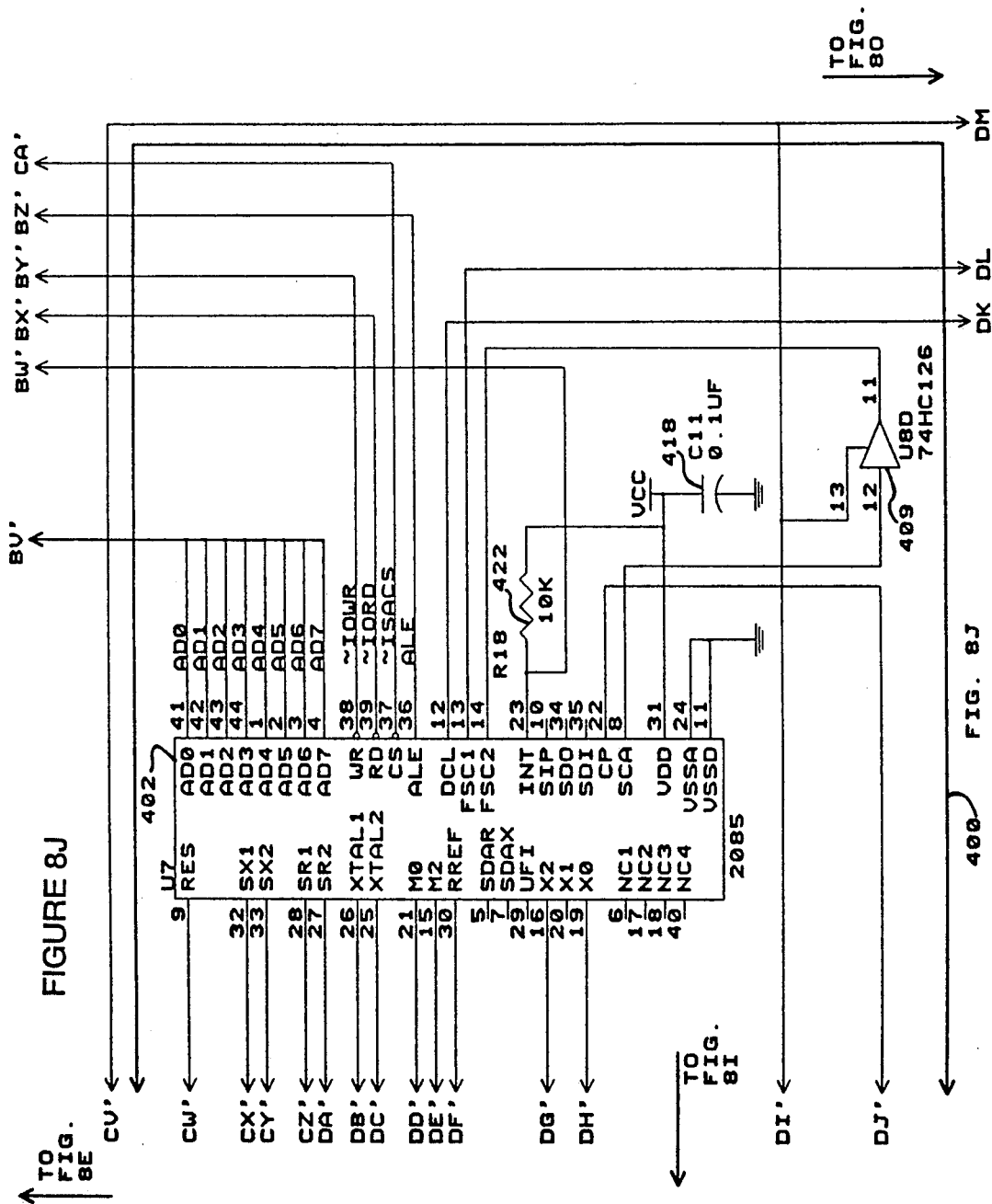

SIMULATION MODE PROCEDURE

MONITOR MODE PROCEDURE

INTEGRATED SERVICES DIGITAL NETWORK (ISDN) TEST DEVICE

FIELD OF THE INVENTION

This invention relates to electronic communication networks in general, and more particularly to devices for testing the same.

BACKGROUND OF THE INVENTION

Much work is currently being done in the area of electronic communication networks.

In one specific area, that of telephone systems, much effort is now being made to convert traditional analog telephone communication systems to the so-called Integrated Services Digital Networks (or "ISDN") standard.

More specifically, in traditional telephone systems, analog-based equipment is used to convert voice data (at an originating source) into a continuously fluctuating signal which is transmitted over a wire to a remote location, where other analog-based equipment is used to convert the continuously fluctuating signal back into voice data for receipt by a receiving party. At one time, substantially all of the equipment in the telephone system constituted analog-based equipment. Later, particularly with the advent of electronic digital switches, it was found that substantial advantages could be obtained by making at least an intermediate portion of the system be digitally-based rather than analog-based. In addition, it has also been found that digitally-based signals (such as those originating in digitally-based computers) can be transmitted more efficiently with fully digital systems than with solely analog, or even hybrid analog/digital, systems. As a result, a new ISDN standard has been established in which all data flows through the network in purely digital form, it being the task of the systems's front-end equipment to convert any non-digital incoming data into purely digital signals before sending it out over the network.

A complex series of protocols governs how the various elements in an ISDN network operate and how they interact with one another.

More particularly, and looking now at FIG. 1, in an ISDN system, the aforementioned front-end equipment at the originating source is typically referred to as a terminal equipment (or "TE") device, and that portion of the network interfacing with the TE device is typically referred to as a network termination (or "NT") device. The interface between the TE device and the NT device is typically referred to as the "S" interface; the interface between the NT device and the remainder of the network is typically referred to as the "U" interface.

A TE device can be any piece of equipment which provides digital data to the network or takes digital data off the network. For example, a TE device might be a telephone, or it might be a computer, or it might be a fax machine. Regardless of the particular function of the TE device, in an ISDN system all TE devices must provide their data to the network (or receive their data from the network) according to ISDN standards.

By way of further explanation, in some cases the TE device may be a native ISDN device, in the sense that it has been preconfigured to output its data to the network (or receive its data from the network) according to the appropriate ISDN standards. In this case such a device may be referred to as a "TE1" device. Examples of a TE1 device might be an ISDN telephone, or an ISDN computer, or an ISDN fax machine. In other cases the TE device may consist of a non-ISDN device (i.e., a "TE2" device) in combination with a terminal adapter device (i.e., a "TA" device). In such a situation, the TA device sits between the TE2 device and the network and converts any data output by the TE2 device into the form required by the ISDN network (or converts any data received from the network into the form required by the TE2 device). The interface between the TE2 device and the TA device is typically referred to as the "R" interface. Examples of a TE2 device might be a fax machine or a modem. The aforementioned NT device comprises the network switch equipment which sits at the end of the ISDN network (typically at the telephone customer's premises) and interacts with the TE device.

By way of further explanation, the NT device could consist of just the network switch device itself (i.e., a "NT1" device), or it could consist of an NT1 device in combination with another device (i.e., an "NT2" device), wherein the NT2 device is interposed between the NT1 device and the TE device. In the case where the NT device consists of an NT1 device in combination with an NT2 device, the interface between the NT1 device and the NT2 device is typically referred to as the "T" interface.

Regardless of whether the NT device consists of simply an NT1 device or an NT1 device in combination with an NT2 device, the NT device always interfaces with the TE device at the S interface and always interfaces with the remainder of the network at the U interface.

The present invention is concerned solely with the S interface.

In addition to the foregoing, the ISDN standard requires that all communications flowing through the network subscribe to a multilayer communications model.

More specifically, and looking now at FIG. 2, all communications flowing through the ISDN network must subscribe to a 3 layer communications model, wherein Layer 1 is the "physical" layer, Layer 2 is the data link layer, Layer 3 is the network layer. It is to be appreciated that the aforementioned 3 layers of the ISDN network themselves comprise the lowest three layers of a broader 7 layer ISO communications model, wherein Layers 1-3 comprise the three layers of the ISDN standard, Layer 4 is the transport layer, Layer 5 is the session layer, Layer 6 is the presentation layer, and Layer 7 is the application layer.

The present invention is concerned solely with Layer 1, i.e., the so-called "physical" layer.

In a hardware sense, and looking now at FIG. 3, the TE device is connected to the NT device by means of RJ45 cabling.

More specifically, the RJ45 cabling consists of four pairs of twisted wires, i.e., wire Pair A, wire Pair B, wire Pair C, and wire Pair D, with Pair A being connected to Pins 1 and 2 of the RJ45 jack, Pair B being connected to Pins 3 and 6 of the RJ45 jack, Pair C being connected to Pins 4 and 5 of the RJ45 jack, and Pair D being connected to Pins 7 and 8 of the RJ45 jack. Currently, under the ISDN standard, Pair A (i.e., Pins 1 and 2) are not used, Pair B (i.e., Pins 3 and 6) are used for the transmission of data, Pair C (i.e., Pins 4 and 5) are used for the reception of data (and, optionally, to supply power to the TE device, if desired), and Pair D (i.e., Pins 7 and 8) are used for "phantom" power (i.e, to allow the ISDN network to supply power to the TE device, if desired).

It is to be appreciated that a typical TE device generally comprises at least one RJ45 jack to permit the TE device to be connected to an associated NT device, and a typical NT device generally comprises numerous RJ45 jacks to permit the NT device to be connected to multiple TE devices.

It is also to be appreciated that, in accordance with ISDN standards, the information being transmitted across the S interface consists of discrete bundles (or "frames") of digital data.

More specifically, and as seen FIG. 4, each frame of data crossing the "S" interface consists of 48 bits of digital information, transmitted at a nominal bit rate of 192 kbps (kilobits per second). Various portions of each frame relate to signaling information used to coordinate the interaction of the TE and NT devices on the ISDN network, while other portions of each frame carry the actual data being transmitted over the network.

Due to the nature of the ISDN network, it is imperative that (1) the network's RJ45 cabling be installed consistently with ISDN standards, (2) the TE and NT devices be coupled correctly to the RJ45 cabling, and (3) the TE and NT devices operate consistently with ISDN standards.

When a particular TE device is brought on-line in an ISDN network, a preliminary handshaking routine is conducted between that TE device and its associated NT device to ensure that all of the foregoing is in proper working condition and that the TE device is ready to access, or to be accessed by, the network.

More particularly, and as seen in FIG. 5, the TE and NT devices exchange a series of signals with one another, in interlocking fashion, as the devices make the necessary preliminary handshake. This is done in the following manner. The NT device first sends an INFO 0 signal to the TE device. When the TE device successfully receives this INFO 0 signal, it responds by sending an INFO 1 signal back to the NT device. When the NT device successfully receives this INFO 1 signal, it responds by sending an INFO 2 signal back to the TE device. When the TE device successfully receives this INFO 2 signal, it responds by sending an INFO 3 signal back to the NT device. When the NT device successfully receives this INFO 3 signal, it responds by sending an INFO 4 signal back to the TE device. If the TE and NT devices successfully pass through the foregoing handshaking procedure, the TE device is properly synchronized with the NT device and "line activation" has been achieved. The TE device may then access, or be accessed by, the network. In the event that the TE and NT devices are not able to successfully pass through the foregoing handshaking procedure, no activation takes place and the TE device is not able to access, or be accessed by, the network.

OBJECTS AND SUMMARY OF THE PRESENT INVENTION

Accordingly, one object of the present invention is to provide a test device which is capable of determining if the RJ45 cabling of an ISDN network is installed consistently with ISDN standards.

Another object of the present invention is to provide a test device which is capable of determining if a particular TE device is coupled correctly to the RJ45 cabling of an ISDN network.

Still another object of the present invention is to provide a test device which is capable of determining if a particular NT device is coupled correctly to the RJ45 cabling of an ISDN network.

Yet another object of the present invention is to provide a test device which is capable of determining if a particular TE device on the ISDN network is operating consistently with the ISDN network standards.

And another object of the present invention is to provide a test device which is capable of determining if a particular NT device on the ISDN network is operating consistently with the ISDN network standards.

Still another object of the present invention is to provide a test device which is low in cost, reliable in operation, and small and portable.

Yet another object of the present invention is to provide a test device which is capable of quickly and easily testing numerous TE devices on the ISDN network in rapid succession.

And another object of the present invention is to provide a test device which is capable of quickly and easily testing the numerous jacks on an NT device on the ISDN network in rapid succession.

Still another object of the present invention is to provide a test device which is capable of determining if the cabling of an ISDN network is functioning properly and, if it is not, to determine certain things about the nature of the malfunction in the cable.

And another object of the present invention is to provide a test device which is capable of quickly and easily identifying which one of a plurality of cable ends is connected to a particular TE or NT device.

Yet another object of the present invention is to provide a test device which is capable of repeatedly, automatically testing activation of a particular TE or NT device suspected of intermittent malfunction and reporting the existence of such malfunction.

And still another object of the present invention is to provide a test device which is capable of monitoring an ISDN data exchange between a particular TE device and a particular NT device and displaying information regarding the same to the user. An yet another object of the present invention is to provide a test device which is capable of being connected to either a TE or NT device and which is capable of looping back to that device data originating at that device.

These and other objects are addressed by the present invention, which comprises a portable, hand-held test device which is adapted to be alternatively connected to either a TE device or an NT device, and which is capable of alternatively emulating either a TE device or an NT device during the aforementioned activation sequence, whereby (1) when the test device is connected to a TE device and is instructed to emulate an NT device, the test device can determine if the TE device is operating in accordance with ISDN standards, and (2) when the test device is connected to an NT device and is instructed to emulate a TE device, the test device can determine if the NT device is operating in accordance with ISDN standards. The test device is also adapted to test various lengths of RJ45 cabling within the network to determine whether the RJ45 cabling is functioning properly and, if it is not, to determine certain things about the nature of the malfunction. In addition, the test device is particularly well suited to (1) quickly and easily testing numerous TE devices, or numerous jacks on NT devices, in rapid succession, (2) quickly and easily identifying which one of a plurality of cable ends is connected to a particular TE or NT device, (3) monitoring an ISDN data exchange between a particular TE device and a particular NT device and displaying information regarding the same to the user, and (4) being connected to either a TE or NT device and which is capable of looping back to that device data originating at that device.

BRIEF DESCRIPTION OF THE DRAWINGS

Still other objects and features of the present invention will be more fully disclosed or rendered obvious by the following detailed description of the invention, which is to be considered together with the accompanying drawings wherein.

Appendix A provides a source code listing of software which can be used to operate the test device.

DETAILED DESCRIPTION OF THE INVENTION

Figure 6:
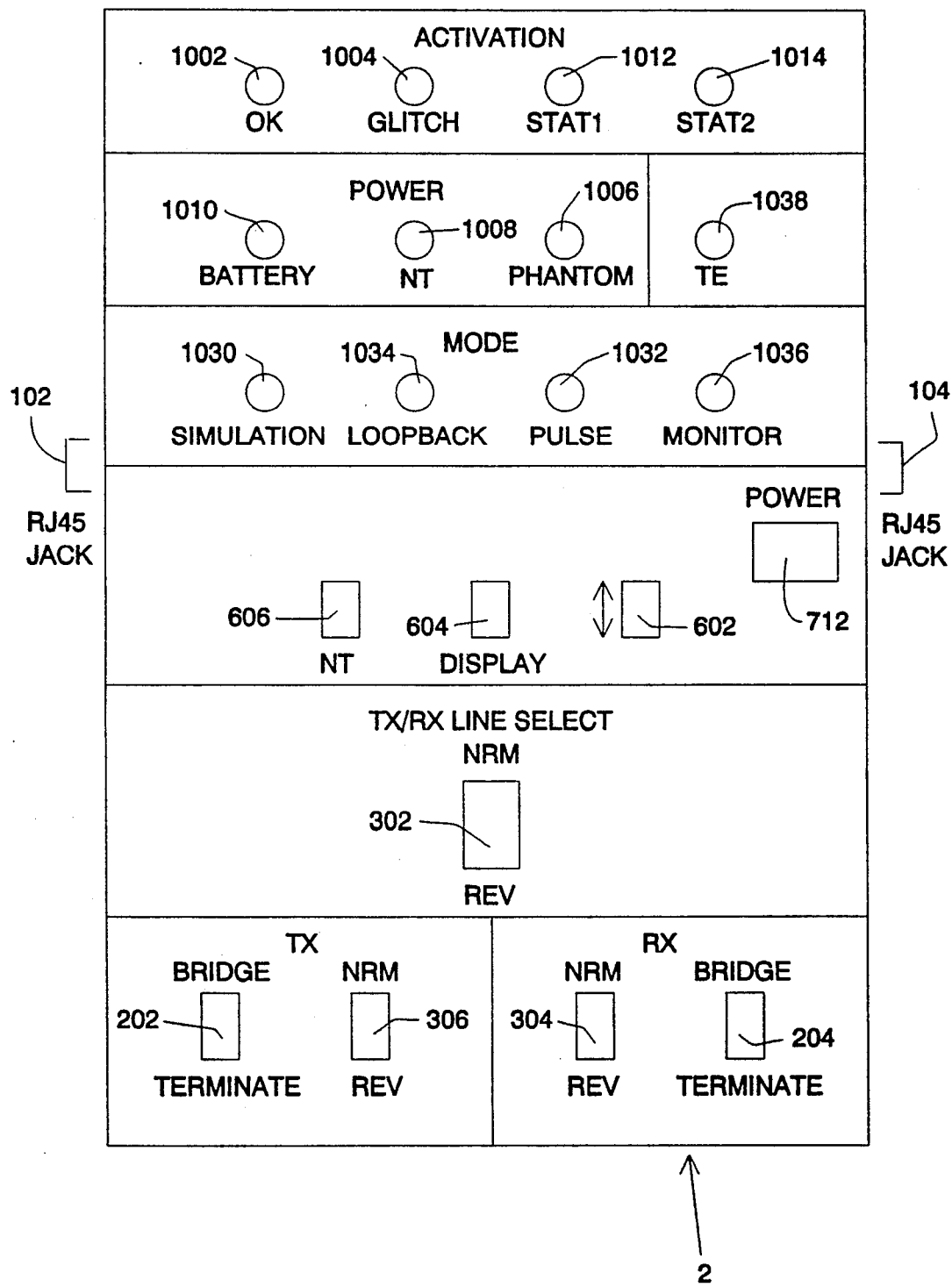
FIG. 6 is a schematic representation of a front panel of a test device made in accordance with the present invention.
Figure 7:
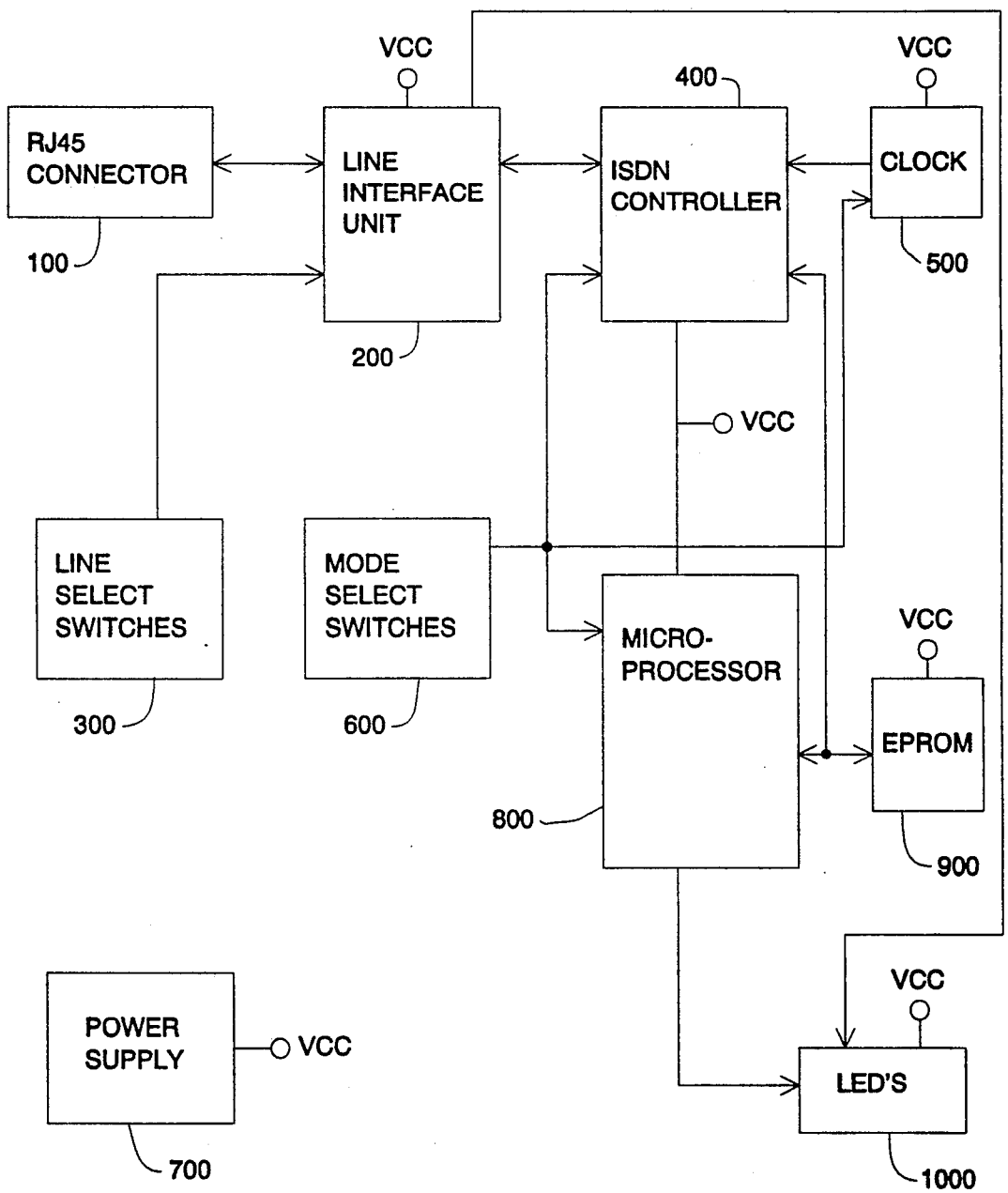
FIG. 7 is a schematic representation, on the subassembly level, of a test device made in accordance with the present invention.
Figure 8A:
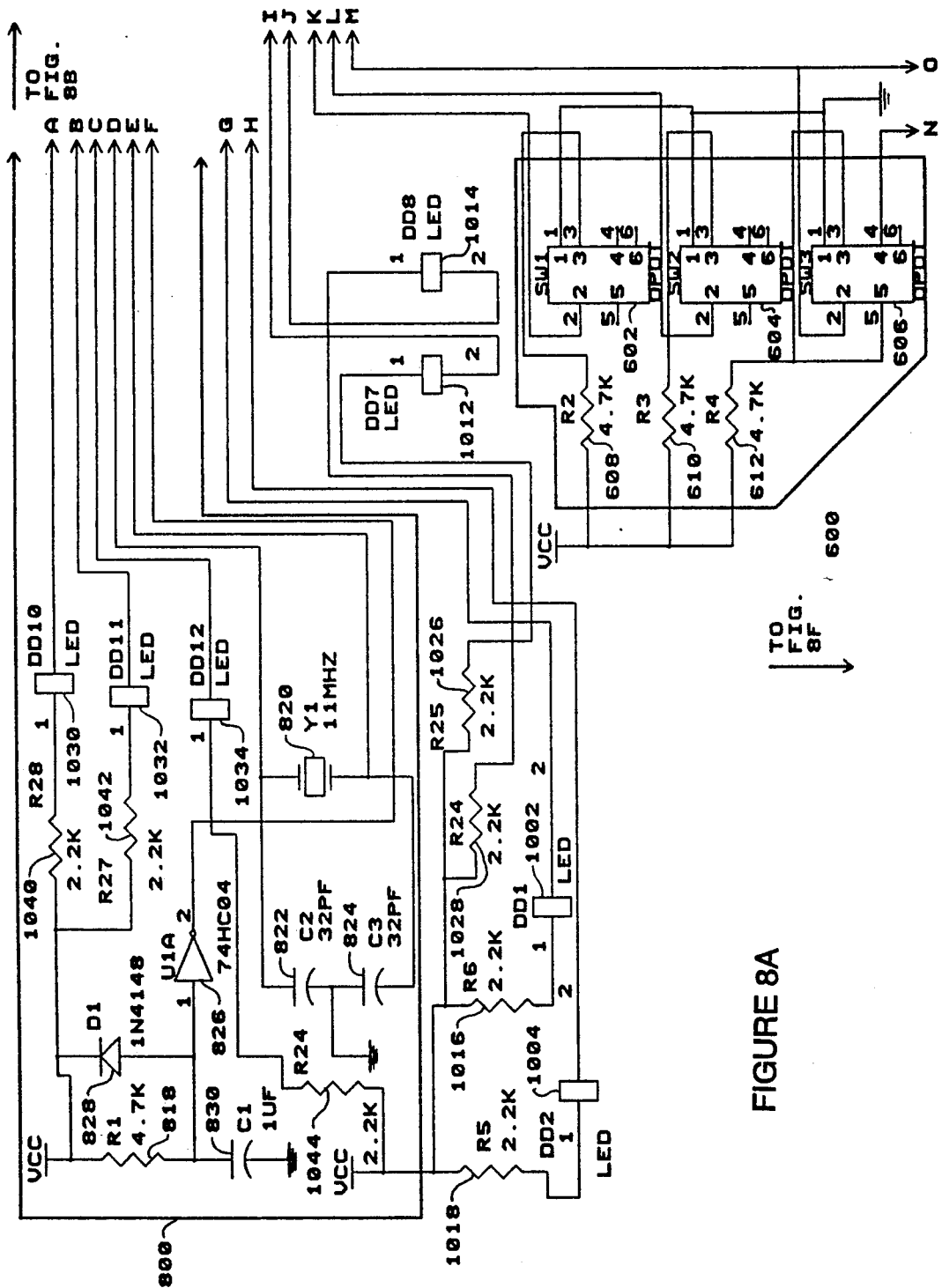
FIG. 8 is a schematic representation, on the circuit element level, of a test device made in accordance with the present invention, with FIG. 8, for convenience, being subdivided down into two views FIG. 8A and FIG. 8B, with corresponding lines in FIGS. 8A and 8B being identified as A and A', B and B', C and C', etc.
Figure 8C:
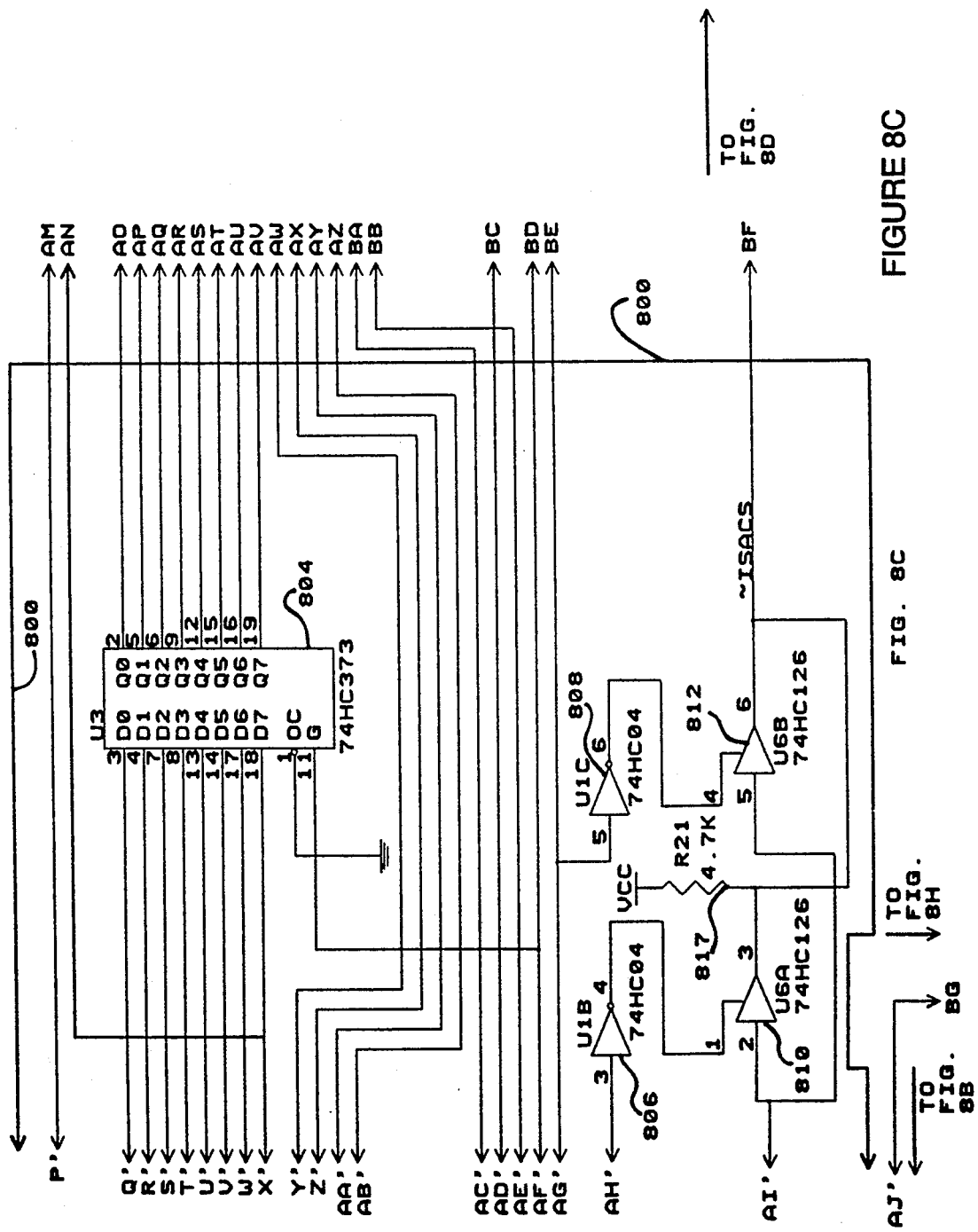
Figure 8D:
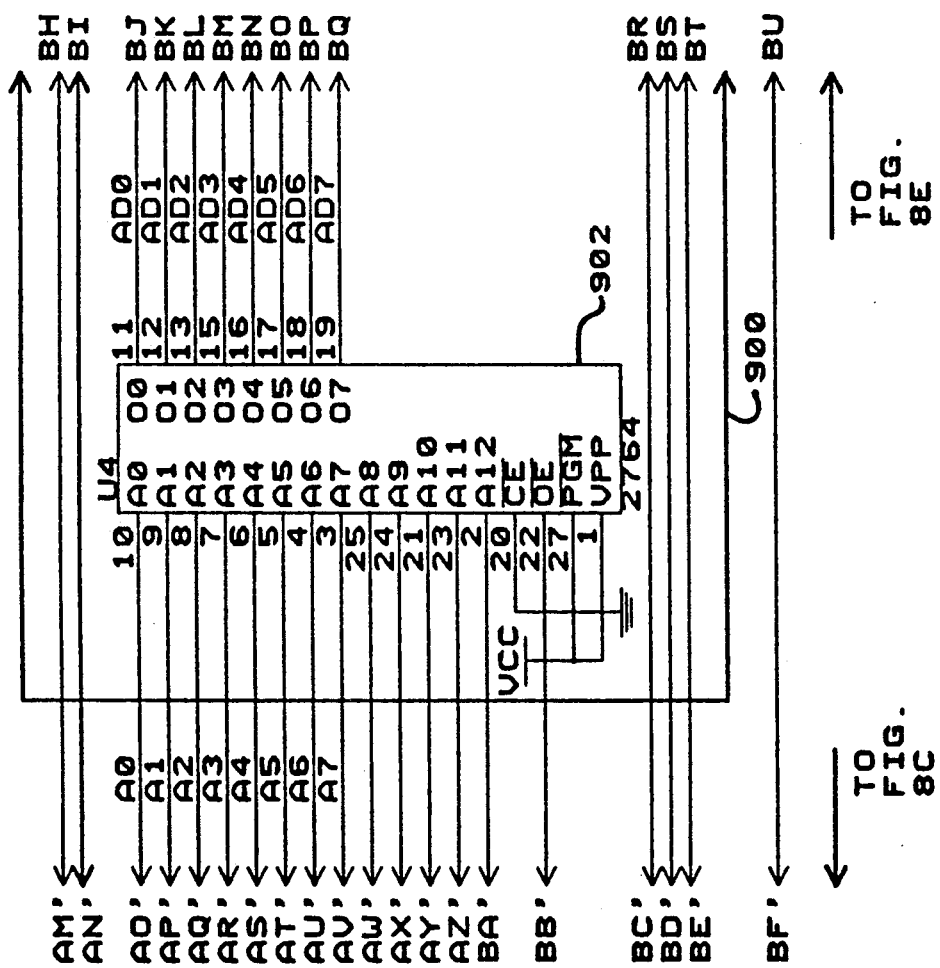
Figure 8E:
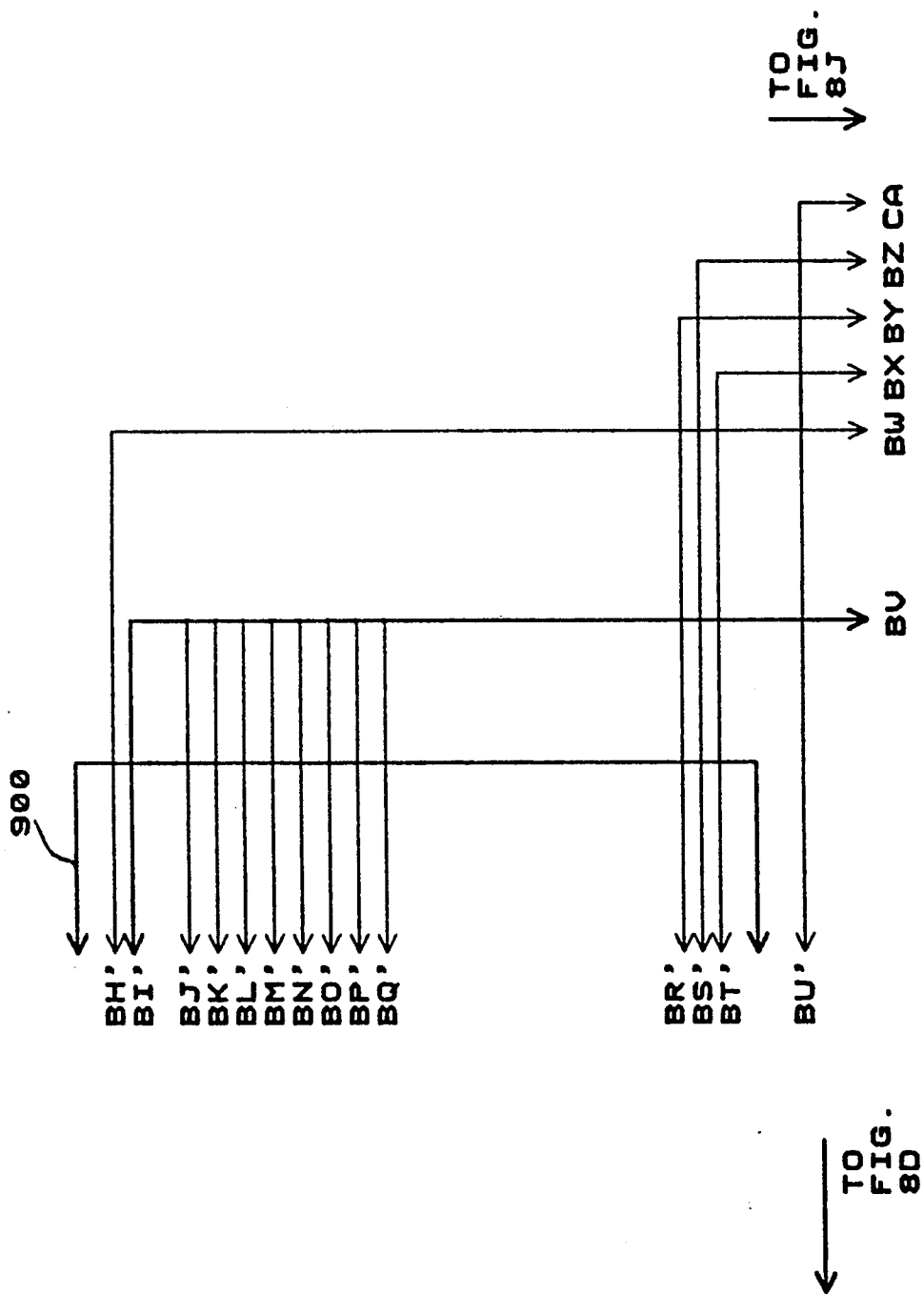
Figure 8G:
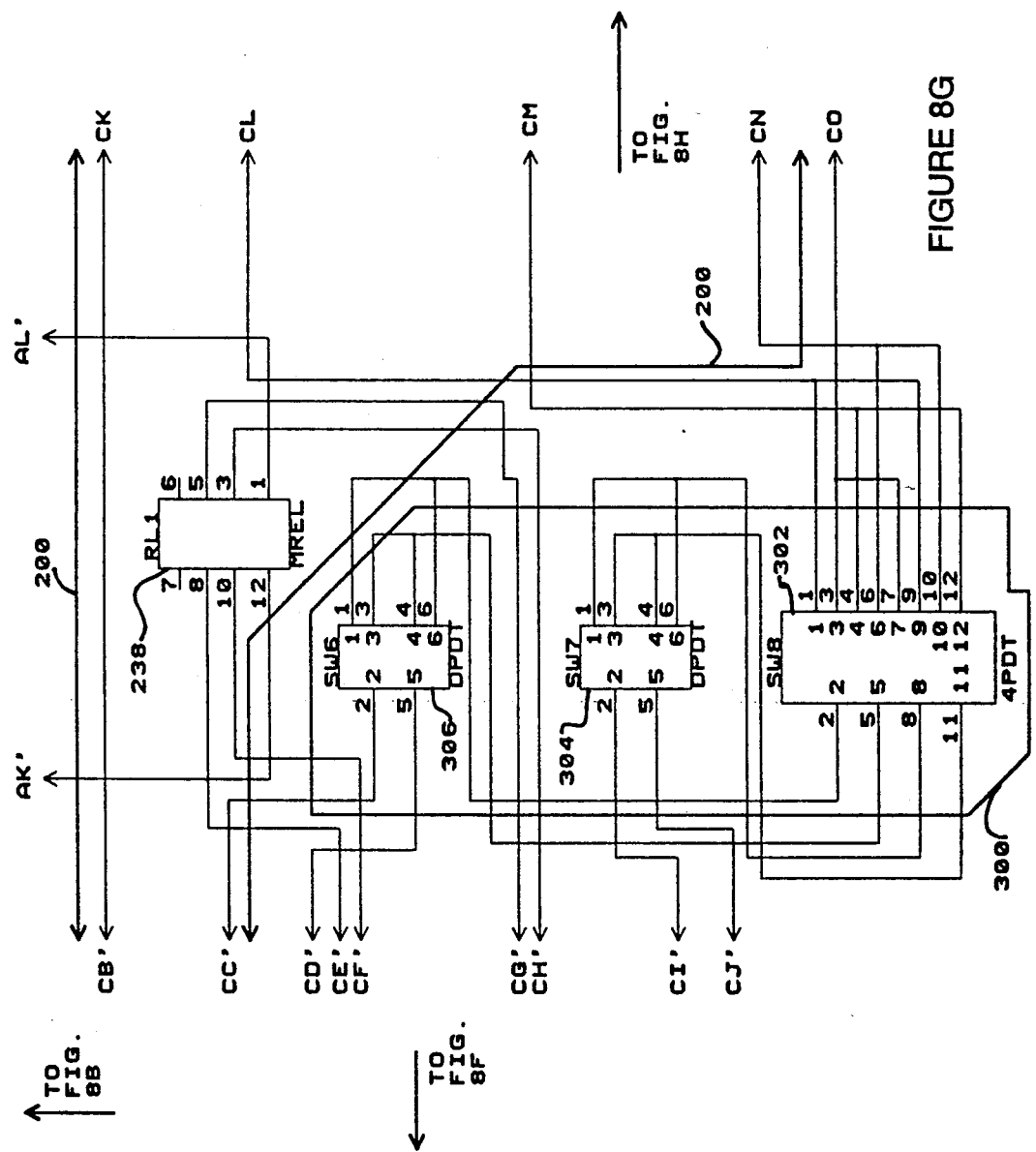
Figure 8H:
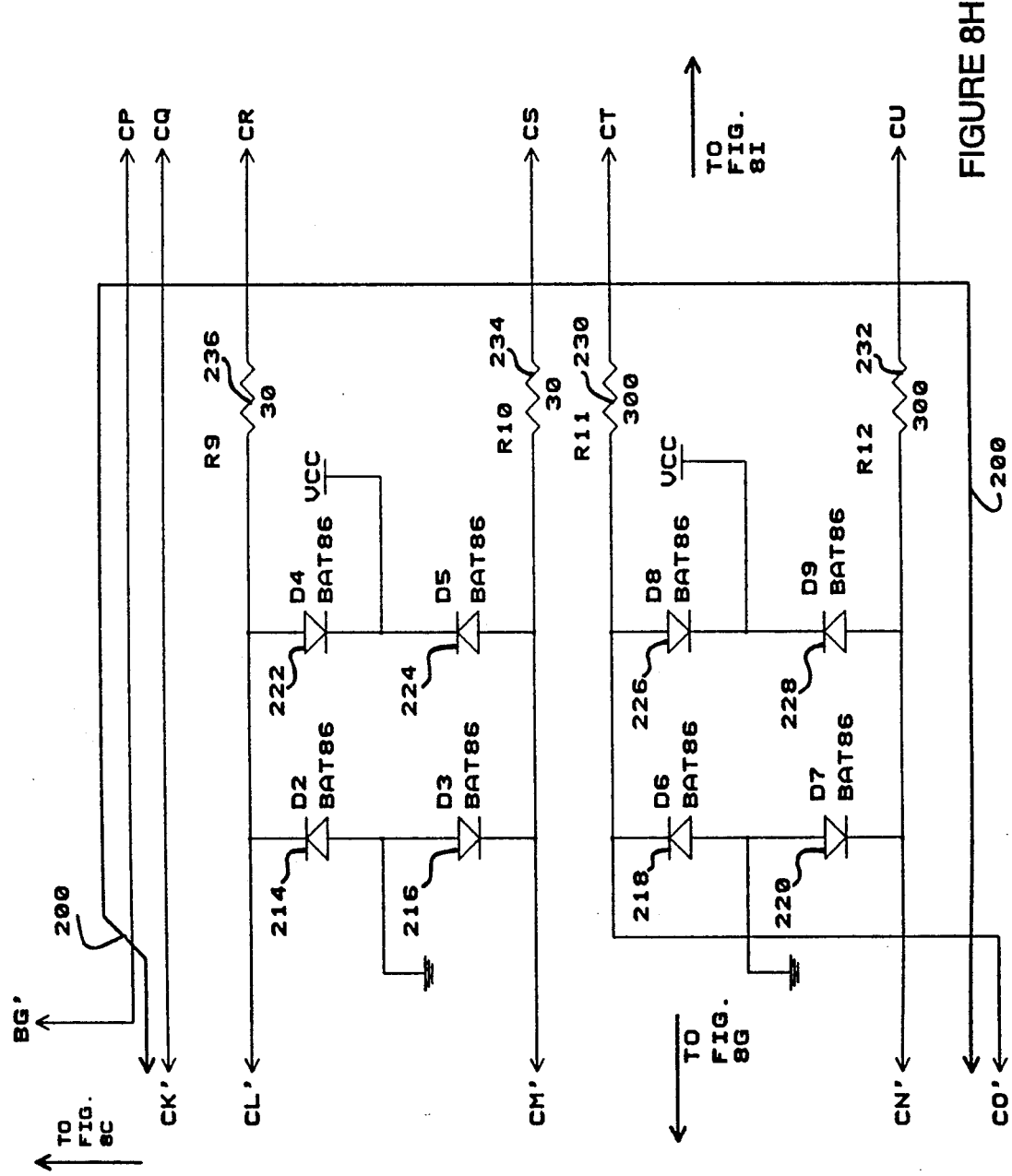
Figure 8K:
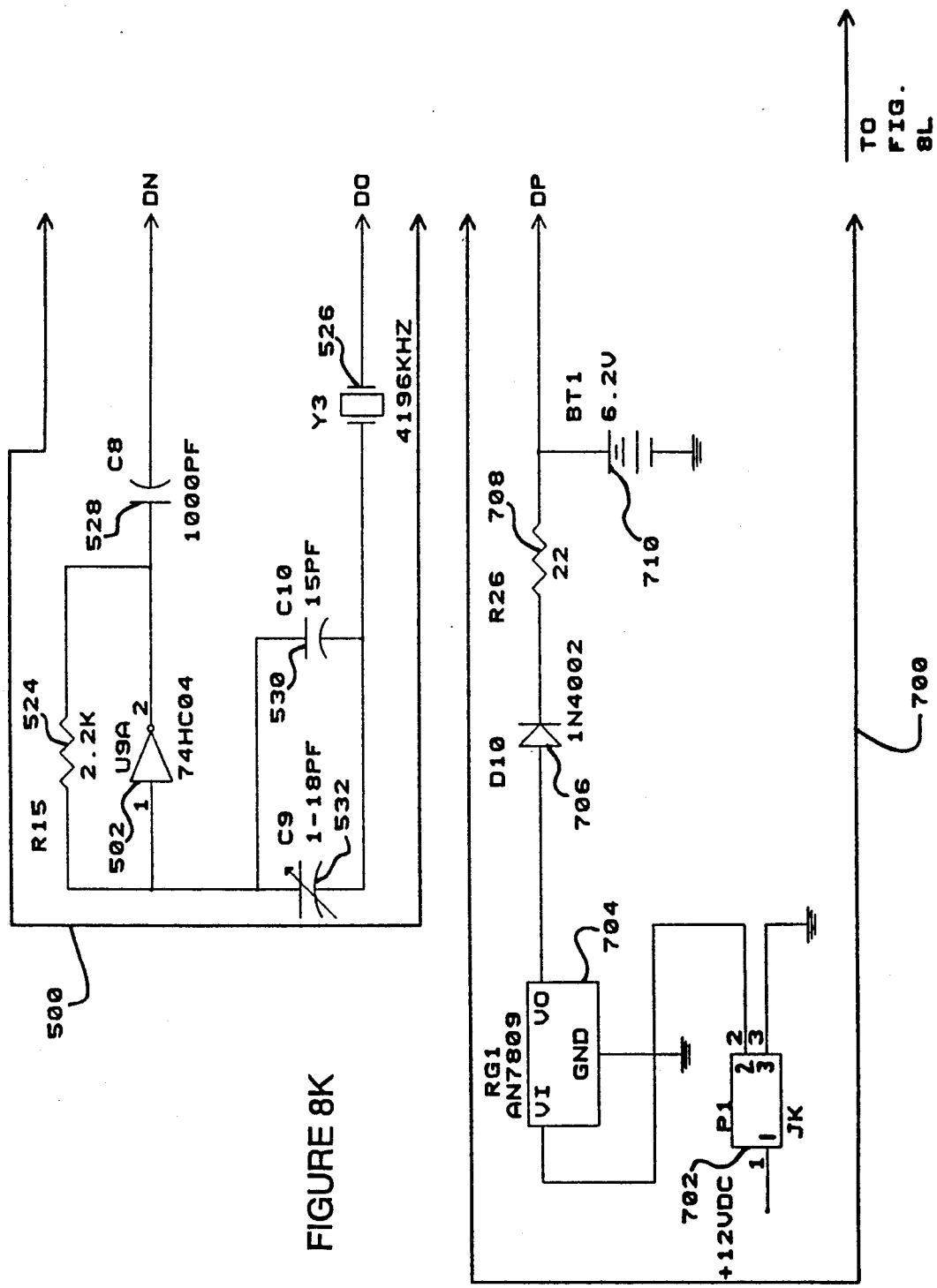
Figure 8L:
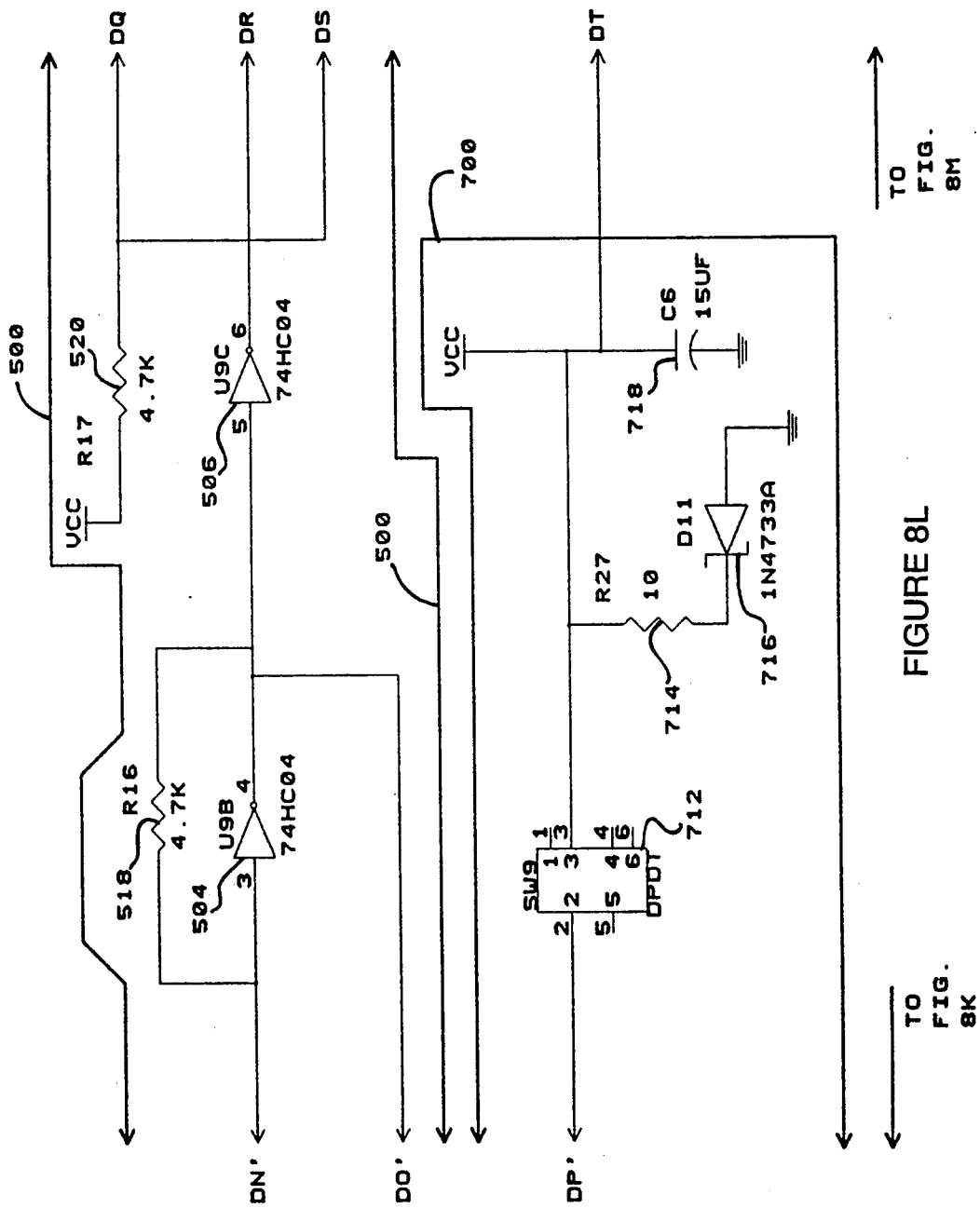
Figure 8M:
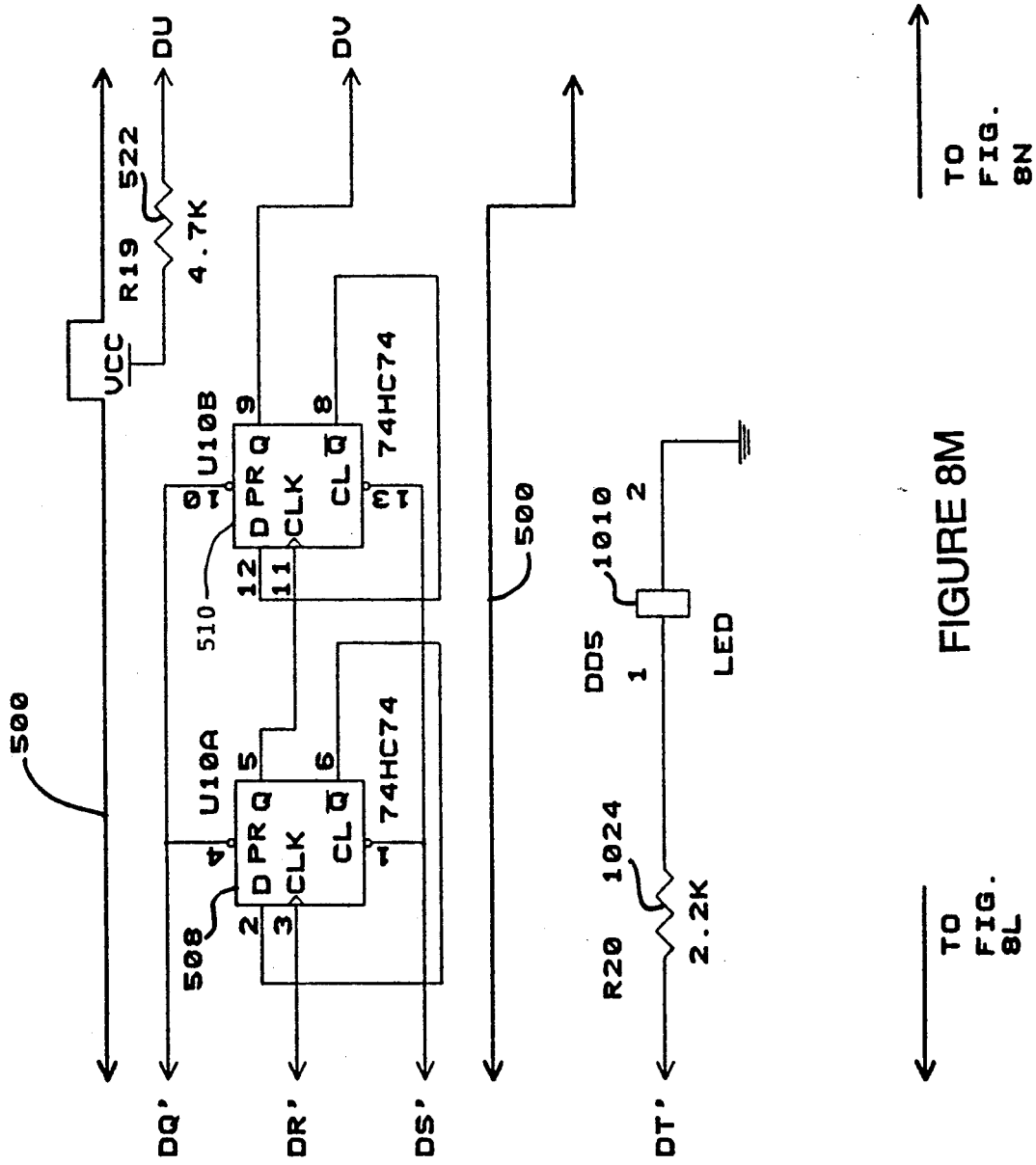
Figure 8N:
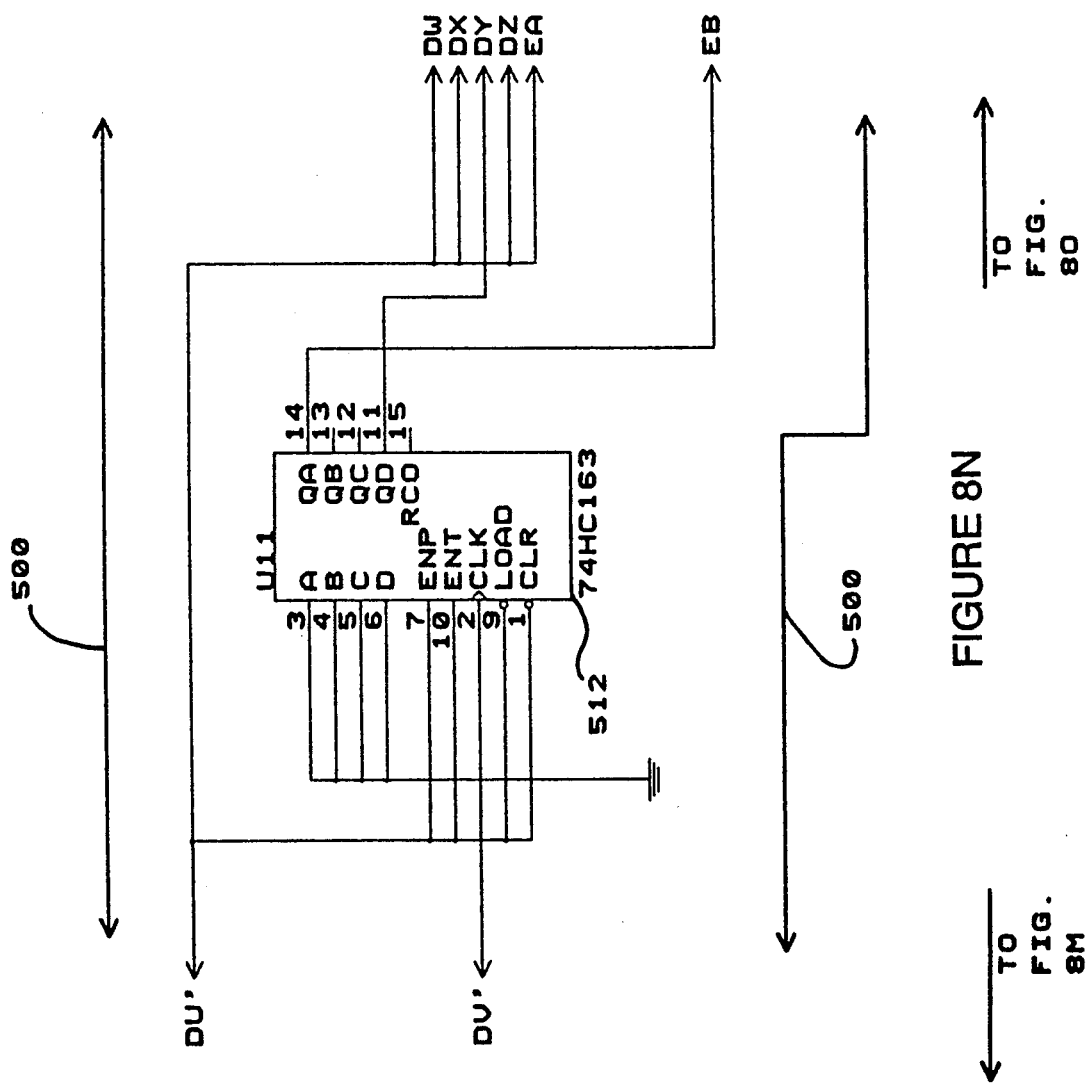
Figure 8O:
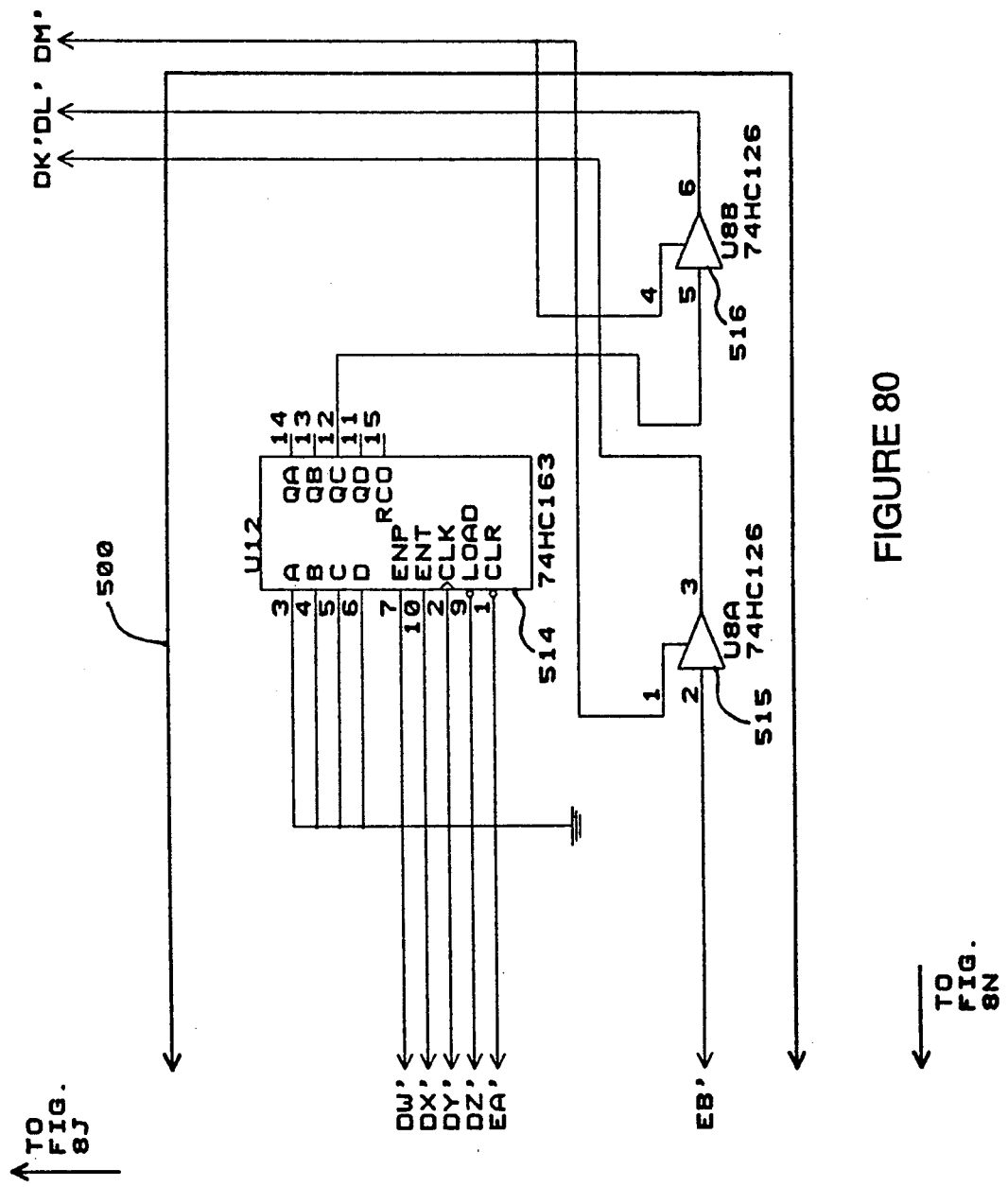

Looking next at FIGS. 6-8, there is shown a test device 2 formed in accordance with the present invention. Test device 2 generally comprises an RJ45 jack subassembly 100, a line interface unit subassembly 200, a line select switches subassembly 300, an ISDN controller subassembly 400, a clock subassembly 500, a mode select switches subassembly 600, a power supply subassembly 700, a microprocessor subassembly 800, an EPROM subassembly 900, and an LED subassembly 1000.

In somewhat more detail, RJ45 jack subassembly 100 comprises an RJ45 connector 102 and an RJ45 connector 104.

Line interface unit subassembly 200 comprises a pair of switches 202 and 204, a pair of transformers 206 and 208, a pair of resistors 210 and 212, eight diodes 214, 216, 218, 220, 222, 224, 226 and 228, a pair of resistors 230 and 232, another pair of resistors 234 and 236 and a relay 238.

Line select switches subassembly 300 comprises a switch 302, and a pair of switches 304 and 306.

ISDN controller subassembly 400 comprises an ISDN controller 402, four buffers 404, 406, 408 and 409, a crystal 410, a pair of capacitors 412 and 414, a capacitor 416, a capacitor 418, a resistor 420, and a resistor 422.

Clock subassembly 500 comprises three inverters 502, 504 and 506, a pair of flip-flops 508 and 510, a pair of counters 512 and 514, a pair of buffers 515 and 516, three resistors 518, 520 and 522, another resistor 524, a crystal 526, a capacitor 528, a capacitor 530, and a variable capacitor 532.

Mode select switches subassembly 600 comprises three switches 602, 604 and 606, and three resistors 608, 610 and 612.

Power supply subassembly 700 comprises a transformer input jack 702, a voltage regulator 704, a diode 706, a resistor 708, a battery 710, a switch 712, a resistor 714, a Zener diode 716, and a capacitor 718.

Microcontroller subassembly 800 comprises a microprocessor 802, a latch device 804, three signal inverters 806, 808 and 809, a pair of buffers 810 and 812, a flip-flop 814, three resistors 816, 817 and 818, a crystal 820, a pair of capacitors 822 and 824, another signal inverter 826, a diode 828, and a capacitor 830.

EPROM subassembly 900 comprises an EPROM 902.

LED subassembly 1000 comprises twelve LEDs 1002, 1004, 1006, 1008, 1010, 1012, 1014, 1030, 1032, 1034, 1036 and 1038, and eleven resistors 1016, 1018, 1020, 1022, 1024, 1026, 1028, 1040, 1042, 1044 and 1046.

Figure 1:
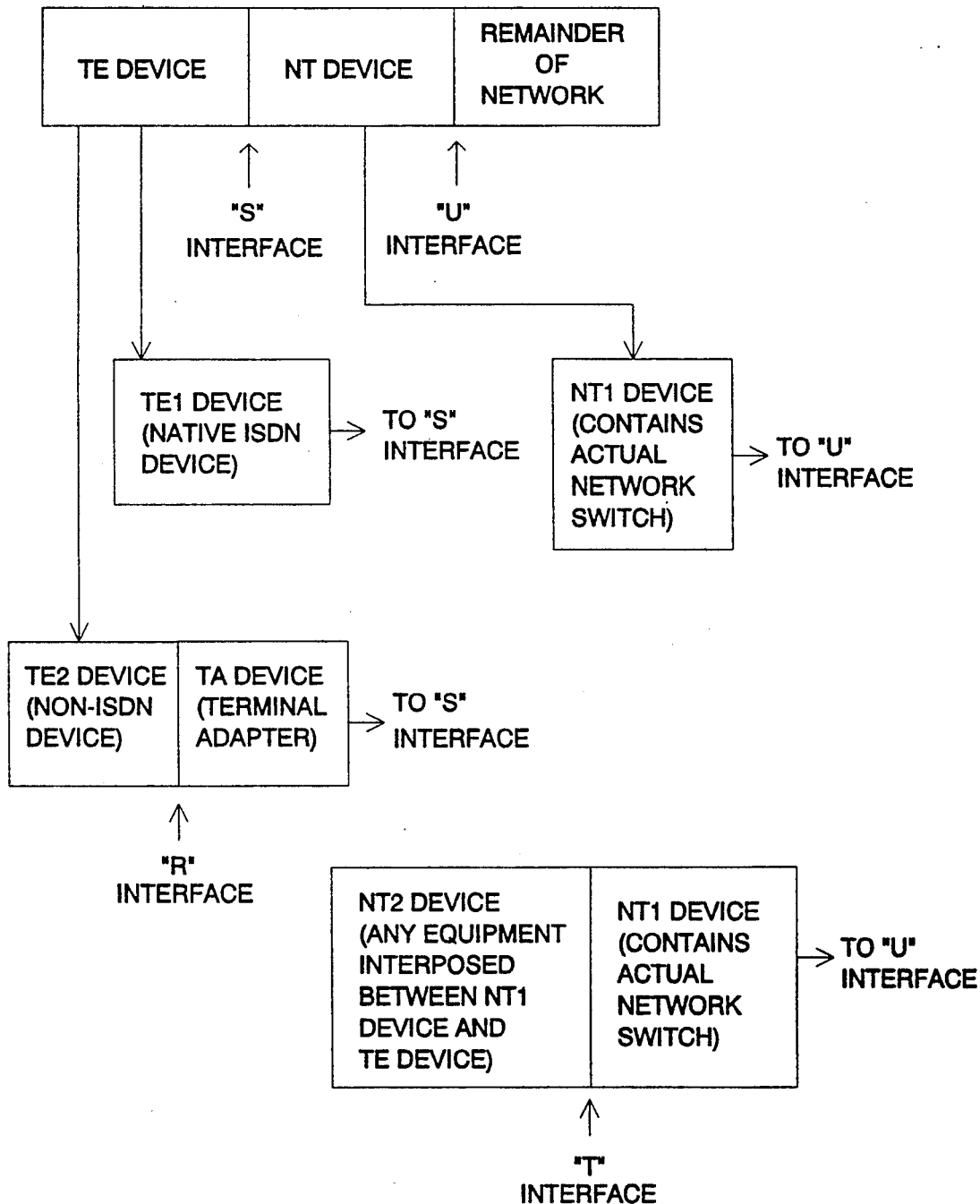
FIG. 1 is a schematic representation of various TE and NT configurations which may occur within an ISDN network.
Figure 2:
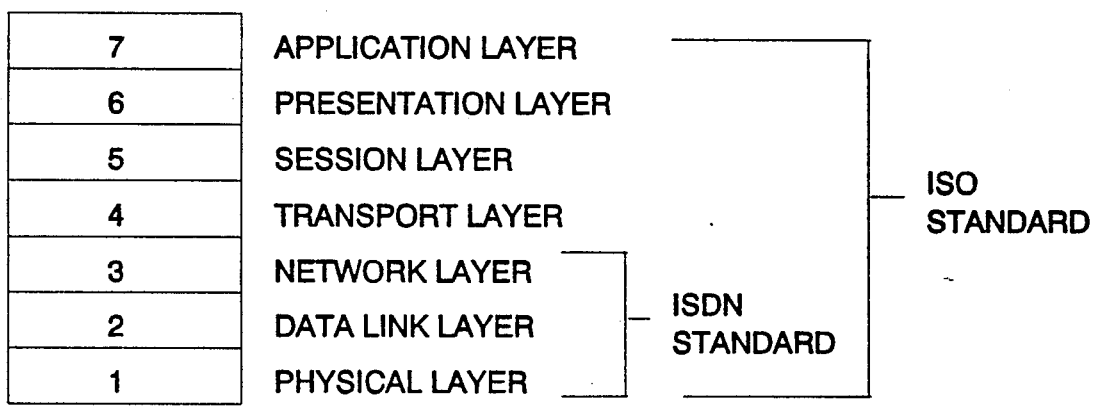
FIG. 2 is a schematic representation of the 7 layer communications model employed by an ISDN network.
Figure 3:
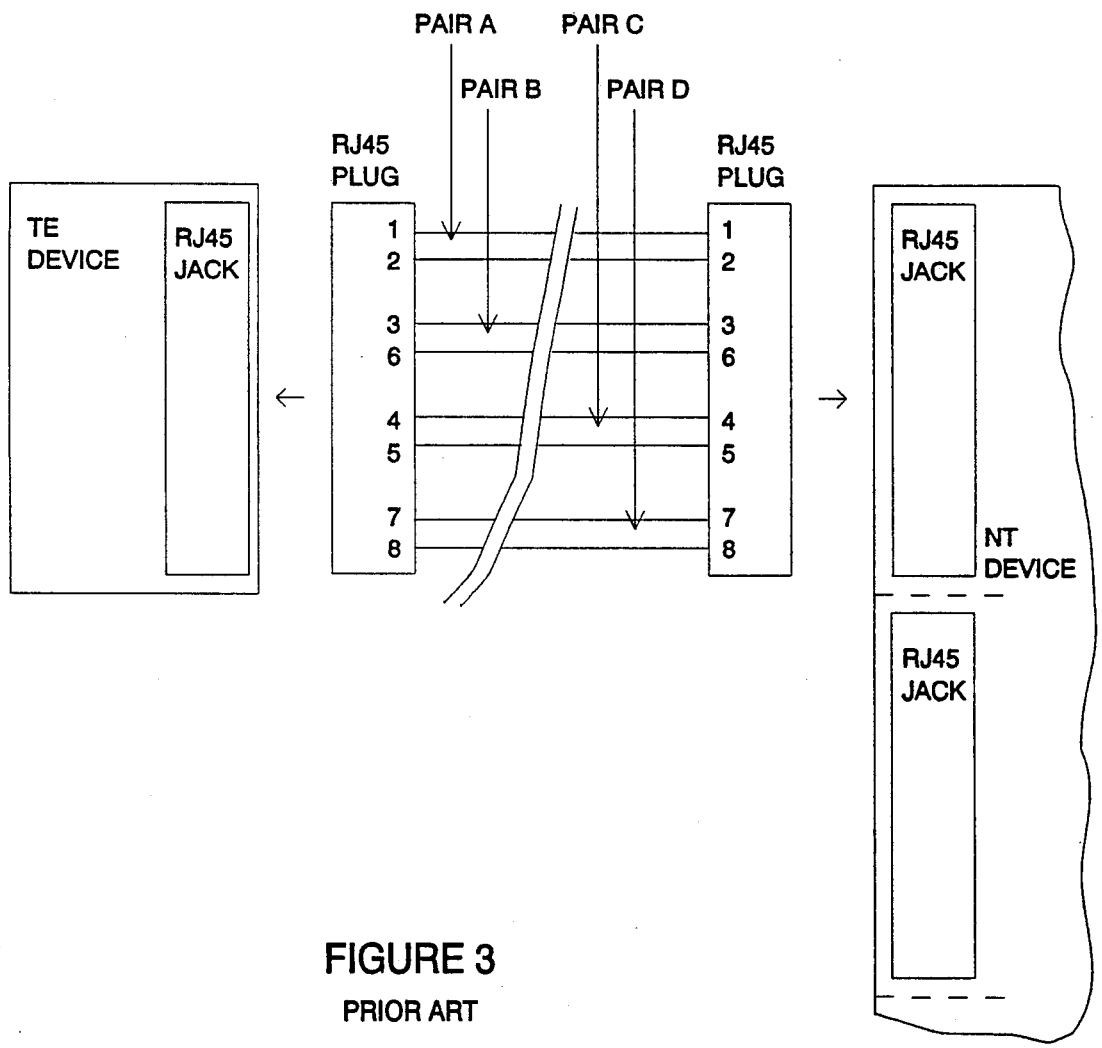
FIG. 3 is a schematic representation of the cable connections linking typical TE and NT devices on an ISDN network.
Figure 4:
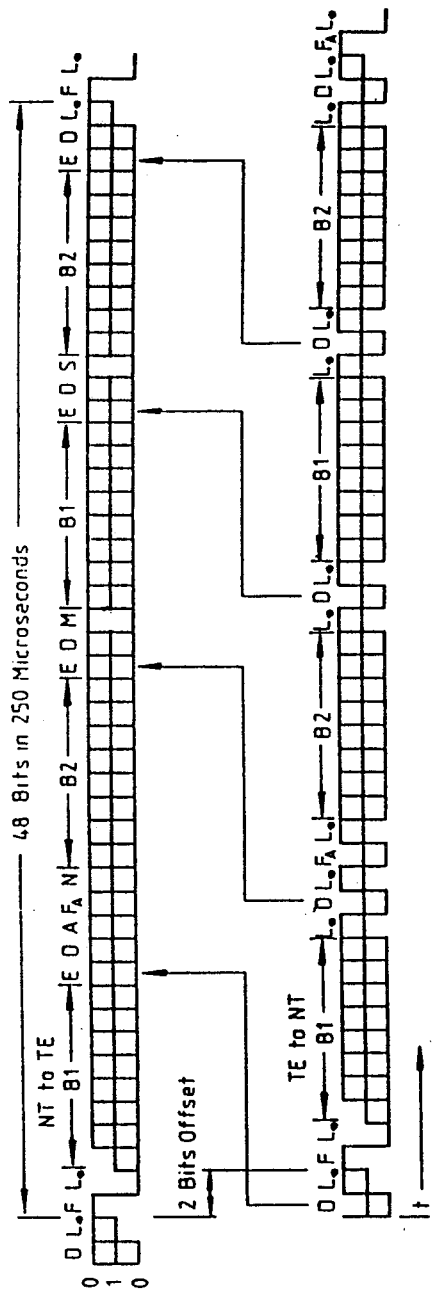
FIG. 4 is a schematic representation of the digital data "frames" which move through an ISDN network.
Figure 5:
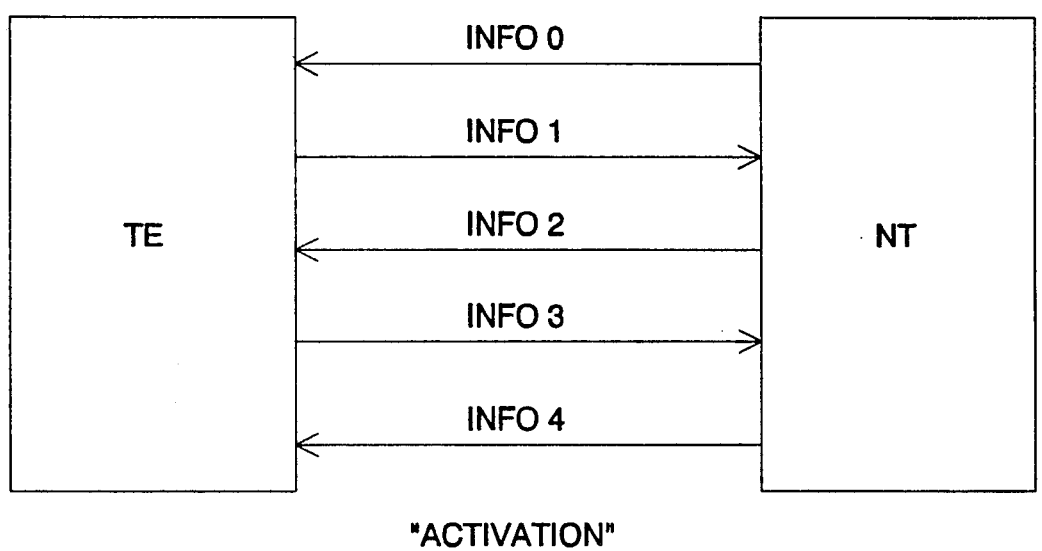
FIG. 5 is a schematic representation of the activation sequence which takes place when a TE device is activated on an ISDN network.

Looking next at RJ45 jack subassembly 100, this subassembly provides the hardware ports through which signals enter and leave the test device 2. In accordance with ISDN convention, subassembly 100 comprises two standard eight pin RJ45 jack connectors 102 and 104, each of which provides eight output lines corresponding to the four pairs of twisted wires associated with a corresponding RJ45 plug connector, such as that shown in FIG. 3.

RJ45 jack connector 102 is connected to the remainder of test device 2 as follows. Pins 1 and 2 of connector 102 are left unconnected. Pin 3 of connector 102 is connected to one lead of resistor 210 and to Pin 4 of connector 104 and to Pin 8 of relay 238. Pin 4 of connector 102 is connected to one lead of resistor 212 and to Pin 1 of transformer 208 and pin 3 of connector 104. Pin 5 of connector 102 is connected to pin 3 of switch 204 and pin 3 of transformer 208 and pin 6 of connector 104. Pin 6 of connector 102 is connected to pin 3 of switch 202 and pin 5 of connector 104 and to pin 5 of relay 238. Pin 7 of connector 102 is connected to one lead of LED 1006; the remaining lead of LED 1006 is connected to one lead of resistor 1020; the remaining lead of resistor 1020 is connected to Pin 8 of connector 102.

RJ45 jack connector 104 is connected to the remainder of the device as follows. Pins 1, 2, 7 and 8 are left unconnected. Pins 3, 4, 5 and 6 are connected as previously described.

Looking next at line interface unit subassembly 200, this subassembly serves to condition (e.g. amplify, correct, etc.) any signals coming in from RJ45 jack connector 102 so that they conform to ISDN signal standards, whereby they may be operated upon by ISDN controller subassembly 400. As noted previously, line interface unit subassembly 200 comprises a pair of switches 202 and 204, a pair of transformers 206 and 208, a pair of resistors 210 and 212, eight diodes 214, 216, 218, 220, 222, 224, 226 and 228, a pair of resistors 230 and 232, another pair of resistors 234 and 236, and a relay 238.

Switches 202 and 204 comprise ordinary double pole, double throw switches of the sort well known in the art. Pins 1, 4, 5 and 6 of switch 202 are left unconnected. Pin 2 of switch 202 is connected to one lead of resistor 210. Pin 3 of switch 202 is connected to pin 6 of connector 102 and to pin 5 of connector 104, and to pin 5 of relay 238. Pins 1, 4, 5 and 6 of switch 204 are left unconnected. Pin 2 of switch 204 is connected to one lead of resistor 212. Pin 3 of switch 204 is connected as previously disclosed.

Transformers 206 and 208 comprise ordinary 2:1 turn ratio transformers of the sort adapted for use with ISDN controller 402 and well known in the art. For example, where ISDN controller 402 is a Siemens PEB 2085 device, transformers 206 and 208 might be Pulse Engineering PE 64995 devices. Transformers 206 and 208 serve to both condition the signal received from jack 102 prior to receipt by controller 402, and to isolate controller 402 from any possible high voltage surges on the line. Pin 1 of transformer 206 is connected to pin 8 of relay 238. Pin 2 of transformer 206 is connected to one lead of resistor 1022. The other lead of resistor 1022 is connected to one lead of LED 1008. The other lead of LED 1008 is connected to pin 2 of transformer 208. Pin 3 of transformer 206 is connected to pin 3 of relay 238. Pin 4 of transformer 206 is connected to pin 2 of switch 306. Pin 5 of transformer 206 is left unconnected. Pin 6 of transformer 206 is connected to pin 5 of switch 306. Pins 1-3 of transformer 208 are connected as previously disclosed. Pin 4 of transformer 208 is connected to pin 2 of switch 304. Pin 5 of transformer 208 is left unconnected. Pin 6 of transformer 208 is connected to pin 5 of switch 304.

Resistors 210 and 212 are conventional 100 ohm resistors.

Diodes 214, 216, 218, 220, 222, 224, 226 and 228 comprise identical BAT 86 type diodes. Diodes 214, 216, 218, 220, 222, 224, 226 and 228 also serve to protect controller 402 from any possible high voltage surges on the line. The positive lead of diode 214 is connected to ground. The negative lead of diode 214 is connected to pins 1 and 9 of switch 302, and to the positive lead of diode 222, and to one lead of resistor 236. The other lead of resistor 236 is connected to pin 32 of ISDN controller 402. The positive lead of diode 216 is connected to ground. The negative lead of diode 216 is connected to pins 4 and 12 of switch 302, and to the positive lead of diode 224, and to one lead of resistor 234. The other lead of resistor 234 is connected to pin 33 of ISDN controller 402. The negative leads of diodes 222 and 224 are connected to Vcc.

The positive lead of diode 218 is connected to ground. The negative lead of diode 218 is connected to pins 3 and 7 of switch 302, and to the positive lead of diode 226, and to one lead of resistor 230. The other lead of resistor 230 is connected to the positive lead of capacitor 416 and to pin 28 of ISDN controller 402. The positive lead of diode 220 is connected to ground. The negative lead of diode 220 is connected to pins 6 and 10 of switch 302, and to the positive lead of diode 228, and to one lead of resistor 232. The other lead of resistor 232 is connected to pin 27 of ISDN controller 402. The negative leads of diodes 226 and 228 are connected to Vcc.

Resistors 230 and 232 are conventional 300 ohm resistors.

Resistors 234 and 236 are conventional 30 ohm resistors.

Relay 238 comprises a 2 form-C type relay of the sort well known in the art. Relay 238 acts as a switch to open and close transmission lines within line interface unit subassembly 200 as needed. Pins 6 and 7 of relay 238 are left unconnected. Pins 8, 10, 5 and 3 are connected as previously described. Pin 12 is connected to Vcc. Pin 1 is connected to pin 11 of microprocessor 802.

Looking next to line select switches subassembly 300, this subassembly serves to permit the user to swap the signal outputs coming off Pins 3, 4, 5 and 6 of RJ45 connector 102. More specifically, this subassembly comprises a switch 302, and a pair of switches 304 and 306. Depending on the settings of these particular switches, (a) the outputs of wire Pair B (i.e., pins 3 and 6 carrying the data transmission signals) may be swapped with the outputs of wire Pair C (i.e., pins 4 and 5 carrying the data receipt signals), and/or (b) the outputs of the two wires within wire Pair B may be swapped with one another (i.e., the outputs of pins 3 and 6 may be swapped with one another), and/or (c) the outputs of the two wires within wire Pair C may be swapped with one another (i.e., the outputs of pins 4 and 5 may be swapped with one another). As will hereinafter be discussed in further detail, the ability to do such signal swapping can be a useful feature in determining the nature of possible cable failures which might occur.

Switch 302 comprises a four pole, double throw switch of the sort well known in the art. Pins 1, 3, 4, 6, 7, 9, 10 and 12 of switch 302 are connected as previously disclosed. Pin 2 of switch 302 is connected to pins 1 and 6 of switch 306. Pin 5 of switch 302 is connected to pins 3 and 4 of switch 306. Pin 8 of switch 302 is connected to pins 1 and 6 of switch 304. Pin 11 of switch 302 is connected to pins 3 and 4 of switch 304.

Switches 304 and 306 comprise double pole, double throw switches of the sort well known in the art. Pins 1-6 of switch 304 and pins 1-6 of switch 306 are connected as previously disclosed.

Looking next at ISDN controller subassembly 400, this subassembly serves to transform the serial data resident in the ISDN-format "frames" received from the network and accumulate it for parallel downloading to other subassemblies of the test device, or, alternatively, it serves to receive parallel data received from other subassemblies of the test device and transform it into ISDN-format "frames" for subsequent transmission out onto the network. More particularly, this subassembly comprises an ISDN controller 402, four buffers 404, 406, 408 and 409, a crystal 410, a pair of capacitors 412 and 414, a capacitor 416, a capacitor 418, a resistor 420, and a resistor 422.

Crystal 410, capacitor 412 and capacitor 414 serve to provide timing inputs required by controller 402, as is well known in the art.

ISDN controller 402 comprises a Siemens PEB 2085 or equivalent device of the sort well known in the art. Pins 27, 28, 32 and 33 of controller 402 are connected as previously disclosed. Pins 41-44 and 1-4 of controller 402 are connected to pins 11-19 of EPROM 902, and to pins 32-39 of microprocessor 802, and to pins 3, 4, 7, 8, 13, 14, 17 and 18 of latch device 804. Pin 38 of controller 402 is connected to pin 16 of microprocessor 802, and to the input of signal inverter 806. Pin 39 of controller 402 is connected to pin 17 of microprocessor 802, and to the input of signal inverter 808. Pin 37 of controller 402 is connected to the output of buffer 812, and to the output of buffer 810, and to one lead of resistor 817. Pin 36 of controller 402 is connected to pin 11 of latch device 804, and to pin 30 of microprocessor 802, and to the input of signal inverter 809. Pin 12 of controller 402 is connected to the output of buffer 515. Pin 13 of controller 402 is connected to the output of buffer 516. Pins 10, 34, 35, 5, 7, 29, 20, 6, 17, 18 and 40 of controller 402 are left unconnected. Pin 23 of controller 402 is connected to pin 12 of microprocessor 802, and to one lead of resistor 422. The other lead of resistor 422 is connected to pin 31 of controller 402, and to Vcc. Pin 22 of controller 402 is connected to the output of buffer 408. The positive terminal of capacitor 418 is connected to Vcc and the negative terminal of capacitor 418 is connected to ground. Pins 24 and 11 of controller 402 are connected to ground. Pin 8 of controller 402 is connected to the input of buffer 409, and pin 14 of controller 402 is connected to the output of buffer 409.

Pin 9 of controller 402 is connected to pin 5 of microprocessor 802. Pin 26 of controller 402 is connected to the positive lead of capacitor 414, and to one lead of crystal 410. The other lead of crystal 410 is connected to pin 25 of controller 402, and to the positive lead of capacitor 412. The negative leads of capacitors 412 and 414 are connected to one another, and to ground. Pin 21 of controller 402 is connected to ground. Pin 15 of controller 402 is connected to the control lines of buffers 404, 406, 408 and 409, and to the control lines of buffers 515 and 516, and to pin 2 of switch 606, and to pin 8 of microprocessor 802. Pin 30 of controller 402 is connected to one lead of resistor 420. The other lead of resistor 420 is connected to ground. Pin 16 of controller 402 is connected to the output of buffer 406. Pin 19 of controller 402 is connected to the output of buffer 404.

Buffers 404, 406, 408 and 409 comprise high speed CMOS tristate buffers such as those manufacturer by Texas Instruments and commonly referred to as 74HC126 devices in the industry. The inputs to buffers 404, 406 and 408 are connected to ground. The remaining leads of buffers 404, 406, 408 and 409 are connected as previously disclosed.

Crystal 410 comprises a 7.68 MHz crystal (0.01 ppm accuracy) which is matched to ISDN controller 402 and of the sort well known in the art. The two leads of crystal 410 are connected as previously disclosed.

Capacitors 412 and 414 comprise conventional 20 pf capacitors. The positive and negative terminals of capacitors 412 and 414 are connected as previously disclosed.

Capacitor 416 comprises a conventional 0.01 UF capacitor. The positive terminal of capacitor 416 is connected as previously disclosed. The negative terminal of capacitor 416 is connected to ground.

Capacitor 418 comprises a conventional 0.1 UF capacitor. The positive and negative terminals of capacitor 418 are connected as previously disclosed. Capacitor 418 serves as a decoupling cap for the Vcc input of controller 402.

Resistor 420 comprises a conventional 2.2K ohm (1%) resistor. The two leads of resistor 420 are connected as previously disclosed.

Resistor 422 comprises a conventional 10K ohm resistor. The two leads of resistor 422 are connected as previously disclosed.

Looking next at clock subassembly 500, this subassembly provides the timing pulses needed by ISDN controller subassembly 400 for certain of its functions. Clock subassembly 500 comprises three inverters 502, 504 and 506, a pair of flip-flops 508 and 510, a pair of counters 512 and 514, a pair of buffers 515 and 516, three resistors 518, 520 and 522, another resistor 524, a crystal 526, a capacitor 528, another capacitor 530, and a variable capacitor 532.

Inverters 502, 504 and 506, resistors 518 and 524, crystal 526, capacitors 528 and 530, and variable capacitor 532 essentially comprise an oscillator subassembly providing a 4 MHz signal to flip-flop 508.

Inverters 502, 504 and 506 comprise high speed CMOS inverters of the sort well known in the art and commonly referred to as 74HC04 devices. The input of inverter 502 is connected to the positive lead of variable capacitor 532, and to the positive lead of capacitor 530, and to one lead of resistor 524. The output of inverter 502 is connected to the other lead of resistor 524 and to the positive lead of capacitor 528. The negative lead of capacitor 528 is connected to the input of inverter 504 and to one lead of resistor 518. The output of inverter 504 is connected to the other lead of resistor 518, and to the input of inverter 506, and to one lead of crystal 526. The other lead of crystal 526 is connected to the negative lead of capacitor 530 and to the negative lead of variable capacitor 532. The output of inverter 506 is connected to the clock of flip-flop 508.

Flip-flops 508 and 510 comprise high speed CMOS D-type flip-flops of the sort well known in the art and frequently referred to as 74HC74 devices. Flip-flop 508 serves to divide the 4 MHz signal received from inverter 506 into a 2 MHz signal. Flip-flop 510 serves to divide the 2 MHz signal received from flip-flop 508 into a 1 MHz signal. The PR input of flip-flop 508, the PR input of flip-flop 510, the CL input of flip-flop 508 and the CL input of flip-flop 510 are all connected to one another, as well as to one lead of resistor 520; the other lead of resistor 520 is connected to Vcc. The D input of flip-flop 508 is connected to the NOT Q output of flip-flop 508. The Q output of flip-flop 508 is connected to the clock of flip-flop 510. The D input of flip-flop 510 is connected to the NOT Q output of flip-flop 510. The Q output of flip-flop 510 is connected to pin 2 of counter 512.

Counters 512 and 514 comprise high speed CMOS 4 bit binary counters of the sort well known in the art and commonly referred to as 74HC163 devices. Counters 512 and 514 serve to divide the frequency of the Q output of flip-flop 510 (i.e., a 1 MHz signal) into that required by ISDN controller 402. Specifically, counter 512 is set to provide a 512 KHz signal output, and counter 514 is set to provide an 8 KHz signal output.

Pin 2 of counter 512 is connected as previously disclosed. Pins 3-6 of counter 512 are connected to ground. Pins 12, 13 and 15 of counter 512 are left unconnected. Pins 7, 10, 9 and 1 of counter 512 are connected to pins 7, 10, 9 and 1 of counter 514, and to one lead of resistor 522. The other lead of resistor 522 is connected to Vcc. Pin 14 of counter 512 is connected to the input of buffer 515. Pin 11 of counter 512 is connected to pin 2 of counter 514. Pins 3-6 of counter 514 are connected to ground. Pins 14, 13, 11 and 15 of counter 514 are left unconnected. Pin 12 of counter 514 is connected to the input of buffer 516.

Buffers 515 and 516 are similar in nature to buffers 404, 406 and 408 previously described, and the leads of buffers 515 and 516 are connected as previously described.

Resistors 518, 520 and 522 comprise conventional 4.7K ohm resistors. The leads of these resistors are connected as previously described.

Resistor 524 comprises a conventional 2.2K ohm resistor. The leads of this resistor are connected as previously described.

Crystal 526 comprises a 4.196 MHz crystal (0.01 ppm accuracy). The leads of crystal 526 are connected as previously described.

Capacitor 528 comprises a conventional 1000 PF capacitor. The leads of capacitor 528 are connected as previously described.

Capacitor 530 comprises a conventional 15 PF capacitor. The leads of capacitor 530 are connected as previously described.

Variable capacitor 532 comprises a conventional 1-18 PF variable capacitor. The leads of variable capacitor 532 are connected as previously described.

Looking next at mode select switches subassembly 600, this subassembly comprises three switches which are used by the user to place the test device into various modes of operation. More specifically, and as will hereinafter be described in more detail, this subassembly comprises a switch 602 which is used to place the test device into either a normal mode or a pulse mode, a switch 604 which is used to place the test device into either a normal error reporting mode or an expanded error reporting mode, and a switch 606 which is used to place the device into either a TE emulating mode or an NT emulating mode. This subassembly also comprises a trio of resistors 608, 610 and 612.

Switches 602, 604 and 606 all comprise ordinary double pole, double throw switches of the sort well known in the art.

Pin 1 of switch 602 is connected to pin 1 of switch 604 and to pin 1 of switch 606 and to ground. Pin 2 of switch 602 is connected to pin 6 of microprocessor 802. Pin 3 of switch 602 is connected to one lead of a resistor 608; the other lead of the resistor is connected to Vcc. Pins 4-6 of switch 602 are left unconnected.

Pin 1 of switch 604 is connected as previously described. Pin 2 of switch 604 is connected to pin 7 of microprocessor 802. Pin 3 of switch 604 is connected to one lead of a resistor 610; the other lead of the resistor is connected to Vcc. Pins 4-6 of switch 604 are left unconnected.

Pins 1 and 2 of switch 606 are connected as previously described. Pin 3 of switch 606 is connected to one lead of a resistor 612 and to pin 5 of switch 606; the other lead of the resistor is connected to Vcc. Pin 4 of switch 606 is connected to one lead of LED 1038; the other lead of LED 1038 is connected to ground. Pin 6 of switch 606 is left unconnected.

Resistors 608, 610 and 612 are conventional 4.7K ohm resistors. Their leads are connected as previously described.

Looking next at power supply subassembly 700, this subassembly provides power to the test device. Power supply subassembly 700 comprises a transformer input jack 702, a voltage regulator 704, a diode 706, a resistor 708, a battery 710, a switch 712, a resistor 714, a Zener diode 716, and a capacitor 718.

Transformer input jack 702 comprises a typical transformer input jack of the sort well known in the art. Pin 1 of jack 702 is adapted to be connected to the output of a 12 volt dc power source, e.g. the output of a standard 12 volt dc transformer. Pin 2 of jack 702 is connected to the input of voltage regulator 704. Pin 3 of jack 702 is connected to ground.

Voltage regulator 704 is an ordinary voltage regulator of the sort adapted to step a 12 volt input current down to a 9 volt output current. Such voltage regulators are well known in the art. The input lead of voltage regulator 704 is connected as previously disclosed. The output lead of voltage regulator 704 is connected to the positive terminal of diode 706. The remaining lead of voltage regulator 704 is connected to ground.

Diode 706 is an ordinary diode of the sort well known in the art and commonly referred to as a 1N4002 device. The positive lead of diode 706 is connected as previously described. The negative lead of diode 706 is connected to one lead of resistor 708.

Resistor 708 is a conventional 22 ohm resistor. One lead of resistor 708 is connected to diode 706. The other lead of resistor 708 is connected to one lead of battery 710 and to pin 2 of switch 712.

Battery 710 is an ordinary 6.2 volt nicad battery. One lead of battery 710 is connected to resistor 708 and to pin 2 of switch 712; the other lead of battery 710 is connected to ground.

Switch 712 is an ordinary double pole, double throw switch of the sort well known in the art. Pin 3 of switch 712 is connected to one lead of resistor 714 and to the positive lead of capacitor 718 and to one lead of resistor 1024 and to Vcc. Pin 2 of switch 712 is connected as previously described. Pins 1 and 4-6 of switch 712 are left unconnected.

Resistor 714 is a conventional 10 ohm resistor. One lead of resistor 714 is connected to switch 712 and to capacitor 718 and to resistor 1024 and to Vcc as previously described. The other lead of resistor 714 is connected to the negative terminal of Zener diode 716.

Zener diode 716 comprises a 5.1 volt Zener regulator diode of the sort well known in the art and commonly referred to as a 1N4733A device. The negative terminal of diode 716 is connected as previously described. The positive terminal of diode 716 is connected to ground.

Capacitor 718 is an electrolytic 15 UF capacitor of the sort well known in the art. The positive terminal of capacitor 718 is connected as previously described. The negative terminal of capacitor 718 is connected to ground. Capacitor 718 serves to absorb any ripple current in the power supply.

Looking next at microcontroller subassembly 800, this subassembly controls the operation of the test device. This subassembly comprises a microprocessor 802, a latch device 804, three signal inverters 806, 808 and 809, a pair of buffers 810 and 812, a flip-flop 814, three resistors 816, 817 and 818, a crystal 820, a pair of capacitors 822 and 824, another signal inverter 826, a diode 828, and a capacitor 830.

Crystal 820 and capacitors 822 and 824 serve to provide timing inputs required by microprocessor 802, as is well known in the art. Resistor 818, inverter 826, diode 828 and capacitor 830 serve to provide a power-up reset for microprocessor 802, as is well known in the art. Inverters 806, 808 and 809, buffers 810 and 812, flip-flop 814, and resistors 816 and 817 cooperate with microprocessor 802 to provide the control signals used to control ISDN controller 402, as is well known in the art.

Microprocessor 802 comprises an 8 bit CMOS microprocessor device such as the Intel 80C31 microprocessor. Pin 31 of microprocessor 802 is connected to ground. Pin 19 of microprocessor 802 is connected to one lead of crystal 820 and to the positive lead of capacitor 822. The other lead of clock 820 is connected to pin 18 of microprocessor 802 and to the positive lead of capacitor 824. The negative lead of capacitor 822 and the negative lead of capacitor 824 are connected to one another and to ground. Pin 9 of microprocessor 802 is connected to the output of signal inverter 826. Pin 12 of microprocessor 802 is connected as previously described. Pin 13 of microprocessor 802 is connected to one lead of LED 1030; the other lead of LED 1030 is connected to one lead of resistor 1040; the remaining lead of resistor 1040 is connected to Vcc. Pin 14 of microprocessor 802 is connected to one lead of LED 1032; the other lead of LED 1032 is connected to one lead of resistor 1042; the remaining lead of resistor 1042 is connected to Vcc. Pin 15 of microprocessor 802 is connected to one lead of LED 1034; the other lead of LED 1034 is connected to one lead of resistor 1044; the remaining lead of resistor 1044 is connected to Vcc. Pin 1 of microprocessor 802 is connected to one lead of LED 1002. Pin 2 of microprocessor 802 is connected to one lead of LED 1004. Pin 3 of microprocessor 802 is connected to one lead of LED 1012. Pin 4 of microprocessor 802 is connected to one lead of LED 1014. Pins 5-8 and 32-39 of microprocessor 802 are connected as previously described. Pins 21-25 of microprocessor 802 are connected to pins 25, 24, 21, 23 and 2 of EPROM 902. Pins 26 and 27 of microprocessor 802 are left unconnected. Pin 28 of microprocessor 802 is connected to the D input of flip-flop 814. Pins 16 and 17 of microprocessor 802 are connected as previously described. Pin 29 of microprocessor 802 is connected to pin 22 of EPROM 902. Pin 10 of microprocessor 802 is connected to one lead of LED 1036; the other lead of LED 1036 is connected to one lead of resistor 1046; the remaining lead of resistor 1046 is connected to Vcc. Pin 11 of microprocessor 802 is connected as previously described.

Latch device 804 comprises an ordinary high speed CMOS latch device of the sort commonly used to couple microprocessor 802 with EPROM 902, and is a device of the sort typically referred to as a 74HC373 device. Pins 3, 4, 7, 8, 13, 14, 17 and 18 are connected as previously described. Pin 1 of latch device 804 is connected to ground. Pin 11 of latch device 804 is connected as previously described. Pins 2, 5, 6, 9, 12, 15, 16 and 19 of latch device 804 are connected to pins 10, 9, 8, 7, 6, 5, 4 and 3 of EPROM 902.

Signal inverters 806, 808 and 809 are substantially identical to signal inverters 502, 504 and 506 previously described. The input of signal inverter 806 is connected as previously described. The output of signal inverter 806 is connected to the control lead of buffer 810. The input of signal inverter 808 is connected as previously described. The output of signal inverter 808 is connected to the control lead of buffer 812. The input of signal inverter 809 is connected as previously described. The output of signal inverter 809 is connected to the clock lead of flip-flop 814.

Buffers 810 and 812 are substantially identical to buffers 515 and 516 previously described. The inputs of buffers 810 and 812 are connected to one another and to the NOT Q output of flip-flop 814. The control leads and output leads of buffers 810 and 812 are connected as previously described.

Flip-flop 814 is substantially identical to the flip-flop 508 previously described. The D and clock inputs, and the NOT Q output, of flip-flop 814 are connected as previously described. The PR and CL leads of flip-flop 814 are connected to one another and to one lead of resistor 816. The other lead of resistor 816 is connected to Vcc.

Resistors 816, 817 and 818 comprise conventional 4.7K ohm resistors. The leads of resistor 816 are connected as previously described. One lead of resistor 817 is connected to Vcc; the other lead of resistor 817 is connected as previously described. One lead of resistor 818 is connected to Vcc and to the negative terminal of diode 828; the other lead of resistor 818 is connected to the positive terminal of diode 828 and to the input of signal inverter 826 and to the positive terminal of capacitor 830.

Crystal 820 comprises an ordinary 11 MHz crystal of the sort well known in the art. The two leads of crystal 820 are connected as previously described.

Capacitors 822 and 824 comprise ordinary 32 PF capacitors of the sort well known in the art. The leads of capacitors 822 and 824 are connected as previously described.

Signal inverter 826 is identical to the signal inverters 806, 808 and 809 previously described. The leads of signal inverter 826 are connected as previously described.

Diode 828 is a 1N4148 type device. The leads of diode 828 are connected as previously described.

Capacitor 830 is a conventional 1 UF capacitor of the sort well known in the art. The positive terminal of capacitor 830 is connected as previously described. The negative terminal of capacitor 830 is connected to ground.

Looking next at EPROM subassembly 900, this subassembly serves to store the computer program which drives microprocessor 802. EPROM subassembly 900 comprises an EPROM 902.

EPROM 902 comprises an 8K CMOS EPROM of the sort well known in the art, such as the Intel 27C64 device. Pins 3-10, 25, 24, 21, 23, 2 and 22 of EPROM 902 are connected as previously disclosed. Pin 20 is connected to ground. Pins 1 and 27 of EPROM 902 are connected to Vcc. Pins 11-13 and 16-19 of EPROM 902 are connected as previously described.

Looking next to LED subassembly 1000, this subassembly serves to display certain information on the face of the test device, depending upon which LED's are lit and which are not. LED subassembly 1000 comprises LEDs 1002, 1004, 1006, 1008, 1010, 1012, 1014, 1030, 1032, 1034, 1036 and 1038, and resistors 1016, 1018, 1020, 1022, 1024, 1026, 1028, 1040, 1042, 1044 and 1046.

LED's 1002, 1004, 1010, 1012, 1014, 1030, 1032, 1034, 1036 and 1038 comprise 2 mA LED's of the sort well known in the art. LED's 1006 and 1008 comprise 62 volt neon LED's. One lead of LED 1002 is connected to microprocessor 802 as previously described. The other lead of LED 1002 is connected to one lead of resistor 1016. The other lead of resistor 1016 is connected to Vcc. One lead of LED 1004 is connected to microprocessor 802 as previously described. The other lead of LED 1004 is connected to one lead of resistor 1018. The other lead of resistor 1018 is connected to Vcc. The leads of LED's 1006 and 1008 are connected as previously disclosed. One lead of LED 1010 is connected to ground. The other lead of LED 1010 is connected to one lead of resistor 1024. The other lead of resistor 1024 is connected to Vcc. One lead of LED 1012 is connected to microprocessor 802 as previously described. The other lead of LED 1012 is connected to one lead of resistor 1026. The other lead of resistor 1026 is connected to Vcc. One lead of LED 1014 is connected to microprocessor 802 as previously described. The other lead of LED 1014 is connected to one lead of resistor 1028. The other lead of resistor 1028 is connected to Vcc. LED's 1030, 1032, 1034, 1036 and 1038 are connected as previously descried.

Resistors 1016, 1018, 1026, 1028, 1040, 1042, 1044 and 1046 all comprise conventional 2.2K ohm resistors.

Resistors 1020 and 1022 comprise conventional 39K ohm resistors.

Resistor 1024 comprises a conventional 1K ohm resistor.

Test device 2 is programmed to operate substantially as follows.

Figure 9:
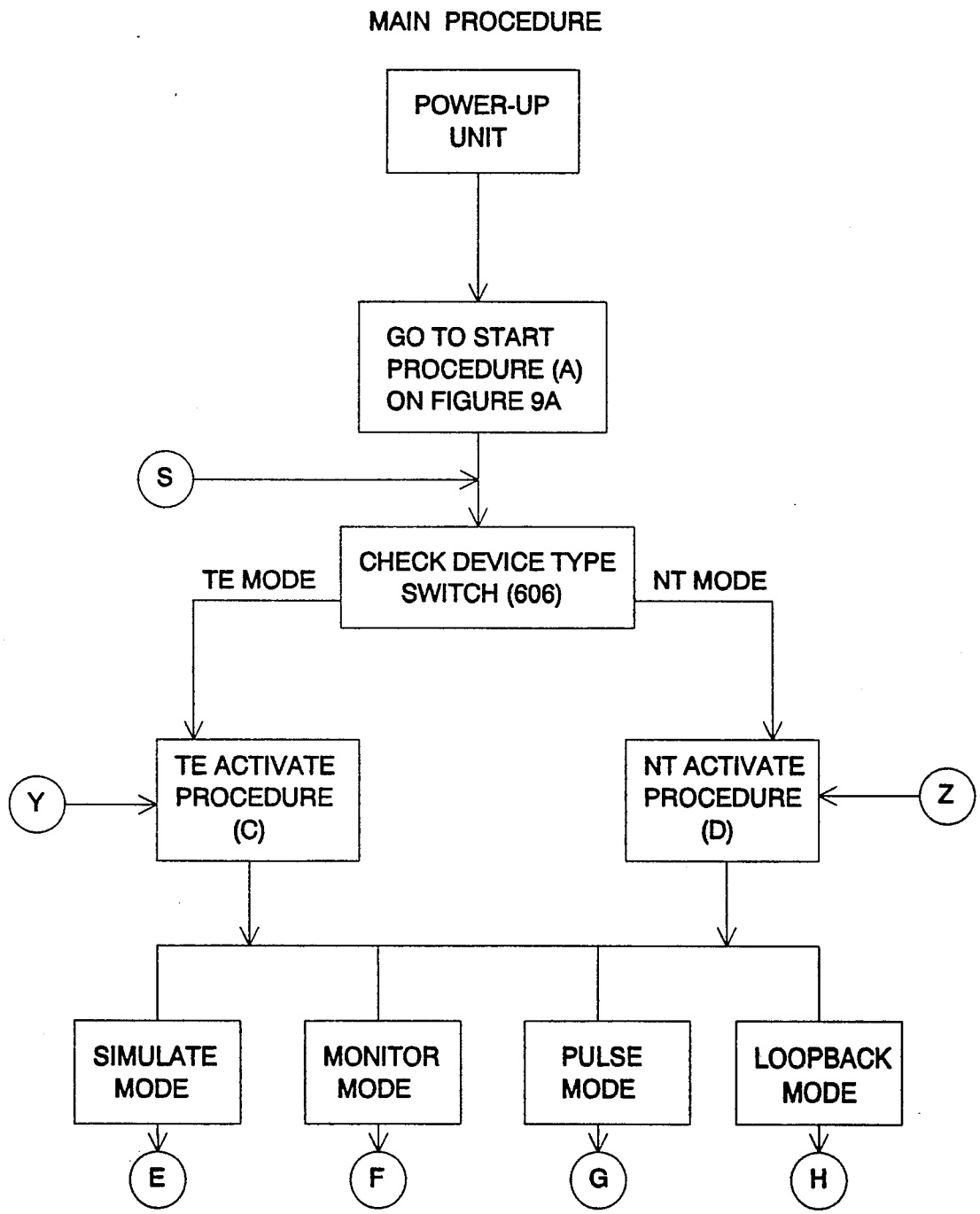
FIGS. 9 and 9A-9I are schematic representations showing the operation of a test device made in accordance with the present invention.

Looking first at FIG. 9, when power switch 712 is first turned on, the test device enters a Start Procedure A".

Figure 9A:
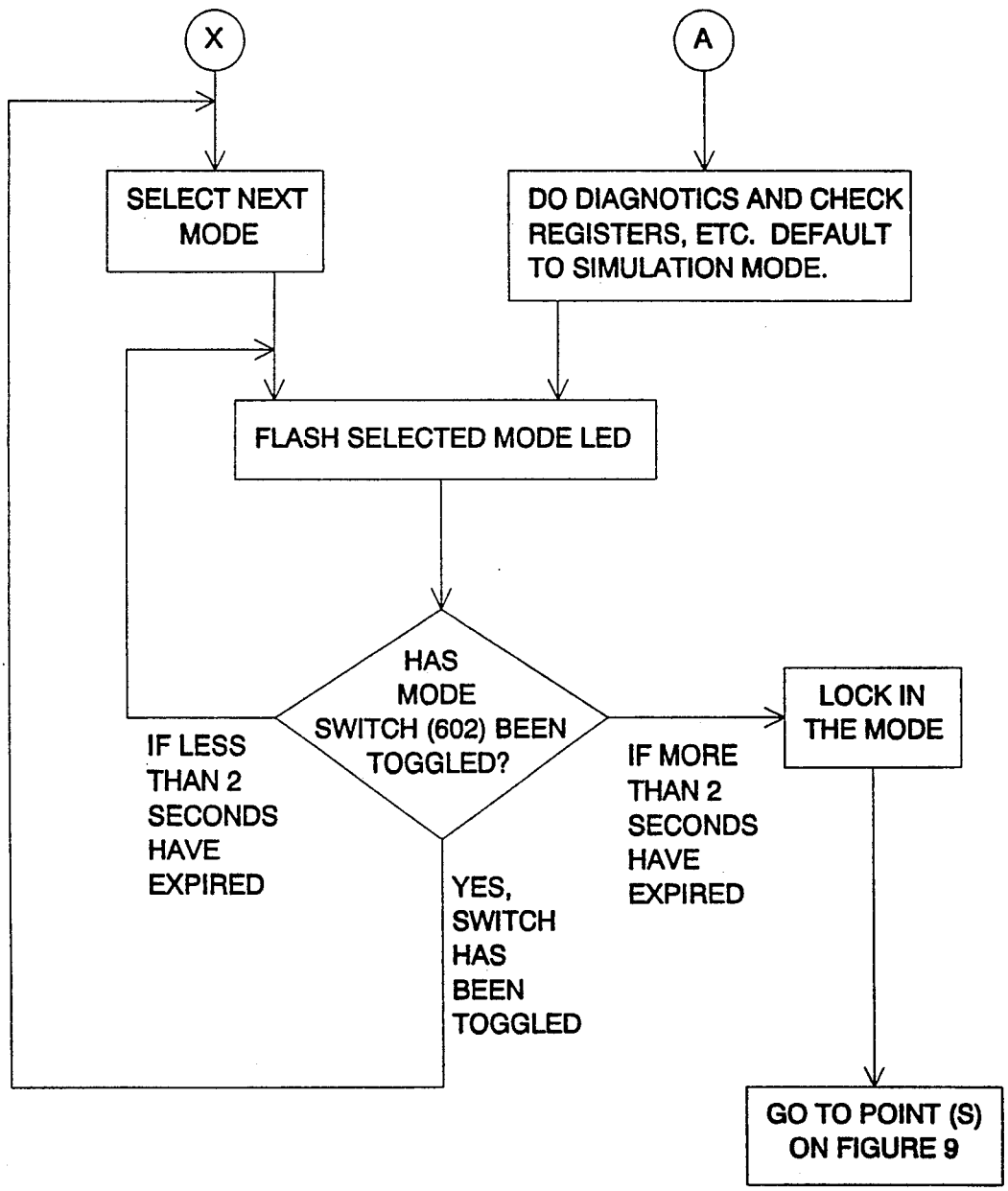
Figure 9B:
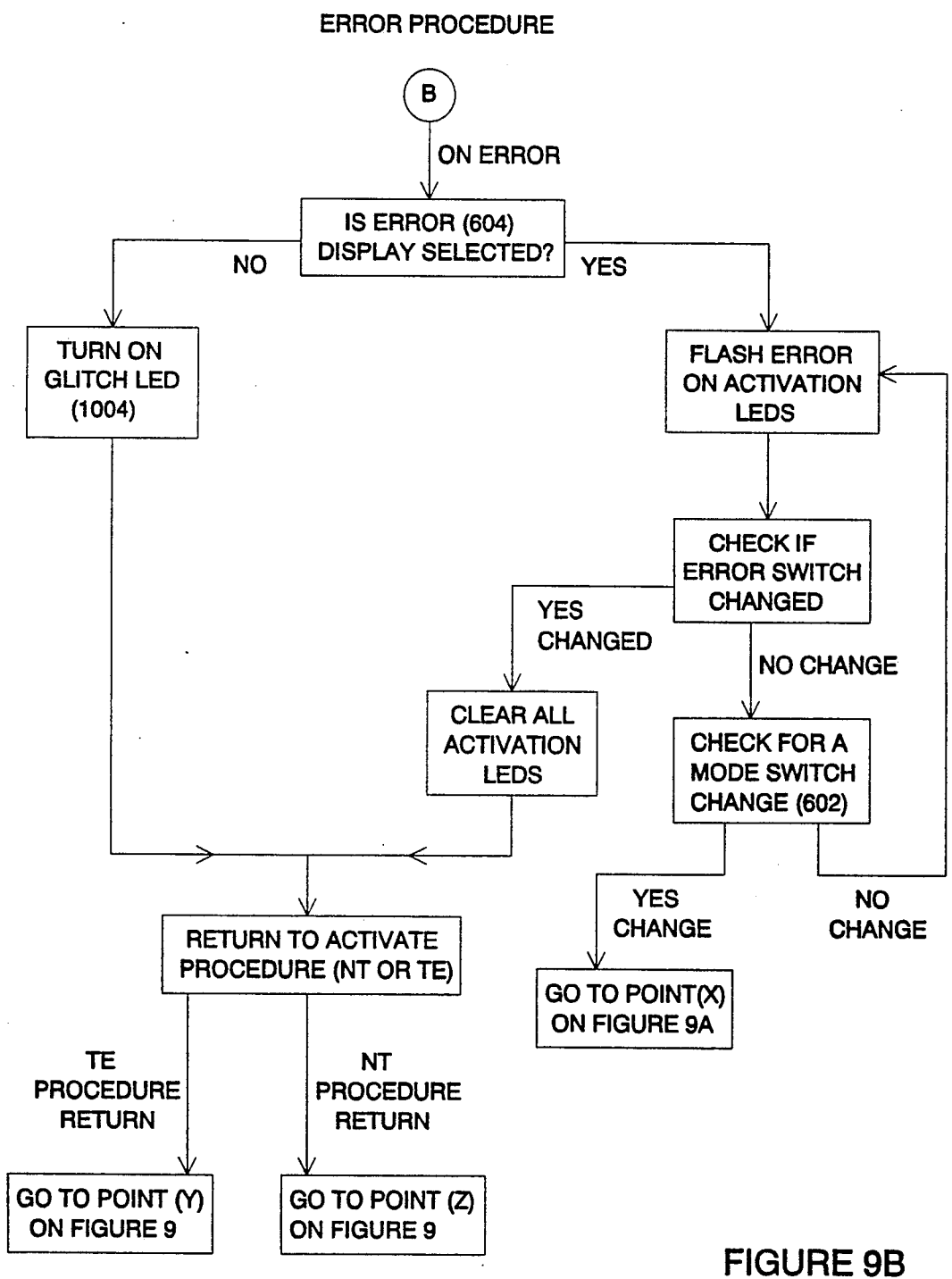

As seen in FIG. 9A, when test device 2 enters its Start Procedure A", microprocessor 802 first goes through a series of preliminary housekeeping chores such as running diagnostics, checking and setting registers, and defaulting into a "simmulation mode". Next the test device flashes the selected mode LED, to show whether the device is in its "simulation mode" (in which the test device emulates either a TE or NT device, depending on the setting of the device select switch 606), its "monitor mode" (in which the test device sits between a TE device and an NT device and monitors the data activity taking place as the two devices interact with one another), its "pulse mode" (in which the test device generally emulates either a TE or NT device, except that it will automatically deactivate an activated line after a predetermined period of time has passed and then seek to reactivate the line again) or its "loopback mode" (in which the test device will connect to either a TE or NT device and loop data originating at that device back to the device). Then it checks to see if the mode select switch has been toggled by the user. If the user toggles mode select switch within two seconds, the device will index to the next mode (simulation; loophack; pulse; monitor) and the updated mode LED will flash to indicate the selection. The same procedure occurs again and again, so long as the mode select switch is toggled within two seconds of the last toggle. If more than two seconds pass since the last toggle (or no toggle), the device locks in the selected mode and proceeds to return to the appropriate point "S" in FIG. 9. Thereafter, the test device 2 checks the current position of the device select switch 606. Depending on the current position of the device select switch 606, the test device will behave as either a TE device or an NT device. When device select switch 606 is set to its TE position, test device 2 will enter a "TE Activation Procedure C" (see FIG. 9C), in which the test device will emulate a TE device; when device select switch 606 is set to its NT position, test device 2 will enter an "NT Activation Procedure D" (see FIG. 9D), in which the test device will emulate an NT device.

Figure 9C:
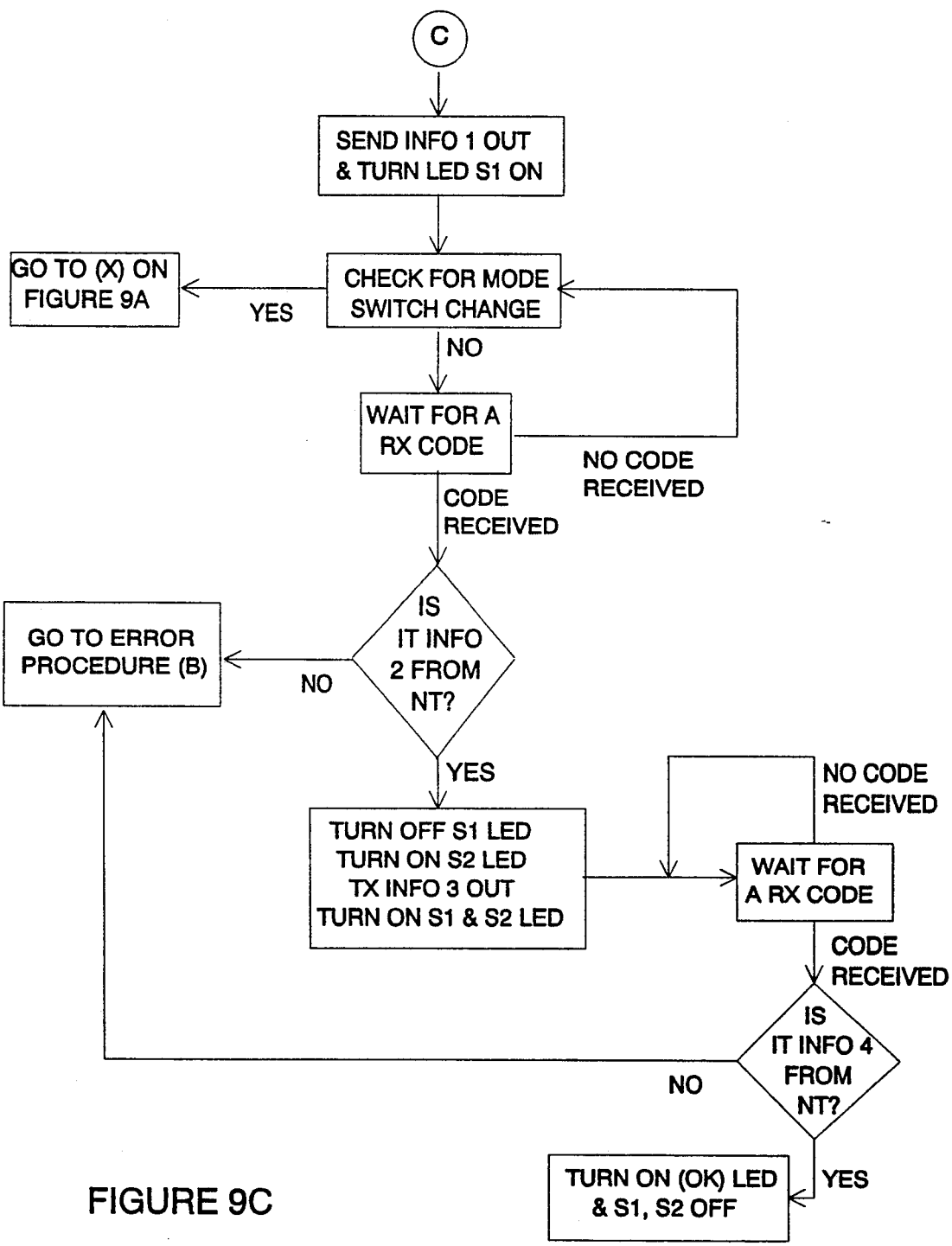
Figure 9D:
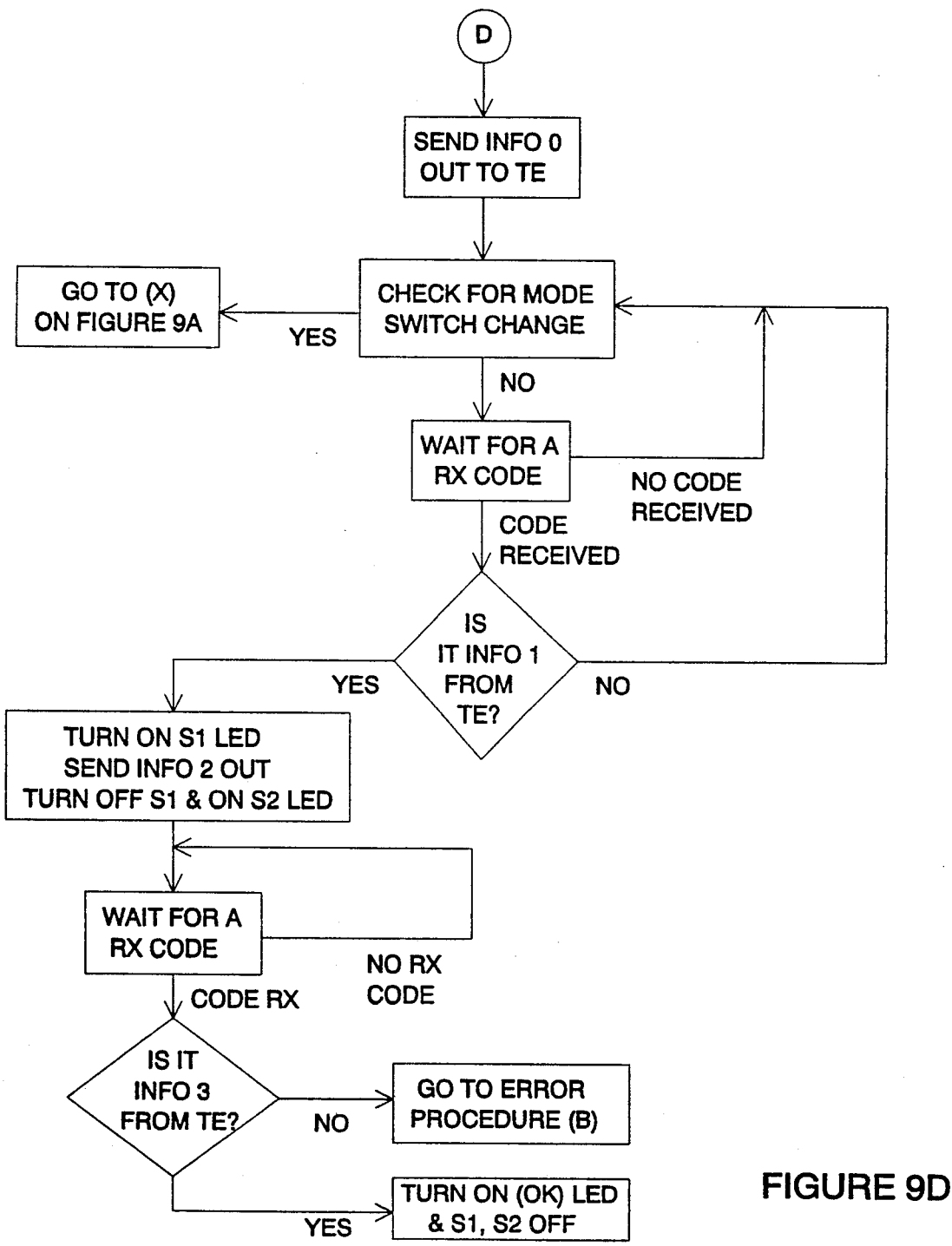

Assuming that device select switch 606 has been set in its TE position, test device 2 operates to emulate a TE device in accordance with the "TE Activation Procedure C" shown in FIG. 9C. More specifically, test device 2 first sends out the INFO 1 to its RJ45 jack connector 102, and it turns on its STAT 1 LED 1012 to signal the same. Then the user connects the test device 2 to an NT device by plugging one end of a cable into RJ45 jack connector 102 and plugging the other end of the cable into a corresponding connector on the NT device. Next microprocessor 802 checks to see if there has been any change in the status of mode select switch 602; if there has been a change in the status of mode select switch 602, the "TE Activation Procedure C" is immediately terminated and the test device returns to point "X" on the operating chart shown in FIG. 9A; however, if there has not been a change in the status of mode select switch 602, the test device waits for a signal to be received over RJ45 jack connector 102. When an incoming signal is received over RJ45 jack connector 102, the test device checks the signal to see if it is the anticipated INFO 2 signal transmitted by the NT device; if it is not, the test device immediately exits out of the "TE Activation Procedure C" and enters "Error Procedure B" (see FIG. 9B), as will hereinafter be described in further detail. If, on the other hand, the incoming signal is indeed the anticipated INFO 2 signal transmitted by the NT device, the test device will turn off the STAT 1 LED 1012 and turn on the STAT 2 LED 1014. Next the test device sends the INFO 3 signal out its RJ45 connector to the NT device, and then turns on both the STAT 1 LED 1012 and the STAT 2 LED 1014. Once this has been done, the test device waits for another signal to be received over RJ45 connector 102. When an incoming signal is received over RJ45 jack connector 102, the test device checks the signal to see if it is the anticipated INFO 4 signal transmitted by the NT device; if it is not, the test device immediately exits out of the "TE Activation Procedure C" and enters "Error Procedure B" (see FIG. 9B), as will hereinafter be described in further detail. If, on the other hand, the incoming signal is indeed the anticipated INFO 4 signal transmitted by the NT device, the test device will turn on the OK LED 1002 and turn off the STAT 1 LED 1012 and turn off the STAT 2 LED 1014, thereby indicating that activation has been successfully achieved.

At this point, depending on the how mode switch 602 was previously toggled, the test device will either enter its "simulation mode" (in which the test device emulates either a TE or NT device, depending on the setting of the device select switch 606), or its "monitor mode" (in which the test device sits between a TE device and an NT device and monitors the data activity taking place as the two devices interact with one another), or its "pulse mode" (in which the test device generally emulates either a TE or NT device, except that it will automatically deactivate an activated line after a predetermined period of time has passed and then seek to reactivate the line again) or its "loopback mode" (in which the test device will connect to either a TE or NT device and loop data originating at that device back to the device).

Figure 9E:
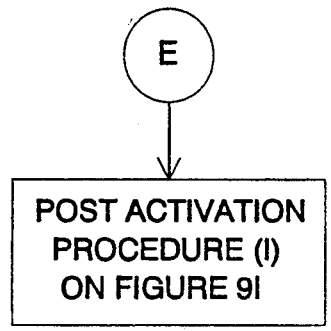

Assuming that mode select switch 602 has been toggled so that test device 2 is is its "simulation mode" (in which the test device emulates either a TE or NT device, depending on the setting of the device select switch 606), the test device thereafter operates in accordance with the "Simulation Mode Procedure E" shown in FIG. 9E. However, closer inspection of the "Simulation Mode Procedure E" shown in FIG. 9E indicates that this procedure essentially comprises the steps associated with the "Post Activation Procedure I" shown in FIG. 9I. Looking next at FIG. 9I, test device operating in accordance with the Post Activation Procedure I" will first check the settings of the device select switch 606 to see if there has been a change in the setting of this switch; if there has been a change in the setting of this switch, the test device will begin flashing LED 1038 on and off and will continue doing so until the unit's power switch 712 is turned off. If no change has occurred in the setting of the device select switch, the test device will next check to see if the error switch 604 has been toggled; if it has, the test device will proceed to clear the GLITCH LED 1004 and then proceed to check for any change in the activation code being received by the test device (i.e., to check for any change in the INFO 4 signal if the test device is emulating a TE device, or for any change in the INFO 3 signal if the test device is emulating an NT device); if the error switch 604 has not been toggled, the test device will proceed to immediately check for any change in the activation code being received by the test device. If the test device finds that there has been a change in the activation code, it will immediately exit out of the "Post Activation Procedure I" and enter "Error Procedure B" (see FIG. 9B), as will hereinafter be described in further detail. If, on the other hand, the test device does not find any change in the activation code, it will check for any change in the setting of mode select switch 606. If there has been a change in the setting of the mode select switch, the "Post Activation Procedure I" is immediately terminated and the test device returns to point "X" on the operating chart shown in FIG. 9A; if there has not been a change in the setting of the mode select switch 606, the test device will loop back to the top of "Simulation Mode Procedure E" again.

Figure 9F:
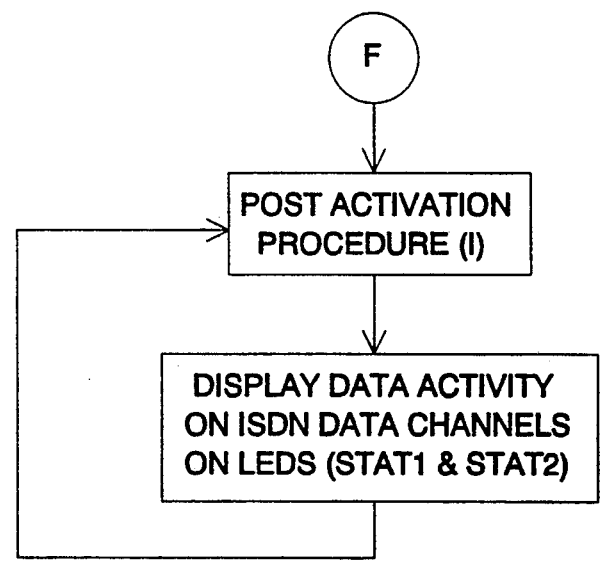

On the other hand, assuming that mode select switch 602 has been toggled so that test device 2 is in its "monitor mode" (in which the test device sits between a TE device and an NT device, one device pugged into RJ45 connector 102 and one device pugged into RJ45 connector 104, and monitors the data activity taking place as the two devices interact with one another), the test device thereafter operates in accordance with the "Monitor Mode Procedure F" shown in FIG. 9F. "Monitor Mode Procedure F" essentially consists of running "Post Activation Procedure I" previously described, except that an additional step is added at the end of "Post Activation Procedure I" before the device loops back to the start of "Monitor Mode Procedure F". In this additional step, the test device 2 monitors the data activity taking place between the TE device and the NT device, and displays this data activity on the STAT 1 LED 1012 and the STAT 2 LED 1014.

Figure 9G:
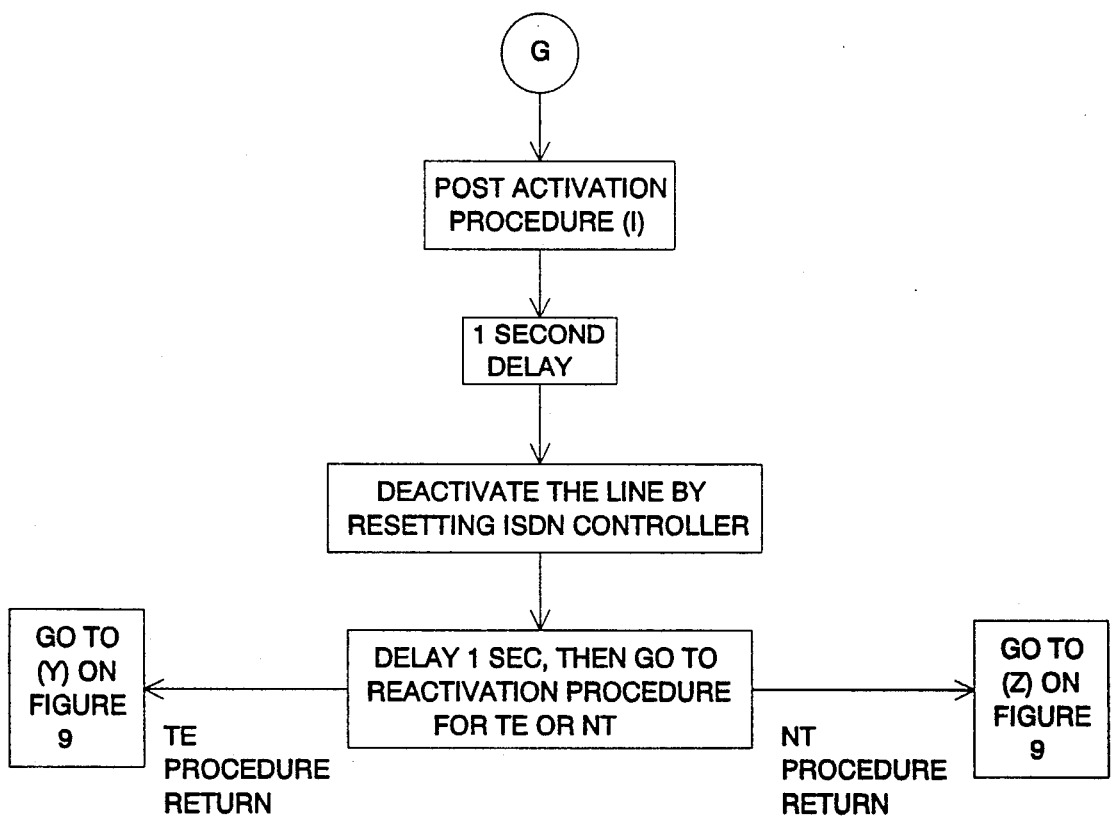

Alternatively, if mode select switch 602 has been toggled so that test device 2 is in its "pulse mode" (in which the test device generally emulates either a TE or NT device, depending on the setting of the device select switch 606, except that the test device will automatically deactivate an activated line after a predetermined period of time has passed and then seek to reactivate the line again), the test device thereafter operates in accordance with the "Pulse Mode Procedure G" shown in FIG. 9G. "Pulse Mode Procedure G" essentially consists of running "Post Activation Procedure I" previously described, except that (1) at the end of "Post Activation Procedure I", the device does not loop back to the start of "Post Activation Procedure I", and (2) three extra steps are added at the end of "Post Activation Procedure I". In these additional steps, the test device first pauses for a 1 second delay; then it deliberately deactivates the activated line by resetting ISDN controller 402; then it waits another second and then the test device returns to point "Y" on the operating chart shown in FIG. 9 (for TE activation, or to point "Z" on the operating chart in FIG. 9 for NT activation) to rebegin the activation process all over again.

Figure 9H:
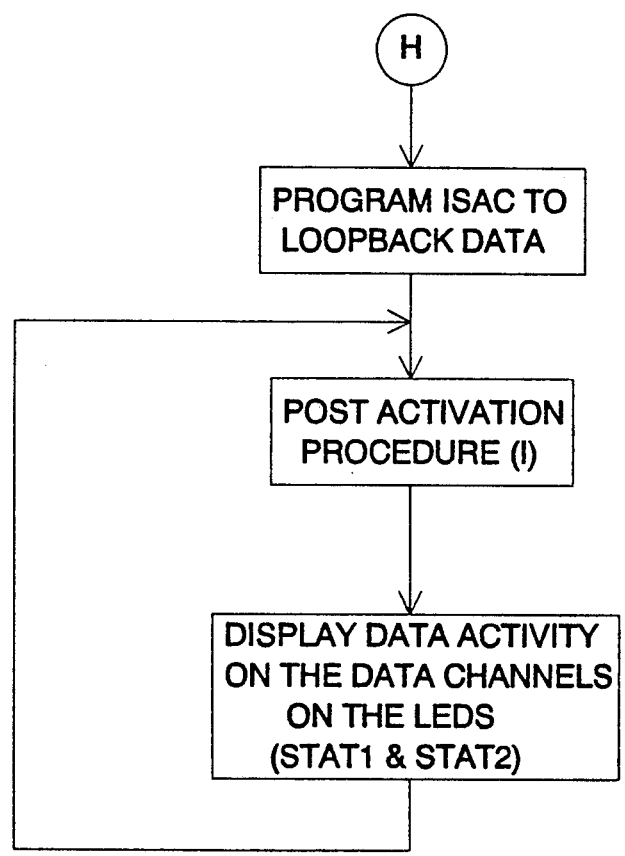
Figure 9I:
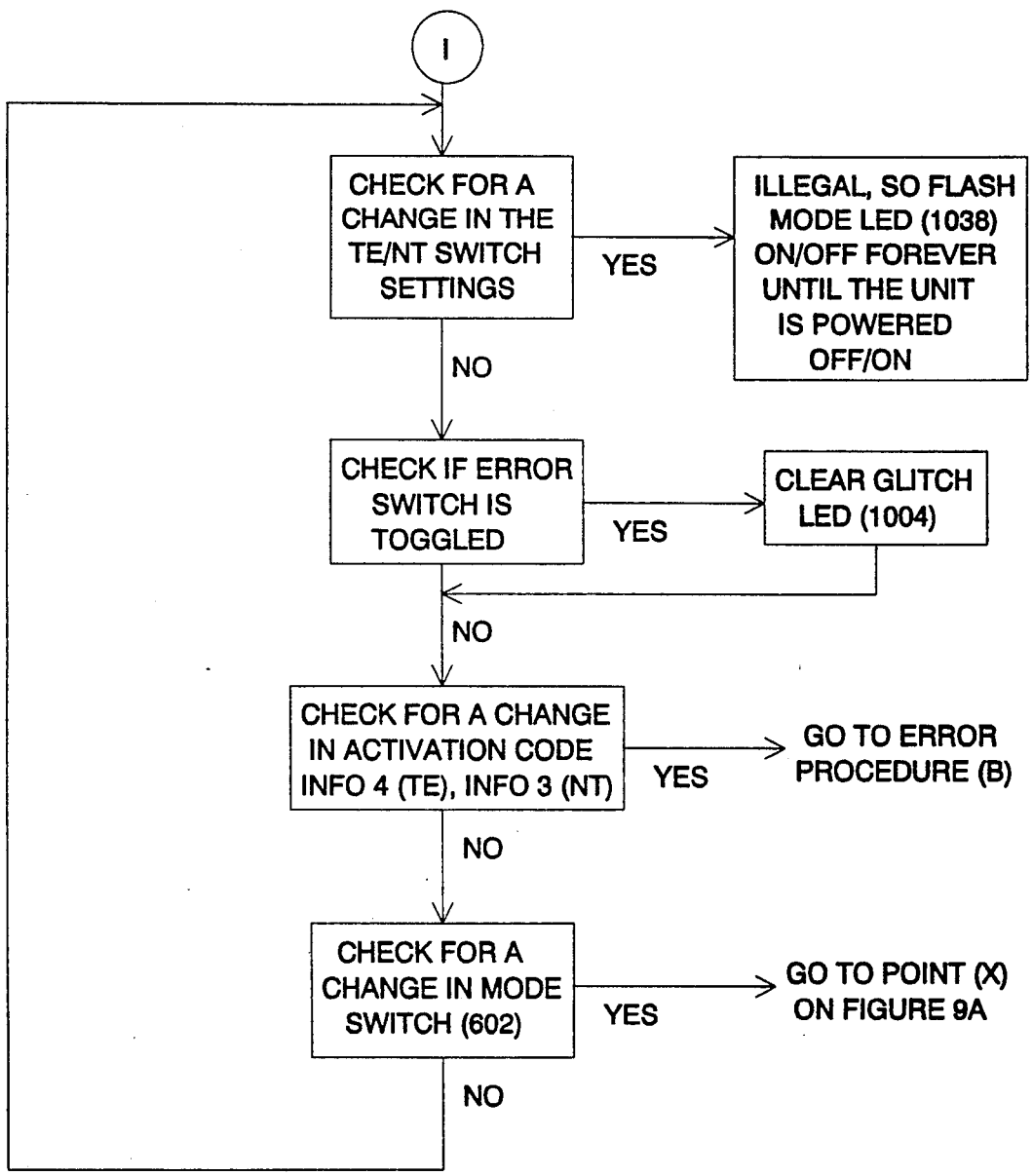

Lastly, if mode select switch 602 has been toggled so that test device 2 is in its "loopback mode" (in which the test device is connected to either a TE or NT device and loops data originating at that device back to the device), the test device thereafter operates in accordance with the "Loopback Mode Procedure H" shown in FIG. 9H. "Loopback Mode Procedure H" essentially consists of running "Post Activation Procedure I" previously described, except that (1) prior to entering "Post Activation Procedure I", the ISDN controller 402 is programmed to loop back data to the originating device, (2) at the end of the "Post Activation Procedure I", the device does not loop back to the start of "Post Activation Procedure I", and (3) an additional step is added at the end of the "Post Activation Procedure I" in which the test device 2 displays the data activity being looped back to the originating device, and displays this data activity on the STAT 1 LED 1012 and the STAT 2 LED 1014.

If, during the foregoing operations, anything occurs to cause the test device to enter the "Error Procedure B", the test device thereafter operates in accordance with the "Error Procedure B" shown in FIG. 9B. More specifically, when the test device enters "Error Procedure B", it first checks to see the position of the error switch 604. If the "display" setting has not been selected (i.e., if error switch 604 is in its "history" setting) for error switch 604, the test device will simply turn on the GLITCH LED 1004 before returning to the activation procedure at points "Y" or "Z" (depending on whether the device is in TE activation or NT activation) the operating chart shown in FIG. 9. If, on the other hand, the "display" setting is selected for error switch 604, the test device will flash one or more of the activation LED's 1002, 1004, 1012 and 1014 according to a preordained pattern to display the nature of the error detected. Then the test device checks to see if the position of the error switch 604 has been changed; if it has not, the test device will check for a change in the position of the mode select switch. If the position of the mode select switch has changed, the device will exit Error Procedure B and return to Point X on FIG. 9A. On the other hand, if the position of the mode select switch has not changed, the test device will continue to flash one or more of the activation LED's 1002, 1004, 1012 and 1014 as previously described. If, however, the position of the error switch 604 has changed, the test device will clear all of the activation LED's 1002, 1004, 1012 and 1014 before returning to the activation procedure at point "Y" or "Z" on FIG. 9 (depending on whether the device is in TE activation or NT activation).

In the event that device select switch 606 has been set in its NT position, test device 2 will operate to emulate an NT device instead of a TE device as previously described. More specifically, as seen in FIG. 9, when the test device checks the setting of device select switch 606, the test device will operate in accordance with the "NT Activation Procedure D" shown in FIG. 9D if the device select switch 606 is set to its NT position. More specifically, the user will first connect the test device 2 to a TE device by plugging one end of a cable into RJ45 jack connector 102 and plugging the other end of the cable into a corresponding connector on the TE device. Then the test device will send out an INFO 0 signal to the TE device via RJ45 jack connector 102. Next the test device will check for a change in the setting of the mode select switch 602; if there has been such a change in the setting of mode select switch 602, the device will immediately exit out of the "NT Activation Procedure D" shown in FIG. 9D and return to point "X" on the operating chart shown in FIG. 9A; however, if there has not been a change in the status of mode select switch 602, the test device waits for a signal to be received over RJ45 jack connector 102. When an incoming signal is received over RJ45 jack connector 102, the test device checks the signal to see if it is the anticipated INFO 1 signal transmitted by the TE device; if it is not, the test device continues waiting to receive the INFO 1 signal from the TE device. When the INFO 1 signal is received from the TE device, the test device will turn on its STAT 1 LED 1012 and send the INFO 2 signal out its RJ45 connector to the TE device, and then it turns off its STAT 1 LED 1012 and turns on its STAT 2 LED 1014. Once this has been done, the test device waits for another signal to be received over RJ45 connector 102. When an incoming signal is received over RJ45 jack connector 102, the test device checks the signal to see if it is the anticipated INFO 3 signal transmitted by the TE device; if it is not, the test device immediately exits out of the "NT Activation Procedure D" and enters "Error Procedure B" (see FIG. 9B). If, on the other hand, the incoming signal is indeed the antipated INFO 3 signal transmitted by the TE device, the test device will turn on the OK LED 1002 and turn off the STAT 2 LED 1014, thereby indicating that activation has been successfully achieved.

At this point, depending on the how mode switch 602 was previously toggled, the test device will either enter its "simulation mode" (in which the test device emulates either a TE or NT device, depending on the setting of the device select switch 606), or its "monitor mode" (in which the test device sits between a TE device and an NT device and monitors the data activity taking place as the two devices interact with one another), or its "pulse mode" (in which the test device generally emulates either a TE or NT device, except that it will automatically deactivate an activated line after a predetermined period of time has passed and then seek to reactivate the line again) or its "loopback mode" (in which the test device will connect to either a TE or NT device and loop data originating at that device back to the device).

Appendix A provides a source code listing of software which can be used to operate the test device in the foregoing manner. It is to be appreciated that the source code listing provided in Appendix A is merely exemplary and may be replaced by alternative code. It is also to be appreciated that the source code listing provided in Appendix A is adapted for use with an Intel 8031 microprocessor.

The use of test device 2 will now be described.

Figure 10:
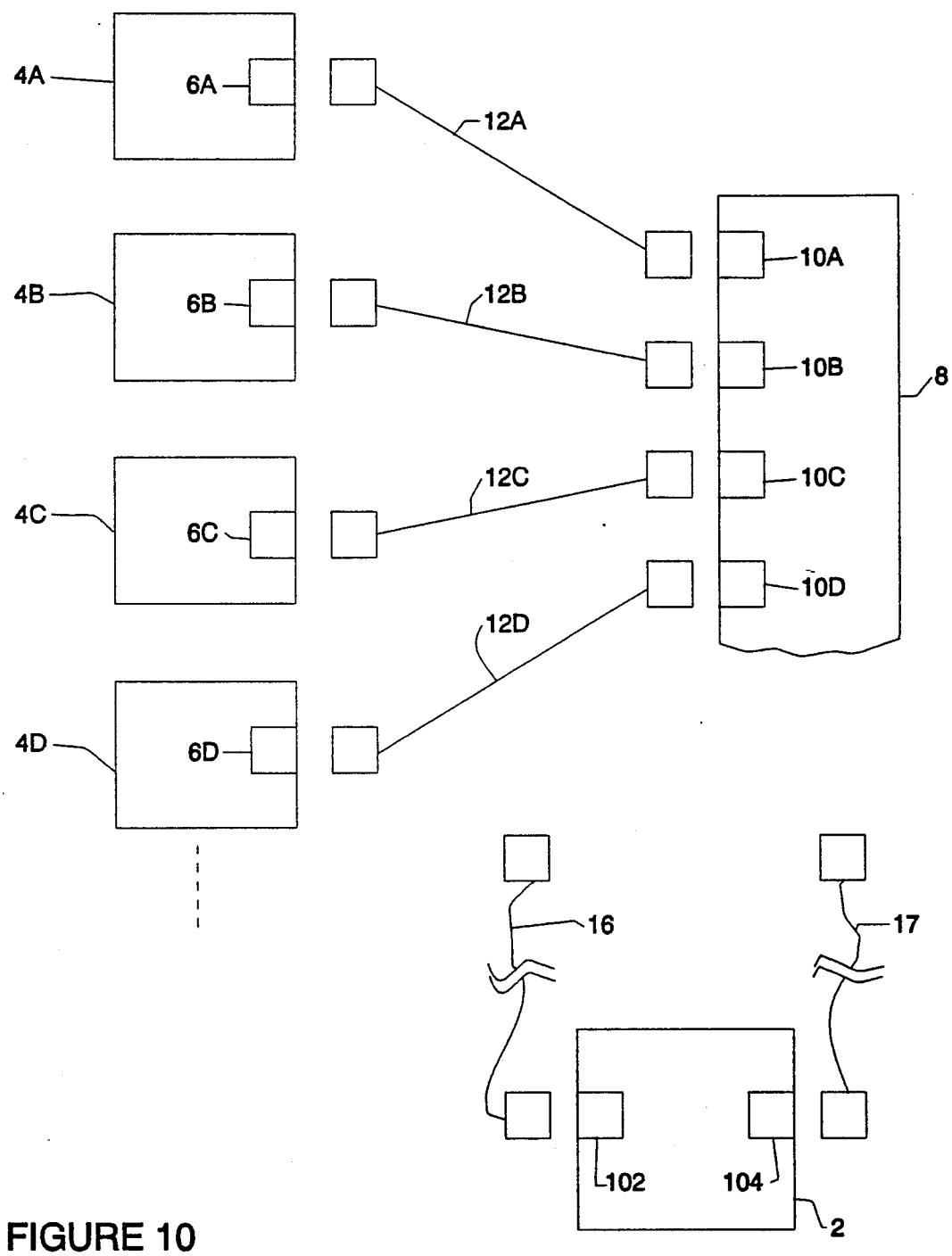
FIG. 10 is a schematic representation of a how a test device made in accordance with the present invention might interact with the TE devices, NT devices and cabling of an ISDN network.

Looking next at FIG. 10, there is shown a typical ISDN environment in which one or more of the test devices 2 might be used. Such environments typically comprise (a) a plurality of TE devices 4A, 4B, 4C, etc. each having a jack 6A, 6B, 6C, etc., (b) at least one NT device 8 having a plurality of jacks 10A, 10B, 10C, etc., and (c) a plurality of cables 12A, 12B, 12C, etc. for connecting jacks 6A, 6B, 6C, etc. to jacks 10A, 10B, 10C, etc., respectively.

TE DEVICE TESTING

Suppose it is desired to test to see if a particular TE device is operating properly. In this case test device 2 will be connected to that TE device and the test device will emulate an NT device so as to determine if the TE device is operating properly. More particularly, suppose test device 2 is to be used to determine if TE device 4D is operating properly. In this case cable 12D would be disconnected from jack 6D, and test device 2 would have its jack 102 connected to TE jack 6D via an auxiliary cable 16. Next, mode select switch 606 would be placed into its "NT" position and mode select switch 604 would be placed into its "normal", or "history", position. At the same time, line select switch 302 would be placed into its "normal" position, line select switch 304 would be placed into its "normal" position, and line select switch 306 would be placed into its "normal" position. In addition to the foregoing, line interface switch 202 would be placed into its "terminate" position, and line interface switch 204 would be placed into its "terminate" position.

Next, the power switch is turned on. Following instructions provided to it by EPROM 902, microprocessor 802 first conducts a number of preliminary housekeeping chores such as setting registers, etc. Among other things, microprocessor 802 checks to see the condition of mode select switches 606, 604 and 602.

Since device select switch 606 is in its "NT" position, the microprocessor is told that the test device should emulate an NT device; since error switch 604 is in its "normal", or "history", position, the microprocessor is told that the test device should report the existence of any errors, but it should not bother to collect or display any specific information regarding the nature or history of the errors. In addition, since the device has just been turned on and since mode switch 602 has not been toggled, the test device will default into, and remain in, its simulation mode, wherein the microprocessor is told that the test device should go through the activation sequence.

Since line select switch 302 is in its "normal" position, the microprocessor is told to assume that wire Pair B and wire Pair C of the cable are properly wired to the jacks at the ends of the cable; since line select switch 306 is in its "normal" position, the microprocessor is told to assume that the two wires of wire Pair B are properly wired to the jacks at the ends of the cable; and since line select switch 304 is in its "normal" position, the microprocessor is told to assume that the two wires of wire Pair C are properly wired to the jacks at the ends of the cable.

Since line interface switch 202 is in its "terminate" position, and since line interface switch 204 is in its "terminate" position, the 100 ohm resistors 210 and 212 are connected into the line, as generally required by ISDN convention.

Next, since the test device is set to emulate an NT device in the text device's simulation mode, the microprocessor instructs ISDN controller chip 402 to generate the INFO 0 signal. ISDN controller chip 402 generates the INFO 0 signal, using clock subassembly 500, and sends it to line interface unit subassembly 200, which in turn sends the signal out over cable 16 to TE device 4D.

If TE device 4D is operating properly, it will recognize the INFO 0 signal received from test device 2 and will respond by sending an INFO 1 signal back to test device 2.

The INFO 1 signal comes in through RJ45 connector subassembly 100, passes through line interface unit subassembly 200 where the signal is corrected, if necessary, into proper ISDN form, and then passes into ISDN controller subassembly 400 where the INFO 1 signal is loaded into the chip's registers. Microprocessor 802 monitors these registers and recognizes when the INFO 1 signal has been properly received by the test device.

Assuming the INFO 1 signal has been properly received by the test device, microprocessor 802 instructs ISDN controller chip 402 to send out the INFO 2 signal. ISDN controller chip 402 generates the INFO 2 signal and sends it to line interface unit subassembly 200, which in turn sends the INFO 2 signal out over cable 16 to TE device 4D.

If TE device 4D is operating properly, it will recognize the INFO 2 signal received from test device 2 and will respond by sending an INFO 3 signal back to test device 2.

The INFO 3 signal comes in through RJ45 connector subassembly 100, passes through line interface unit subassembly 200 where the signal is corrected, if necessary, into proper ISDN form, and then passes into ISDN controller subassembly 400 where the INFO 3 signal is loaded into the chip's registers. Microprocessor 802 monitors these registers and recognizes when the INFO 3 signal has been properly received.

Assuming the INFO 3 signal has been properly received, microprocessor 802 instructs ISDN controller chip 402 to send out the INFO 4 signal. ISDN controller chip 402 generates the INFO 4 signal and sends it to line interface unit subassembly 200, which in turn sends the signal out over cable 16 to TE device 4D.

If TE device 4D is operating properly, it will recognize the INFO 4 signal sent out by test device 2 and activation will have been successfully achieved. The test device 2 will signal that activation has been successfully achieved by turning on LED 1002. Microprocessor 802 then continues to monitor the line, ready to detect and report any possible error conditions. In the event that such an error condition is detected, microprocessor 802 will turn off LED 1002 and turn on LED 1004 to report the occurrence of an error. Test device 2 will then attempt to achieve activation again; if activation is successfully achieved, LED 1002 will be turned back on, and LED 1004 will be left on to show the occurrence of at least one error.

However, if the test device fails to receive either the INFO 1 or INFO 3 signals at the appropriate time from TE device 4D, it will recognize that an error has occurred and activation has not been successfully achieved. As a result, the test device will turn on LED 1004 to indicate that an error has occurred and activation has not been achieved. Then the test device will attempt to achieve activation again.

The foregoing procedure can be varied somewhat by setting error switch 604 in its "display" position rather than in its "normal", or "history", position. As noted previously, when error switch 604 is in its "normal", or "history" position, the microprocessor is told that the test device should report the existence of any errors, but it should not bother to collect and/or report any specific information regarding the nature of the errors. However, when error switch 604 is set in its "display" position during the foregoing activation procedure, the microprocessor is instructed to collect and report specific errors occuring during the activation procedure. This information is then displayed using LED's 1012 and 1014, as well as LED's 1002 and 1004. For example, the test device could advise the user whether the INFO 1 signal was successfully received from the TE device while the INFO 3 signal was not.

The test device 2 can also be used in the situation where it is necessary to test a plurality of TE devices in rapid succession, since in this situation one could connect one end of cable 16 to port 102 of the test device, set the test device into its activation mode (with error switch 604 set to either its "history" or "display" setting, as desired), and then thereafter quickly connect the free end of cable 16 to successive TE devices, looking for the "OK" LED 1002 to light up before moving on to the next TE device.

The foregoing procedure can also be varied somewhat by toggling mode select switch 602 so that the test device enters its loophack mode rather than its simulation mode. When test device 2 is in its loophack mode, it will, after activation is successfully achieved, serve to loop data originating at the TE device back to that TE device. Such a feature can be useful in various testing of the TE device.

In addition, the foregoing procedure can also be varied somewhat by toggling mode select switch 602 so that the test device enters its pulse mode rather than its simulation mode. When test device 2 is in its pulse mode, it will, after activation is successfully achieved, automatically deactivate the line and, after a delay, thereafter seek to reactivate the line. The feature can be extremely useful in the situation where one desires to repeatedly automatically test activation of a particular TE device, e.g. where the TE device is suspected of intermittent malfunction, reporting the error by lighting up various LED's in accordance with the position of error switch 604, as previously described.

NT DEVICE TESTING

Suppose now it is desired to test to see if a particular jack on an NT device is operating properly. In this case test device 2 will be connected to that particular jack on the NT device and the test device will emulate a TE device so as to determine if the particular jack on the NT device is operating properly. More particularly, suppose test device 2 is to be used to determine if jack 10D of NT device 8 is operating properly. In this case, device switch 606 would be placed into its "TE" position, and error switch 604 would be placed into its "normal", or "history" position. At the same time, line select switch 302 would be placed into its "normal" position, line select switch 304 would be placed into its "normal" position, and line select switch 306 would be placed into its "normal" position. In addition, line interface switch 202 would be placed into its "terminate" position, and line interface switch 204 would be placed into its "terminate" position.

Next, the power switch is turned on. Following instructions provided to it by EPROM 902, microprocessor 802 first conducts a number of preliminary housekeeping chores such as setting registers, etc. Among other things, microprocessor checks to see the condition of mode select switches 606, 604 and 602.

Since device switch 606 is in its "TE" position, the microprocessor is told that the test device should emulate a TE device and since error switch 604 is in its "normal", or "history" position, the microprocessor is told that the test device should report the existence of any errors, but it should not bother to collect any specific information regarding the nature of the errors. In addition, since the device has just been turned on and since mode select switch 602 has not been toggled, the test device will default into, and remain in, its simulation mode, wherein the microprocessor is told that the test device should go through the activation sequence. Since line select switch 302 is in its "normal" position, the microprocessor is told to assume that wire Pair B and wire Pair C of the cable are properly wired to the jacks at the ends of the cable; since line select switch 306 is in its "normal" position, the microprocessor is told to assume that the two wires of wire Pair B are properly wired to the jacks at the ends of the cable; and since line select switch 304 is in its "normal" position, the microprocessor is told to assume that the two wires of Pair C are properly wired to the jacks at the ends of the cable.

Since line interface switch 202 is in its "terminate" position, and since line interface switch 204 is in its "terminate" position, the 100 ohm resistors 210 and 212 are connected into the line, as generally required by ISDN convention.

Since the test device has been told to emulate a TE device for the activation sequence, it will attempt to send the INFO 1 signal out its RJ45 jack 102. After the test device attempts to send the INFO 1 signal out its RJ45 connector 102, cable 12D would be disconnected from jack 10D, and test device 2 would have its jack 102 connected to NT device jack 10D via a cable 16. As a result, the INFO 1 signal is sent to the NT device.

If NT device jack 10D is operating properly, it will recognize the INFO 1 signal received from test device 2 and will respond by sending an INFO 2 signal back to test device 2.

The INFO 2 signal comes in through RJ45 connector subassembly 100, passes through line interface unit subassembly 200 where the signal is corrected, if necessary, into proper ISDN form, and then passes into ISDN controller subassembly 400 where the INFO 2 signal is loaded into the chips registers. Microprocessor 802 monitors these registers and recognizes when the INFO 2 signal has been properly received.

Assuming the INFO 2 signal has been properly received, microprocessor 802 instructs ISDN controller chip 402 to send out the INFO 3 signal. ISDN controller chip 402 generates the INFO 3 signal and sends it to line interface unit subassembly 200, which in turn sends the signal out over cable 16 to NT device jack 10D.

If NT device jack 10D is operating properly, it will recognize the INFO 3 signal received from test device 2 and will respond by sending an INFO 4 signal back to test device 2.

The INFO 4 signal comes in through RJ45 connector subassembly 100, passes through line interface unit subassembly 200 where the signal is corrected, if necessary, into proper ISDN form, and then passes into ISDN controller subassembly 400 where the INFO 4 signal is loaded into the chip's registers. Microprocessor 802 monitors these registers and recognizes when the INFO 4 signal has been properly received, whereupon it will recognize that activation has been successfully achieved.

The test device will signal that activation has been successfully achieved by turning on LED 1002. Microprocessor 802 then continues to monitor the line, ready to detect and report any possible error conditions. In the event that such an error condition is detected, microprocessor 802 will turn off LED 1002 and turn on LED 1004 to report the occurrence of an error. Test device 2 will then attempt to achieve activation again; if activation is successfully achieved, LED 1002 will be turned back on and LED 1004 will be left on to show the occurrence of at least one error.

However, if the test device fails to receive either the INFO 2 or INFO 4 signals at the appropriate time from NT device jack 10D, it will recognize that an error has occurred and activation has not been successfully achieved. As a result, it will turn on LED 1004 to indicate an error has occurred. Then the test device will attempt to achieve activation again.

The foregoing procedure can be varied somewhat by setting error switch 604 in its "display" position rather than in its "normal", or "history", position. As noted previously, when error switch 604 is in its "normal" position, the microprocessor is told that the test device should report the existence of any errors, but it should not bother to collect and/or report any specific information regarding the nature of the errors. However, when error switch 604 is set in its "display" position during the foregoing activation procedure, the microprocessor is instructed to collect and report specific errors occuring during the activation procedure. This information is then displayed using LED's 1012 and 1014, as well as LED's 1002 and 1004. For example, the test device could advise whether the INFO 2 signal was successfully received from the NT device while the INFO 4 signal was not.

The test device 2 can also be used where it is necessary to test a plurality of NT jacks in rapid succession since in this situation one could connect one end of cable 16 to port 102 of the test device, set the test device into its pulse mode, and then thereafter quickly, connect the free end of cable 16 to successive ones of the NT jacks, looking for the "OK" LED 1002 to light up before moving on to the next NT jack.

The foregoing procedure can also be varied somewhat by toggling mode select switch 602 so that the device enters its loopback mode rather than its simulation mode. When test device 2 is in its loopback mode, it will, after activation is successfully achieved, serve to loop data originating at the NT device back to that NT device. Such a feature can be useful in various testing of that NT device.

In addition, the foregoing procedure can also be varied somewhat by toggling mode select switch 602 so that the test device enters its pulse mode rather than its simulation mode. When test device 2 is in its pulse mode, it will, after activation is successfully achieved, automatically deactivate the line and, after a delay, thereafter seek to reactivate the line. This feature can be extremely useful in the situation where one desires to repeatedly automatically test activation of a particular NT jack, e.g. where the NT jack is suspected of intermittent malfunction, reporting the error by lighting up various LED's in accordance with the position of error switch 604, as previously described.

CABLE TESTING

It is also to be appreciated that test device 2 can be used to test the function of cables 12.

More particularly, suppose it is desired to test the function of a specific cable 12D. In this case one end of cable 12D is disconnected from TE device 4D, to be thereafter connected to a first test device 2. This test device would be set up to emulate a TE device, i.e., it would have its device switch 606 placed into its "TE" position, and its error switch 604 placed into its "normal", or "history", position. At the same time, line select switch 302 would be placed into its "normal" position, line select switch 304 would be placed into its "normal" position, and line select switch 306 would be placed into its "normal" position. In addition, line interface switch 202 would be placed into its "terminate" position, and line interface switch 204 would be placed into its "terminate" position.

The other end of cable 12D is disconnected from NT device jack 10D and is connected to a second test device 2. This test device would be set up to emulate a NT device, i.e., it would have its device switch 606 placed into its "NT" position and its error switch 604 placed into its "normal", or "history", position. At the same time, line select switch 302 would be placed into its "normal" position, line select switch 304 would be placed into its "normal" position, and line select switch 306 would be placed into its "normal" position. In addition, line interface switch 202 would be placed into its "terminate" position, and line interface switch 204 would be placed into its "terminate" position.

Both units would then be powered up and the activation test commenced, with the cable 12D being connected to the RJ45 jack 102 of the "TE" emulating test device after this test device has tried to send out the INFO 1 signal. If cable 12D is functioning properly, both test units will indicate this by turning on their "OK" LED 1002. However, if cable 12D is not functioning properly, both test units will indicate this by turning on their "error" (or "glitch") LED 1004 and will thereafter continue to attempt to achieve activation.

In the event that cable 12D is not functioning properly, the test devices can be used to determine certain things about the nature of the malfunction in the cable. More particularly, the test devices can be used to determine whether the malfunction in the cable is due to (1) an inadvertent switching of wire Pair B with wire Pair C, (2) an inadvertent switching of Pins 3 and 6 within wire Pair B, (3) an inadvertent switching of Pins 4 and 5 of wire Pair C, or (4) a combination of the foregoing.

This determination is done as follows. At one (and only one) of the test devices, line select switch 302 is changed from its "normal" position to its "reversed" position. This has the effect of changing the wire connection matrix such that the outputs of wire Pair B coming into the test device are treated as wire Pair C, and the outputs of wire Pair C coming into the test device are treated as wire Pair B. The test devices are then used to test the cable again; if activation is now successfully achieved, it can be concluded that the cable has been improperly installed, with wire Pair B and wire Pair C being inadvertently mixed.

If the foregoing fails to achieve proper activation, line select switch 302 is returned to its "normal" position and line select switch 306 is changed from its "normal" position to its "reversed" position. This has the effect of changing the wire connection matrix such that the output of Pin 3 (within wire Pair B) coming into the test device is treated as Pin 6 (within wire Pair B) and the output of Pin 6 (within wire Pair B) coming into the test device is treated as Pin 3 (within wire Pair B). The test devices are then used to test the cable again; if activation is now successfully achieved, it can be concluded that the cable has been improperly installed, with Pins 3 and 6 within wire Pair B being inadvertently mixed.

If the foregoing fails to achieve proper activation, line select switch 306 is returned to its "normal" position and line select switch 304 is changed from its "normal" position to its "reversed" position. This has the effect of changing the wire connection matrix such that the output of Pin 4 (within wire Pair C) coming into the test device is treated as Pin 5 (within wire Pair C) and the output of Pin 5 (within wire Pair C) coming into the test device is treated as Pin 4 (within wire Pair C). The test devices are then used to test the cable again; if activation is now successfully achieved, it can be concluded that the cable has been improperly installed, with Pins 4 and 5 within wire Pair C being inadvertently mixed.

If the foregoing still fails to achieve proper activation, various setting combinations of line select switches 302, 304 and 306 can be tried; if and when activation is successfully achieved, the position of the line select switches at that point will indicate the nature of the cable fault.

If all of the foregoing fails to achieve activation, it can then be concluded that one or more of the wires of cable 12D are broken.

COMBINED DEVICE AND CABLE TESTING

It is also to be appreciated that one might combine the testing of a network device with the testing of an associated cable.

For example, suppose one wished to simultaneously test TE device 4D and cable 12D. In this case one might disconnect cable 12D at the NT device (not at the TE device) and try to achieve activation with the TE device in the manner previously described for testing the TE device. If activation is not successfully achieved with line select switches 302, 304 and 30 set in their "normal" positions, the positions of these switches could be changed in accordance with the foregoing cable testing procedure in an attempt to achieve activation of the TE device. If activation is successfully achieved through varying the positions of the line select switches, it will then be known that the TE device is functioning properly, but there are wire reversals in the cable, with the particular positions of the line select switches at the time activation is successfully achieved identifying the precise nature of the cable reversals. If activation cannot be achieved despite trying all of the possible combination settings of line select switches 302, 304 and 306, it will not be clear whether the fault lies with TE device 4D or cable 12D. In this case further direct testing of each device will be necessary.

Similarly, suppose one wished to simultaneously test NT device jack 10D and cable 12D. In this case one might disconnect cable 12D at the TE device (not at the NT device) and try to achieve activation with the NT device in the manner previously described for testing NT devices. If activation is not successfully achieved with line select switches 302, 304 and 306 set in their "normal" positions, the positions of these switches could be changed in accordance with the foregoing cable testing procedure in an attempt to achieve activation of the NT device jack. If activation is successfully achieved through varying the positions of the line select switches, it will be known that the NT device jack is functioning properly but there are wire reversals in the cable, with the positions of the line select switches at the time activation is successfully achieved identifying the precise nature of the cable reversals. If activation cannot be achieved despite trying all of the possible combination settings of line select switches 302, 304 and 306, it will not be clear whether the fault lies with NT device jack 10D or cable 12D. In this case further direct testing of each device will be necessary.

CABLE IDENTIFICATION

It is also possible to use one or more test devices 2 to identify which one of a plurality of cable ends is connected to a particular TE or NT device.

For example, suppose it is desired to determine which one of a plurality of cable ends (at the NT end) is connected to a particular TE device. In this case, that TE device would be set for activation, all of the remaining TE devices, deactivated, the test device would be set to NT mode and to simulation mode, and successive cable ends (at the NT end) connected to the test device's jack 102; when that cable end which is connected to the TE device set for activation is located, activation will be achieved and the test device will indicate this by turning on the OK LED 1002.

The same procedure could be used to determine which one of a plurality of cable ends (at the TE end) is connected to a particular NT jack. In this case, that NT jack would be set for activation, all of the remaining NT jacks deactivated, the test device would be set to its TE mode and to simulation mode, and successive cable ends (at the TE end) connected to the test device's jack 102; when that cable end which is connected to the NT jack set for activation is located, activation will be achieved and the test device will indicate this by turning on the OK LED 1002.

Alternatively, suppose it is desired to determine the location of the free end of a particular cable selected at the NT end. In this case, the test device could be set to NT mode and pulse mode, the selected cable end (at the NT end) connected to the test device's jack 102, and then successive cable ends (at the TE end) monitored by watching their attached TE devices to see which device is repeatedly activating/deactivating at preset intervals under the influence of the pulsing test device 2 positioned at the NT end. One interesting aspect of the present invention is that a second test device 2, configured to act in TE mode and simulation mode, could be employed at the TE end to successively test naked cable ends for identification, while the first test device 2 is operating in pulse mode at the end of a selected cable at the NT end.

Similarly, suppose it is desired to determine the location of the free end of a particular cable selected at the TE end. In this case, the test device would be set to TE mode and pulse mode, the selected cable end (at the TE end) connected to the test device's jack 102, and then successive cable ends (at the NT end) monitored by watching their attached NT ports to see which port is repeatedly activating/deactivating under the influence of the pulsing test device positioned at the TE end. One interesting aspect of the present invention is that a second test device 2, configured to act in NT mode and simulation mode, could be used at the NT end to successively test naked cable ends while the first test device 2 is operating in pulse mode at the end of a selected cable at the TE end.

MONITORING ISDN DATA EXCHANGE BETWEEN TE AND NT DEVICES

It is also to be appreciated that test device 2 can be used to monitor the ISDN data exchange between TE and NT devices.

For example, suppose one wishes to monitor the data being sent from TE device 4D to NT jack 10D. In this case, one would connect cable 16 (FIG. 10) between jack 6D of TE device 4D and RJ45 jack 102 of the test device 102, and one would connect cable 17 between NT jack 10D and RJ45 jack 104 of the test device 2. Test device 2 would have its device select switch 606 set to its NT position, mode switch 602 is toggled to select the test device's monitor mode, and error switch 604 is set to either its "normal", or "history", setting, or its "display" setting, depending on the degree of error reporting required. Line select switches 302, 304 and 306 are set for their normal position, and line interface unit switches 202 and 204 are set to their terminate positions.

During the activation procedure, test device 2 will pass signals entering jack 102 back out jack 104, and vice versa, monitoring the signals as they pass through jack 102, to monitor the activation procedure and the data contained in the signals, as hereinafter further described.

Thereafter, when the NT device sends out the INFO 0 signal, the INFO 0 signal is received in the test device's jack 104, passes through the test device and back out the test device's jack 102, to the TE device. Next, the TE device sends out the INFO 1 signal to the test device jack 102, whereupon the INFO 1 signal passes through the test device and back out its jack 104 to the NT device. The NT device then sends the INFO 2 signal back into jack 104 of the test device, whereupon the signal passes through the test device and back out its jack 102 to the TE device. The TE device then sends out the INFO 3 signal to the test device's jack 102, whereupon the signal passes through the test device and back out its jack 104 to the NT device. Lastly, the NT device sends the INFO 3 signal back into jack 104 of the test device, whereupon the signal passes through the test device and back out its jack 102 to the TE device. At this point the TE and NT devices are activated, with the test device 2 sitting transparently between the two devices and monitoring the data being sent from TE device 4D to NT jack 10D. This data activity is displayed on LED's 1012 and 1014 by the test device. Activation errors occurring during the activation procedure or during the subsequent data monitoring period (e.g. a line drop) are displayed in the manner previously described according the the setting of error switch 604.

Similarly, one could use the test device 2 to monitor the data being sent from NT jack 10D to TE device 4D. In this case, one would connect cable 16 between jack 10D of the NT device and RJ45 jack 102 of the test device; and one would connect cable 17 between jack 6D of the TE device 4D and RJ45 jack 104 of the test device. Test device 2 would have its device select switch 606 set to its TE position, mode select switch 602 is toggled to select the test device's monitor mode, and error switch 604 is set to either its "normal", or "history", setting or its "display" setting, depending on the degree of error reporting required. Line select switches 302, 304 and 306 are set to their "normal" positions, and line interface unit switches 202 and 204 are set to their terminate position.

During the activation procedure, test device 2 will pass signals entering jack 102 back out jack 104, and vice versa, monitoring the signals as they pass through jack 102, to monitor the activation procedure and the data contained in the signals, as hereinafter further described.

Thereafter, when the NT device sends out the INFO 0 signal, the INFO 0 signal is received in the test device's jack 102, passes through the test device and back out the test device's jack 104 to the TE device. Next, the TE device sends out the INFO 1 signal to the test device's jack 104, whereupon the signal passes through the test device and back out its jack 102 to the NT device. The NT device then sends the INFO 2 signal back into jack 102 of the test device, whereupon the INFO 2 signal passes through the test device and back out its jack 104 to the TE device. The TE device then sends out the INFO 3 signal to the test device's jack 104, whereupon the INFO 3 signal passes through the test device and back out its jack 102 to the NT device. Lastly, the NT device sends the INFO 4 signal back into jack 102 of the test device, whereupon the INFO 4 signal passes through the test device and back out jack 104 to the TE device. At this point the TE and NT devices are activated, with the test device 2 sitting transparently between the two devices and monitoring the data being sent from the NT jack 10D to TE device 4D. This data activity is displayed on LED's 1012 and 1014 by the test device. Activation errors occurring during the activation procedure or during the subsequent data monitoring period (e.g. a line drop) are displayed in the manner previously described according to the setting of error switch 604.

ADVANTAGES OF THE PRESENT INVENTION

Numerous advantages are obtained through using the present invention.

For one thing, the present invention provides a test device which is capable of determining if the RJ45 cabling of an ISDN network is installed consistently with the ISDN standards.

For another thing, the present invention provides a test device which is capable of determining if a particular TE device is coupled correctly to the RJ45 cabling of an ISDN network.

The present invention also provides a test device which is capable of determining if a particular NT device is coupled correctly to the RJ45 cabling of an ISDN network.

In addition, the present invention provides a test device which is capable of determining if a particular TE device on the ISDN network is operating consistently with the ISDN network standards.

And the present invention provides a test device which is capable of determining if a particular NT device on the ISDN network is operating consistently with the ISDN network standards.

Also, the present invention provides a test device which is low in cost, reliable in operation, and small and portable.

Furthermore, the present invention provides a test device which is capable of quickly and easily testing numerous TE devices on the ISDN network in rapid succession.

And the present invention provides a test device which is capable of quickly and easily testing numerous NT devices on the ISDN network in rapid succession.

In addition, the present invention provides a test device which is capable of determining if the cabling of an ISDN network is functioning properly and, if it is not, to determine certain things about the nature of the malfunction in the cable.

And the present invention provides a test device which is capable of quickly and easily identifying which one of a plurality of cable ends is connected to a particular TE or NT device.

Furthermore, the present invention provides a test device which is capable of repeatedly, automatically testing activation of a particular TE or NT device suspected of intermittent malfunction and reporting the existence of such malfunction.

Also, the present invention provides a test device which is capable of monitoring an ISDN data exchange between a particular TE device and a particular NT device and displaying information regarding the same to the user. And the present invention provides a test device which is capable of being connected to either a TE or NT device and which is capable of looping back to that device data originating at that device.

APPENDIX A

```
.TITLE "ISDN BASIC RATE INTERFACE MAIN ROUTINE "
;************************************************************
;                           BRITE1
; Functions provided :
;                     * TE / NT mode selection
;                     * Line Activate / Monitor selection
;                     * Pulse Activate / Normal selection
;                     * Glitch detection and glitch LED
;                     * 2 Line Status LEDS
;                     * Battery ,NT and Phantom power LED indicators
;                     * Tx/Rx pair reversal selection
;                     * Tx line reversal selection
;                     * Rx line reversal selection
;                     * Tx/Rx line termination selection
;
;    REV 1.2   (2/16/90)
;         * Lengthen the duration of Pulse Mode
;         * Clear Glitch LED while waiting for activation if the Error switch
;           is in Latch Mode.
;         * Check for NT already sending Info 2 to the TE
;    REV 1.3  (3/15/90)
;         * Put B channels in remote loopback mode after activation
;    REV 1.4  (4/5/90)
;         * Put in RS232 support
;
;************************************************************
.LIST

.EJECT
;********************      START      ************************

.ORG 0000H              ;STARTING ADDRESS OF POWER UP
ZSTART
              LJMP  ZSTARTUP

.ORG 03H                ;EXTERNAL INTERRUPT 0
              LCALL   SERV_ISAC       ; ISAC INTERRUPT
              RETI

.ORG 0BH                ;TC 0 INTERRUPT VECTOR
              RETI

.ORG 13H                ;EXTERNAL INTERRUPT 1
              RETI

.ORG 01BH               ;TC 1 INTERRUPT VECTOR
              RETI

.ORG 23H                ;SERIAL PORT INTERRUPT
              RETI

ZSTARTUP
              CLR   EA                ; DISABLE INTERRUPTS
              MOV   SP,#60H           ;SET STACK POINTER AT 60H
              MOV   20H,#00H          ; CLEAR FIRST BYTE OF FLAGS

LCALL INIT_ISAC

CLR   MODESELECTED      ; CLEAR MODE INDICATE FLAG
              MOV   MODE,#SIM_MODE    ; SELECT FIRST MODE

MOV   B1_CNT,#B1_CNT_MAX
              MOV   B2_CNT,#B2_CNT_MAX

MOV   B1_HIS,#0FFH      ; FIRST B1 DATA
              MOV   B2_HIS,#0FFH      ; FIRST B2 DATA

LCALL BAUDRATE          ; SETUP BAUDRATE GENERATOR
```

; TEST LEDS BY Sequencing LEDs ON and OFF

```
                CLR     OK_LED          ; OK LED ON
                LCall   ZWAIT
                SETB    OK_LED          ; OK LED OFF CLR     GLITCH_LED      ; GLITCH LED ON
                LCALL   ZWAIT
                SETB    GLITCH_LED      ; GLITCH LED OFF CLR     STAT0_LED       ; STAT0 LED ON
                LCALL   ZWAIT
                SETB    STAT0_LED       ; STAT0 LED OFF CLR     STAT1_LED       ; STAT1 LED ON
                LCALL   ZWAIT
                SETB    STAT1_LED       ; STAT1 LED OFF ;******************* SELECT AND FLASH MODE ****************************
                MOV     A,P1            ; READ CURRENT SWITCH SETTINGS
                ANL     A,#11100000B    ; MASK ALL BUT SWITCHES
                MOV     SWITCHIMAGE,A   ; SAVE IT FLASH_MODE
                MOV     R7,#05          ; LOOP COUNT
SWT_WAIT
                LCALL   READSWITCH      ; CHECK FOR CHANGE AND ACT ON IT
                                        ; MODE CHANGE JMPS BACK TO FLASH_MODE
                ; @@ TURN LED ON HERE
                LCALL   ZWAIT           ; DELAY
                LCALL   MODELED_ON

LCALL   READSWITCH      ; CHECK FOR CHANGE

; @@ TURN LED OFF HERE
                LCALL   ZWAIT
                LCALL   MODELED_OFF

DJNZ    R7,SWT_WAIT

LCALL   MODELED_ON      ; LEAVE IT ON

;************************ MAIN ROUTINE *************************************
MAINSTR

;********************** LINE ACTIVATION ROUTINE ****************************
LINEACT
                CLR     LINEUP          ; CLEAR INDICATION OF LINE
                                        ; BEING UP
                MOV     DPTR,#TIMR

MOV     A,MODE
                CJNE    A,#HON_MODE,CHK_TENT
                CLR     RELAY           ; TURN ON RELAY (OPEN)

; CHECK IF (TE OR NT) MODE IS SELECTED
CHK_TENT
                JB      NT_TE_SWT,JMP_NT  ; CHECK IF TE OR NT IS SELECTED

LJMP    TE_MODE         ; GO TO TE LINE ACTIVATION ROUTINE
JMP_NT          LJMP    NT_MODE         ; GO TO NT LINE ACTIVATION ROUTINE

;*******
TE_MODE
        LCALL   CLRLEDS                 ; TURN OFF ALL INDICTORS LEDS EXCEPT
                                        ; GLITCH LED
```

```
              LCALL    INIT_ISAC              ; RESET AND INIT ISAC REGISTERS

; IF PULSE ACT SELECTED THEN WAIT 230MS BEFORE STARTING ACT
              MOV      A,MODE                 ; DELAY IF PULSE MODE OS SELECTED
              CJNE     A,#PULSE_MODE,TE_CONT
              LCALL    ZWAIT                  ; THEN DELAY

TE_CONT
              SETB     TESEL                  ; SET TE MODE SEL FLAG
              CLR      NTSEL                  ; CLEAR NT MODE SEL FLAG
              CLR      TIMEOUT   ; CLEAR TIMEOUT CONDITION

LJMP     TE_LINEACT

;*******
NT_MODE

LCALL    CLRLEDS                ; TURN OFF ALL LEDS

LCALL    INIT_ISAC              ; RESET AND INIT ISAC REGISTERS

; IF PULSE ACT SELECTED THEN WAIT 230MS BEFORE STARTING ACT

MOV      A,MODE                 ; CHECK IF PULSE MODE SELECTED
              CJNE     A,#PULSE_MODE,NT_CONT
              LCALL    ZWAIT                  ; DELAY 230MS

NT_CONT
              MOV      DPTR,#SPCR             ; POINT TO SERIAL PORT CONTROL REG
              MOV      A,#SPM                 ; SERIAL PORT TIMING = NT
              MOVX     @DPTR,A                ; WRITE ISAC

SETB     NTSEL                  ; SET NT MODE SEL FLAG
              CLR      TESEL                  ; CLEAR TE MODE SELECT FLAG
              CLR      TIMEOUT   ; CLEAR TIMEOUT CONDITION

LJMP     NT_LINEACT             ; JUMP TO NT LINE ACTIVATION ROUTINE

;*****************************************************************************
; RETURN HERE AFTER SUCCESSFUL LINE ACTIVATION
ACT_RET
              ; CHECK WHICH MODE WAS SELECTED

MOV     A,MODE           ; READ IN MODE
       CJNE    A,#SIM_MODE,MODE1 ; CHECK FOR SIMULATION MODE
       LJMP    SIMULATE
MODE1
       CJNE    A,#MON_MODE,MODE2     ; CHECK FOR MONITOR MODE
       LJMP    MONITOR
MODE2
       CJNE    A,#LPBK_MODE,MODE3    ; CHECK FOR LOOPBACK MODE
       LJMP    LOOPBACK
MODE3
       LJMP    PULSE                 ; GO TO PULSE MODE PROCEDURE

.END

.TITLE "ISDN BASIC BATE INTERFACE TE  ACTIVATION PROCEDURE"

; *************************** TE ACTIVATION ***********************************

TE_LINEACT
              ; ACTIVATE TE MODE
              ; FIRST PRESET ISAC AND CHECK FOR INFO 0 **************
TEACT
              MOV      DPTR,#SPCR             ; POINT TO SERIAL PORT CONTROL REG
              MOV      A,#SPU                 ; SOFTWARE POWER BIT SET
              MOVX     @DPTR,A                ; WRITE ISAC
```

```
WAIT4PU
          LCALL    WAIT4CIC              ; WAIT FOR A CHANGE IN C/I CODE
          JB       TIMEOUT,WAIT4PU       ; WAIT 4 NT CLOCK TO BE PRESENT

LCALL    RDCICODE              ; READ THE RX COMMAND FROM ISAC

CJNE     A,#PU,TEACT           ; TRY AGAIN *********************

; SEND INFO 1 TO NT ******************

; SEND ACTIVATE REQUEST AND PRIORITY 8
          MOV      A,#AR8                ; SET ACT REQ AND PRIORITY 8
          LCALL    TXCIXR                ; SEND OUT C/I CODE

; CLEAR SPU BIT AND ACTIVATE INFO 1 OUT
          MOV      DPTR,#SPCR            ; POINT TO SERIAL PORT CONTROL REG
          MOV      A,#CSPU               ; LOAD IN CLEAR VALUE
          MOVX     @DPTR,A               ; WRITE ISAC TO SEND INFO 1

; CHECK IF WE ARE IN MONITOR MODE
          ; IN TE MONITOR MODE WE CAN ONLY SEE RX INFO 2 AND 4
          ; SO DON'T SHOW TX INFO 1 AND 3

MOV      A,MODE                ; READ MODE
          CJNE     A,#MON_MODE,DISP_1    ; IF NOT GO AHEAD AND TURN ON LED
          LJMP     CHK4_2                ; SKIP DISPLAY AND CONTINUE
DISP_1
          MOV      A,#INFO1              ; DISPLAY INFO 1 SENT *************
          LCALL    DISPSTAT
CHK4_2
          ; CHECK HERE IF NT IS ALREADY SENDING INFO 2 TO TE (US)
          LCALL    RDCICODE              ; READ INDICATION
          CJNE     A,#NTRDY,WAIT4NT      ; NOT HERE YET

LJMP     WAITINFO2

; WAIT HERE FOR NT TO RESPOND
WAIT4NT
          ; CHECK IF ERROR MON SWITCH IS IN MON MODE. IF YES, THEN CLEAR GLT
          JNB      M_A_SWT,CHK4TESWT
          SETB     GLITCH_LED            ; TURN GLIITCH LED OFF
CHK4TESWT
          ; ALSO CHECK IF SWITCHES (MODE) HAVE CHANGED TO NT MODE
;         JB       NT_TE_SWT,GO2_MAIN    ; GUESS WHAT? SOMEONE CHANGE THE MODE S
WITCH
          LCALL    READSWITCH
          LJMP     CHKNTRDY

GO2_MAIN
          LCALL    BWAIT
          LCALL    BWAIT                 ; LET SWITCH SETTLE
          LJMP     MAINSTR               ; GO BACK TO BEGINING

CHKNTRDY
          ; CHECK FOR NT READY
          LCALL    WAIT4CIC              ; WAIT FOR A CHANGE IN C/I CODE

JB       TIMEOUT,WAIT4NT       ; JUMP TO ERROR ROUTINE ON TIMEOUT
          LCALL    RDCICODE              ; READ THE RX COMMAND FROM NT

CJNE     A,#NTRDY,REPORT_ERR1  ; CHECK FOR NT READY FROM NT
          LJMP     WAITINFO2

REPORT_ERR1
          LJMP     INFO1ERR

WAITINFO2
          ; CHECK FOR SWITCH CHANGE HERE ALSO
;         JB       NT_TE_SWT,GO2_MAIN    ; IF NOW NT MODE GET OUT OF HERE
          LCALL    READSWITCH

; CHECK FOR INFO 2 FROM NT
          LCALL    WAIT4CIC              ; WAIT FOR A CHANGE IN C/I CODE
          JB       TIMEOUT,WAITINFO2     ; JUMP TO ERROR ROUTINE ON TIMEOUT
```

```
                LCALL       RDCICODE                ; READ THE RX COMMAND FROM THE NT

CJNE        A,#ARD,INFO2FAIL        ; JUMP TO ERROR ROUTINE IF NOT EQUAL
                LJMP        INFO2_HERE
INFO2FAIL
                LJMP        INFO2ERR

INFO2_HERE

MOV         A,#INFO2
                LCALL       DISPSTAT                ; DISPLAY INFO 2 RECEIVED ************

; CHECK IF IN TE MONITOR MODE
                MOV         A,MODE
                CJNE        A,#MON_MODE,DISP_3      ; NOT MON SO DISPLAY 3

LJMP        WAITINFO4               ; SKIP DISPLAY

DISP_3
                ; INFO 3 IS AUTOMATICLY SENT TO NT BY ISAC
                MOV         A,#INFO3                ;
                LCALL       DISPSTAT                ; DISPLAY INFO 3 SENT ****************

WAITINFO4
                ; CHECK FOR NT READY

;               LCALL       WAIT4CIC    ; WAIT FOR A CHANGE IN CODE          ;###
;               JB          TIMEOUT,WAITINFO4 ; JUMP TO ERROR ROUTINE ON ERROR ;###
                                                                              ;###
;               LCALL       RDCICODE    ; READ THE RX COMMAND FROM THE NT     ;###
                                                                              ;###
;               CJNE        A,#NTRDY,INFO3ERR ; CHECK FOR NT READY FROM NT    ;###

WAITSYNC
                ; CHECK FOR INFO 4 SENT BY THE NT

LCALL       WAIT4CIC                ; WAIT FOR A CHANGE IN C/I CODE
                JB          TIMEOUT,WAITSYNC        ; JUMP TO ERROR ROUTINE ON ERROR

LCALL       RDCICODE                ; READ THE RX COMMAND FROM THE NT

CJNE        A,#AI8,REPORT_ERR4      ; CHECK FOR INFO4 FROM NT
                LJMP        OKACT

REPORT_ERR4
                LJMP        INFO4ERR

OKACT
                MOV         A,#CLRSTAT              ; CLEAR LED
                LCALL       DISPSTAT                ; CLEAR STATUS DISPLAY    *************
*

CLR         OK_LED                  ; TURN ON LINE ACTIVATED LED    *****
                SETB        LINEUP                  ; SET LINE ACTIVATED INDICATION

LJMP        ACT_RET                 ; RETURN TO MAIN MODULE

.END

.TITLE "ISDN BASIC RATE INTERFACE NT ACTIVATION PROCEDURE"

.EJECT
; *********************** NT ACTIVATION **************************************
;ACTIVATE NT MODE

NT_LINEACT

; WAIT FOR RECEIVED INFO 1 FROM TE
WAIT4TE
                ; CHECK IF ERROR MON SWITCH IS IN MON MODE. IF YES, CLEAR GLT LED
                JNB         M_A_SWT,CHK4NTSWT
                SETB        GLITCH_LED              ; TURN OFF LED
```

```
CHK4NTSWT
            ; ALSO CHECK FOR A CHANGE IN SWITCH MODES HERE
;           JNB     NT_TE_SWT,GO_MAIN   ; GUESS WHAT? SOMEONE CHANGED THEIR MIND

LCALL   READSWITCH
            LJMP    WAIT4INFO1
; GO_MAIN
;           LCALL   BWAIT               ; LET SWITCH SETTLE
;           LCALL   BWAIT
;           LJMP    MAINSTR             ; START OVER AGAIN
WAIT4INFO1
            LCALL   WAIT4CIC ; WAIT FOR A CHANGE IN C/I CODE
            JB      TIMEOUT,WAIT4TE ; WAIT FOR A TE COMMAND

LCALL   RDCICODE            ; READ COMMAND CODE SENT BY TE

CJNE    A,#ARU,WAIT4TE   ; WAIT FOREVER FOR TE ********************

MOV     A,#INFO1            ; TURN ON INFO1 LED ******************
            LCall   DISPSTAT ; SEND INFO 2 BACK TO TE
;           MOV     A,#ARD ; SEND INFO 2 TO TE COMMAND
;           LCALL   TXCIXR              ; TX COMMAND TO TE

; CHECK IF MONITOR MODE IS SELECTED

; IF YES, THEN DON'T DISPLAY TX INFO 2 AND 4

MOV     A,MODE
            CJNE    A,#MON_MODE,DISP_2  ; NOT MON SO DISPLAY INFO 2
            LJMP    WAITINFO3           ; SKIP DISPLAY
DISP_2
            MOV     A,#INFO2            ; TURN ON INFO 2 LED
            LCALL   DISPSTAT            ; TURN ON INFO 2 LED *****************

WAITINFO3
            ; WAIT FOR INFO 3 FROM TE
;           LCALL   WAIT4CIC            ; WAIT FOR A CHANGE IN CODE
;           JB      TIMEOUT,WAITINFO3 ; JMP TO INFO 3 ERROR IF NO RESPONSE

;           LCALL   RDCICODE            ; READ C/I COMMAND CODE

;           CJNE    A,#AIU,INFO3ERR ; JMP TO INFO 3 ERROR IF WRONG COMMAND

MOV     A,#INFO3    ; CLEAR LED
;           LCALL   DISPSTAT    ; TURN ON INFO3 LED *****************
;
            ; SEND INFO 4 TO TE AND WAIT FOR RESPONSE
;           MOV     A,#AI               ; LOAD INFO 4 COMMAND
;           LCALL   TXCIXR              ; SEND INFO 4 COMMAND

; ???????????????????
            ; SHOULD I SKIP DISPLAY OF INFO 4 IN MONITOR MODE ?

MOV     A,#CLRSTAT          ; CLEAR LEDS
            LCALL   DISPSTAT            ; TURN INFO 4 LED ******************

WAITAIU:
            LCALL   WAIT4CIC ; WAIT FOR A CHANGE IN CODE
            JB      TIMEOUT,WAITAIU ; JMP TO ERROR IF TIMED OUT

LCALL   RDCICODE ; READ C/I CODE

CJNE    A,#AIU,INFO4ERR ; CHECK FOR ACTIVATION COMMAND FROM TE

CLR     OK_LED      ; TURN ON LINE ACTIVATED LED    *****
            SETB    LINEUP      ; SET LINE ACTIVATED INDICATION

LJMP    ACT_RET     ; RETURN TO MAIN MODULE

.END
```

.TITLE "ISDN BASIC BATE INTERFACE POST ACTIVATION PROCEDURE"

POST_ACT

; CHECK TO SEE THAT WE'RE STILL ACTIVATED

```
CHECKACT
;           LCALL     WAIT4CIC            ; WAIT FOR A CHANGE IN CODE
;           JB        TIMEOUT,CHKSWT      ; NO CHANGE SO CHECK SWITCHES

LCALL     RDCICODE  ; READ C/I CODE
;           CJNE      A,#AI8,LINEDROPED   ; CHECK IF LINE DROPPED OUT

CJNE      A,#AIU,CHKACT8      ; CHECK FOT NT LINE SYNC SENSE
            LJMP      YES_UP
CHKACT8
            CJNE      A,#AI8,CHK410       ; CHECK FOR TE ACT 8
            LJMP      YES_UP
CHK410
            CJNE      A,#AI10,CHK4RDY     ; CHECK FOR TE AI 10
            LJMP      YES_UP
CHK4RDY
            CJNE      A,#RSY,LINEDROPED   ; CHECK FOR RSY ELSE NO ACTIVATION
            LJMP      YES_UP

YES_UP
```

; CHECK TO SEE IF THE SWITCHES HAVE CHANGED POSITION

```
CHKSWT
            LCALL     READSWITCH

EXIT2MODE
            ; CHECK WHICH MODE WE ARE IN
            MOV       A,MODE
            CJNE      A,#SIM_MODE,EXIT1   ; CHECK FOR SIMULATION MODE
            LJMP      SIM_RET             ; NO ERROR RETURN
EXIT1
            CJNE      A,#MON_MODE,EXIT2   ; CHECK FOR MONITOR MODE
            LJMP      MON_RET             ; NO ERROR RETURN

EXIT2
            CJNE      A,#LPBK_MODE,EXIT3  ; CHECK FOR LOOP BACK MODE
            LJMP      LPBK_RET
EXIT3
            LJMP      PULSE_RET
```

; **************** SWITCH AND LINE ERROR ROUTINE ****************

```
;STARTAGAIN
;           SETB      GLITCH_LED          ; TURN OFF GLITCH LED
;           LCALL     BWAIT               ; LET SWITCHES SETTLE BEFORE SAVING THEM
;           LCALL     BWAIT
;           LJMP      MAINSTR             ; GO TO BEGINING AND START AGAIN

LINEDROPED
            ; TURN ON GLITCH LED AND OK LED OFF
            CLR       LINEUP              ; CLEAR LINE ACTIVATED INDICATION
            CLR       IE.7                ; DISABLE INTERRUPTS

CLR       GLITCH_LED          ; TURN ON GLITCH LED
            SETB      OK_LED              ; TURN OFF LINE ACT OK LED
            SETB      STAT0_LED           ; TURN OFF STATUS/B1 INDICATORS
            SETB      STAT1_LED

MOV       FLASHCODE,A         ; SAVE ERROR INDICATION

LCALL     INIT_ISAC           ; CLEAR THE ISAC
JMP4
            ; Check if error latch is selected
            JNB       M_A_SWT,REACT       ; 1 = ERROR Flash
            LCALL     READSWITCH ;@@??    ; 0 = Normal return to activation
```

```
                ; FLASH ERROR
                LCALL   FLASH                   ; SPUD FLASH RX INDICATION AND RETURN
                LJMP    JMP4                    ; DISPLAY ERROR FOR TEST

REACT
                ; START ACTIVATION OVER AGAIN
                LCALL   BWAIT                   ; LET SWITCHES SETTLE
                LCALL   READSWITCH

JNB     TESEL,BK_NT_ACT         ; GO BACK TO NT ACTIVATION
                LJMP    TE_MODE                 ; START TE ACTIVATION OVER AGAIN
BK_NT_ACT
                LJMP    NT_MODE                 ; START NT ACTIVATION OVER AGAIN

.END

.TITLE "ISDN BASIC BATE INTERFACE ERROR HANDLER "

.EJECT
;********************* INFO ERRORS ******************************************
; We enter here when the wrong indication was Rx during the activation sequence.
;
;ErrStr:
;       Check if Err MON switch is selected
;           NO
;               Turn ON Glitch LED
;               Check if TE or NT mode
;                   If NT then return to NT start
;                   If TE then return to TE start
;           YES
;               Leave Info state status ON for 2 Sec on S1 and S2 LEDS
;               Turn all LEDs OFF
;               Flash the error indication
;               Goto ErrStr
;****************************************************************************
ERRORS INFO0ERR                                        ; INFO 0 ERR
INFO1ERR                                        ; INFO 1 ERR
INFO2ERR                                        ; INFO 2 ERR
INFO3ERR                                        ; INFO 3 ERR
INFO4ERR                                        ; INFO 4 ERR
DROPERR                                         ; LINE DROPED ERROR

MOV     FLASHCODE,A             ; LOAD ERROR INDICATION TO FLASH

; CHECK IF ERROR MON IS SELECTED
ERRSTR
                JNB     M_A_SWT,STR_OVER        ; IF NOT SELECT START ACTIVATION OVER

; DELAY LEAVING STATUS ON THE LEDS
                LCALL   ZWAIT5
                LCALL   ZWAIT5
                LCALL   ZWAIT5

LCALL   LEDSOFF

MOV     A,FLASHCODE             ; LOAD ERROR INDICATION
                LCALL   FLASH                   ; FLASH THE RX CODE IN ACC

MOV     A,STATHIS               ; RESTORE FAILING STATE
                LCALL   DISPSTAT                ; GO DISPLAY STATE AGAIN

; CHECK IF ANY OTHER SWITCH HAS CHANGE (MODE)
                LCALL   READSWITCH
                CJNE    A,SWITCHIMAGE,STR_BEGIN

LJMP    ERRSTR                  ; LOOP UNTIL SWITCH CHANGE

STR_OVER
                ; TURN OFF GLITCH LED
                SETB    GLITCH_LED

; CHECK WHICH MODE THE ERROR OCCURED AND RETURN TO LINE ACT
                JB      TESEL,BACK2TEStr        ; GO BACK TO TE LINE ACT ROUTINE
                LJMP    NT_LINEACT              ; GO BACK TO NT LINE ACT ROUTINE
```

```
BACK2TEStr
            LJMP     TE_LINEACT

STR_BEGIN                              ; IF SWITCHES CHANGE DURING ERROR LOOP
            SETB     GLITCH_LED        ; TURN OFF GLITCH LED
            LCALL    BWAIT
            LCALL    BWAIT
            LCALL    MAINSTR

.END

.TITLE "ISDN BASIC BATE INTERFACE MODE ROUTINES"

;*********************** SIMULATE ROUTINE ********************************
SIMULATE
            ; GO DO THE POST ACTIVATION CHECKS
        LJMP    POST_ACT

; COME BACK HERE AFTER THE CHECKS
SIM_RET
        LJMP    SIMULATE              ; DO IT AGAIN

.EJECT
;*********************** MONITOR ROUTINE ********************************
MONITOR
            ; SETUP
;           LCALL    LEDSOFF           ; TURN OFF STATUS LEDS
;           SETB     GLITCH_LED        ; TURN OFF GLITCH LED

;           MOV      DPTR,#MONMSG
;           LCALL    SMSG

; OPEN THE RELAY
            CLR      RELAY             ; TURN ON THE RELAY (OPEN TX/RX)

; SETUP THE ISAC AND 8031 FOR B CHANNEL MONITORING
            LCALL    SETUP_INT

MON_STR
            LJMP     POST_ACT
MON_RET
            LJMP     MON_STR           ; DO IT AGAIN

;*************************************************************************
;     THIS MONITOR PROCEDURE ALSO WORKS

MONSTR

; READ RX CODE
RDRXCODE
            LCALL    RDCICODE          ; READ CURRENT C/I CODE
            LJMP     YES_ACT           ; ACTIVATED AS A NT
CHKACT8
            CJNE     A,#AI8,CHKACT10
            LJMP     YES_ACT           ; CHECK FOR ACT 8 (TE MODE)

CJNE     A,#AI10,CHKRDY
            LJMP     YES_ACT           ; CHECK FOR ACT 10 (TE MODE)
CHKRDY
            CJNE     A,#RSY,NO_ACT
            LJMP     YES_ACT           ; IF NOT RSY THEN NO ACTIVATION
NO_ACT                                 ; (TE MODE)
            CLR      IE.7              ; DISABLE INTERRUPTS (NO B1& B2 LED)
            SETB     OK_LED            ; TURN OFF OK LED
            SETB     STAT0_LED         ; TURN OFF DATA INDICTORS
            SETB     STAT1_LED         ; TURN OFF

JNB      LINEUP,CHK_SWT    ; IF IT WAS UP BEFORE
            CLR      GLITCH_LED        ; TURN ON GLITCH LED  (ONLY FIRST TIME
```

```
            CLR     LINEUP
            LJMP    CHK_SWT

YES_ACT
            CLR     OK_LED              ; TURN ON OK LED
            SETB    LINEUP
            SETB    IE.7                ; ENABLE MONITOR INTERRUPTS

CHK_SWT
            ; CHECK IF SWITCHES HAVE CHANGED
            LCALL   READSWITCH

MON_LOOP
            LJMP    MONSTR              ; DO IT AGAIN

;********************* LOOPBACK MODE ****************************************
LOOPBACK
            LCALL   SETUP_INT

LPBK_STR
            LJMP    POST_ACT            ; GO CHECK SWITCHES IN POST ACTIVATE ROUTINES

LPBK_RET
            LJMP    LPBK_STR            ; DO IT AGAIN

;********************** PULSE MODE *****************************************
PULSE
            ; CHECK SWITCHES AND ACTIVATION
            LJMP    POST_ACT

PULSE_RET
            LCALL   ZWAIT               ; LEAVE LINE UP FOR A SECOND
            LCALL   ZWAIT

JB      NT_TE_SWT,NT_PULSE
            LJMP    TE_MODE             ; START TE ACTIVATION OVER

NT_PULSE
            LJMP    NT_MODE             ; START NT ACTIVATION OVER

.TITLE "ISDN BASIC RATE INTERFACE SUBROUTINES "

;***************************************************************************

;********************** DELAY SUBROUTINE ***********************************
ZWAIT
            MOV     B,A                 ; SAVE ACC

MOV     R6,#0FFH            ; DELAY FOR 230 MS
ZWAIT1      MOV     A,#0FFH

ZWAIT2      DEC     A
            CJNE    A,#00H,ZWAIT2
            DJNZ    R6,ZWAIT1

MOV     A,B                 ; RESTORE ACC

RET

;********************** DELAY FOR .5 SEC ***********************************
ZWAIT5
            LCALL   ZWAIT
            LCALL   ZWAIT
            RET

;***************** KEYBOARD DELAY SUBROUTINE *******************************
BWAIT
            MOV     B,A                 ; SAVE ACC
            MOV     R6,#070H            ; DELAY FOR 100 MS
BWAIT1      MOV     A,#0FFH
```

```
BWAIT2       DEC   A
             CJNE  A,#00H,BWAIT2
             DJNZ  R6,BWAIT1
             MOV   A,B                ; RESTORE ACC
             RET
```

;******************** DISPLAY ERROR SUB ******************************
FLASH
            ; FLASH INFO LEDS WITH AN ERROR CODE

```
             MOV    A,FLASHCODE       ; LOAD IN ERROR INDICATION
             LCALL  LOOK_UP           ; LOOK UP ISAC ERROR AND PUT OUT OWN ERROR CODE

DISERR
             LCALL  ZWAIT
             LCALL  INDICATE          ; DISPLAY STATUS

LCALL  ZWAIT  ; DELAY
             LCALL  LEDSOFF

LCALL  ZWAIT  ; DELAY
             LCALL  INDICATE

LCALL  ZWAIT
             LCALL  LEDSOFF

LCALL  ZWAIT
             LCALL  INDICATE

LCALL  ZWAIT
             LCALL  LEDSOFF

LCALL  ZWAIT
             LCALL  INDICATE

LCALL  ZWAIT
             LCALL  LEDSOFF

RET
```

; ****************** WAIT FOR CHANGE IN COMMAND SUB ****************
```
WAIT4CIC
             CLR    TIMEOUT           ; CLEAR TIME OUT INDICATION
             MOV    R7,#02            ; EXTERNAL LOOP CNT

CICWAIT0     MOV    R6,#0FFH          ; INTERNAL LOOP COUNT

CICWAIT1     MOV    DPTR,#ISTA        ; POINT TO INTERRUPT FLAGS

MOVX   A,@DPTR           ; READ INTERRUPT FLAGS
             ANL    A,#CIC            ; CHECK FOR C/I CHANGE IN CODE
             JNZ    CMDDETECT         ; COMMAD INDICATION DETECTED SO EXIT

DJNZ   R6,CICWAIT1       ; CHECK IF WAIT IS DONE
             DJNZ   R7,CICWAIT0

SETB   TIMEOUT           ; HERE WHEN COMMAND NOT DETECTED
CMDDETECT
             RET                      ;
```

; **************** READ COMMAND SUB ********************************
```
RDCICODE
             MOV    DPTR,#CIRR        ; POINT TO RX COMMAND REG
             MOVX   A,@DPTR           ; READ THE COMMAND

RR     A                 ; SHIFT BYTE OVER RIGHT TWICE
```

```
                    RR      A

ANL     A,#CODRMASK         ; MASK OUT UPPER NIBBLE

RET                         ;

;********************* TX COMMAND SUB *****************************************
TXCIXR
                    MOV     DPTR,#CIXR          ; POINT TO COMMAND TX REG
                    RL      A                   ; SHIFT COMMAND OVER LEFT TWICE
                    RL      A

ORL     A,#TBC              ; SET TIC BUS CONTROL BIT IN CIXR REG

MOVX    @DPTR,A             ; WRITE THE TX CODE

RET

;********************* DEACTIVATE THE S INTERFACE ****************************
DEACTIVE
                    RET                         ; FOR NOW

;********************* TURN INFO LEDS OFF *************************************
                    ; CLEAR ALL LEDS EXCEPT GLITCH LED
CLRLEDS
                    SETB    P1.0
                    SETB    P1.2
                    SETB    P1.3

RET

;********************* TURN ALL LEDS OFF **************************************
LEDSOFF
                    SETB    P1.0
                    SETB    P1.1
                    SETB    P1.2
                    SETB    P1.3

RET
;********************* DISPLAY STATUS LEDS ************************************
DISPSTAT
                    MOV     STATHIS,A           ; SAVE STATUS STATE FOR ERROR INDICATIONS
                    MOV     B,A                 ; SAVE ACC

ANL     A,#01               ; CHECK IF FIRST STAT BIT IS ON
                    JZ      STAT0OFF
                    CLR     STAT0_LED           ; YES, TURN ON STAT 0 LED

SJMP    DISPNXT
STAT0OFF
                    SETB    STAT0_LED           ; NO, TURN STAT 0 LED OFF

DISPNXT
                    MOV     A,B                 ; RESTORE ACC
                    ANL     A,#02               ; CHECK IF SECOND STAT BIT IS ON
                    JZ      STAT1OFF
                    CLR     STAT1_LED           ; YES, TURN ON STAT 1 LED

SJMP    DISPEXT
STAT1OFF
                    SETB    STAT1_LED           ; NO, TURN STAT 1 LED OFF
DISPEXT
                    MOV     A,B                 ; RESTORE ACC

RET

;********************* DISPLAY LINE INDICATION ********************************
INDICATE
                    MOV     B,A                 ; SAVE ACC
                    CPL     A                   ; Active low LEDS
                    ORL     A,0E0H              ; SET UPPER BITS TO ONES BECSAUSE THEY'RE INPUTS
                    ANL     A,#0EFH             ; MASK OFF ISAC RESET LINE =0 (NO RESET)
                    MOV     P1,A                ; WRITE PORT 1
                    MOV     A,B                 ; RESTORE ACC
```

```
                RET

;********************** READ SWITCH SETTING **********************************
READSWITCH
                MOV     A,P1                ; READ PORT IN
                MOV     TB1,A               ; SAVE IT HERE ALSO

;               ANL     A,#11100000B        ; CLEAR OUT ALL BUT SWITCH INDICATIONS
;               ANL     A,#10000000B        ; CHECK ONLY FOR TE/NT MODE SWITCH CHANGING
;               ANL     A,#10100000B        ; CHECK ONLY TE/NT MODE SWITCH AND MODE SWITCH

MOV     B,SWITCHIMAGE       ; READ IN SWITCH IMAGE

; CHECK IF TE/NT SWITCH HAS CHANGED
                ANL     A,#10000000B        ; MASK OUT ALL OTHER BITS
                ANL     B,#10000000B        ; MASK OUT SWITCHIMAGE
                CJNE    A,B,DEVICE_CHG

; CHECK IF ERROR SWITCH CHANGED
                MOV     A,TB1               ; RESTORE CURRENT READING
                MOV     B,SWITCHIMAGE       ; RESTORE IMAGE
                ANL     A,#01000000B        ; MASK
                ANL     B,#01000000B
                CJNE    A,B,ERROR_CHG

; CHECK IF MODE SWITCH CHANGED
                MOV     A,TB1               ; RESTORE CURRENT READING
                MOV     B,SWITCHIMAGE       ; RESTORE IMAGE
                ANL     A,#00100000B        ; MASK
                ANL     B,#00100000B
                CJNE    A,B,MODE_CHG

; NO CHANGED SO JUST RETURN
                RET

DEVICE_CHG
                ; TE/NT SWITCH CHANGE IS NOT ALLOWED
                CLR     IE.7                ; DISABLE INTERRUPTS
                LCALL   INIT_ISAC
                LCALL   LEDSOFF             ; TURN OFF STATUS LEDS

LP_FOREVER
                ; TURN ON/OFF ALL THE MODE LEDS FOREVER HERE
                CLR     SIM_LED
                CLR     MON_LED
                CLR     LPBK_LED
                CLR     PULSE_LED

LCALL   ZWAIT5

SETB    SIM_LED
                SETB    MON_LED
                SETB    LPBK_LED
                SETB    PULSE_LED

LCALL   ZWAIT5

LJMP    LP_FOREVER

ERROR_CHG
                ; ERROR SWITCH CHANGE SO JUST CLEAR THE GLITCH LED
                SETB    GLITCH_LED
                MOV     SWITCHIMAGE,TB1     ; SAVE NEW IMAGE
                RET                         ; RETURN TO CALLING ROUTINE

MODE_CHG
                LCALL   NEXT_MODE           ; SELECT NEXT MODE AND LED
                MOV     SWITCHIMAGE,TB1     ; SAVE NEW IMAGE
```

```
          SETB   OK_LED
          SETB   STAT0_LED
          SETB   STAT1_LED
          SETB   GLITCH_LED       ; CLEAR THE GLITCH LED HERE
          CLR    LINEUP           ; CLEAR LINE ACTIVATED INDICATION

CLR    IE.7             ; DISABLE INTERRUPTS
          LCALL  INIT_ISAC

POP    ACC              ; POP THE RET OFF THE STACK
          POP    ACC

LJMP   FLASH_MODE       ; GO BACK TO BEGINING A DISPLAY NEW MODE

;******************** RESET AND INIT ISAC REG **************************
INIT_ISAC
          SETB   IS_RESET         ; reset isac LCALL  ZWAIT5           ; Wait for .5 sec @@ ????

CLR    IS_RESET         ; normal

RET

;***********************************************************************
;         CROSS REFERENCE ISAC ERROR INDICATIONS WITH OUR OWN
;
; ISAC      -    OUR              ISAC     -    OUR
;
; NT INDICATIONS                  TE INDICATIONS
; LSL            LOST_SIG         DR       -    DEACT_REQ
; RSYU           LOST_FRM         SD       -    SLIP
; ARU            TE_ACT_REQ       DIS      -    DISCON
; AIU            ACT_IND          EI       -    ERR_IND
; DIU            DEACT_IND        ARD      -    NT_ACT_REQ
;                                 TI       -    TEST_IND
;                                 AI8      -    ACT_IND_8
;                                 AI10     -    ACT_IND_10
;***********************************************************************

; CHECK IF TE OR NT MODE SELECTED

LOOK_UP
          JB     NT_TE_SWT,LOOK_NT
          LJMP   LOOK_TE          ; ELSE DO TE LOOK UP

LOOK_NT
          CJNE   A,#LSL,LOOK1
          MOV    A,#LOST_SIG
          LJMP   LOOK_DONE
LOOK1
          CJNE   A,#RSYU,LOOK2
          MOV    A,#LOST_FRM
          LJMP   LOOK_DONE
LOOK2
          CJNE   A,#ARU,LOOK3
          MOV    A,#TE_ACT_REQ
          LJMP   LOOK_DONE
LOOK3
          CJNE   A,#AIU,LOOK4
          MOV    A,#ACT_IND
          LJMP   LOOK_DONE
LOOK4
          CJNE   A,#DIU,NT_LK_DONE

MOV    A,#DEACT_IND
NT_LK_DONE
          LJMP   LOOK_MISC        ; COULDN'T FIND A MATCH FOR NT

LOOK_TE
          CJNE   A,#DR,LOOK10
          MOV    A,#DEACT_REQ
          LJMP   LOOK_DONE
```

```
LOOK10
        CJNE    A,#SD,LOOK11
        MOV     A,#SLIP
        LJMP    LOOK_DONE
LOOK11
        CJNE    A,#DIS,LOOK12
        MOV     A,#DISCON
        LJMP    LOOK_DONE
LOOK12
        CJNE    A,#EI,LOOK13
        MOV     A,#ERR_IND
        LJMP    LOOK_DONE
LOOK13
        CJNE    A,#ARD,LOOK14
        MOV     A,#NT_ACT_REQ
        LJMP    LOOK_DONE
LOOK14
        CJNE    A,#TI,LOOK15
        MOV     A,#TEST_IND
        LJMP    LOOK_DONE
LOOK15
        CJNE    A,#AI8,LOOK16
        MOV     A,#ACT_IND_8
        LJMP    LOOK_DONE
LOOK16
        CJNE    A,#AI10,LOOK_MISC
        MOV     A,#ACT_IND_10
        LJMP    LOOK_DONE

LOOK_MISC
        MOV     A,#0FH                  ; INDICATE NO MATCH FOUND

LOOK_DONE
        RET

;****************************************************************
;               TE LOOPBACK B CHANNEL SETUP
SETUP_B_TE
        MOV     DPTR,#SPCR              ; POINT TO SPCR REGISTER
        MOV     A,#(B1_IOM_LP + B2_IOM_LP) ; SET B1 AND B2 TO IOM LOOP
        MOVX    @DPTR,A
        RET

;****************************************************************
;
SETUP_B_NT
        MOV     DPTR,#SPCR              ; POINT TO SPCR REGISTER
        MOV     A,#(B1_IOM_LP + B2_IOM_LP + SPM) ; SET B1 AND B2 TO IOM LOOP
        MOVX    @DPTR,A
        RET

;****************************************************************
;               SELECT A NEW MODE WHEN MODE SWITCH IS TOGGLED
;
; WE CALL THIS ROUTINE ONLY WHEN A MODE SWITCH CHANGE IS SENSED

NEXT_MODE

MOV     A,MODE          ; READ CURRENT MODE
        INC     A               ; POINT TO NEXT MODE

CJNE    A,#LAST_MODE+1,SEL_NXT
        MOV     A,#00H          ; WRAP AROUND TO FIRST MODE

SEL_NXT
        MOV     MODE,A          ; SAVE NEW MODE

RET
```

```
;*********************************************************************
;               TURN MODE LED ON
;*********************************************************************
MODELED_ON
        MOV     A,MODE              ; CHECK WHICH MODE WE ARE IN

CJNE    A,#SIM_MODE,NEXT1
        CLR     SIM_LED             ; TURN SIM LED ON
        SETB    MON_LED             ; TURN OFF THE OTHERS
        SETB    LPBK_LED
        SETB    PULSE_LED
NEXT1
        CJNE    A,#MON_MODE,NEXT2
        CLR     MON_LED             ; TURN MONITOR LED ON
        SETB    SIM_LED             ; TURN OFF THE OTHERS
        SETB    LPBK_LED
        SETB    PULSE_LED
NEXT2
        CJNE    A,#LPBK_MODE,NEXT3
        CLR     LPBK_LED            ; TURN LOOP BACK LED ON
        SETB    SIM_LED             ; TURN OFF THE OTHERS
        SETB    PULSE_LED
        SETB    MON_LED
NEXT3
        CJNE    A,#PULSE_MODE,NEXT4
        CLR     PULSE_LED           ; TURN PULSE MODE LED ON
        SETB    SIM_LED             ; TURN OFF THE OTHERS
        SETB    MON_LED
        SETB    LPBK_LED
NEXT4
        RET

;*********************************************************************
;               TURN MODE LED OFF
;*********************************************************************
MODELED_OFF
        MOV     A,MODE

CJNE    A,#SIM_MODE,NXT1
        SETB    SIM_LED
NXT1
        CJNE    A,#MON_MODE,NXT2
        SETB    MON_LED
NXT2
        CJNE    A,#LPBK_MODE,NXT3
        SETB    LPBK_LED
NXT3
        CJNE    A,#PULSE_MODE,NXT4
        SETB    PULSE_LED
NXT4
        RET

;*********************************************************************
;               8031 & ISAC INTERRUPT SETUP
;*********************************************************************
SETUP_INT
        JB      NT_TE_SWT,NT_MON    ; CHECK WHICH DEVICE IS SELECTED
        LCALL   SETUP_B_TE          ; SETUP FOR TE MONITORING
        LJMP    INT_CONT
NT_MON
        LCALL   SETUP_B_NT          ; ELSE SETUP FOR NT MONITORING

INT_CONT
        MOV     DPTR,#MASK          ; POINT TO MASK REGISTER
        MOV     A,#SIN              ; ENABLE ISAC SYNC TRANS REG
        CPL     A
        MOVX    @DPTR,A

; SETUP 8031
        SETB    TCON.0              ; EDGE TRIGGED
        SETB    IE.0                ; ENABLE INT0
        SETB    IE.7
```

```
        MOV     DPTR,#STCR              ; POINT TO  SYNC TRANS REG
        MOV     A,#ST0                  ; SYNC TRANS 1 (MIDDLE OF FRAME)
        MOVX    @DPTR,A

RET

.END

.TITLE "ISDN BASIC BATE INTERFACE SUBROUTINES "

;********************************************************************

;********************************************************************
;               ISAC   INTERRUPT SERVICE
;********************************************************************
SERV_ISAC

CLR     IE.7

PUSH    ACC
        PUSH    B
        PUSH    DPH
        PUSH    DPL
        PUSH    PSW

MOV     PSW,#08                 ; SELECT BANK 1

MOV     DPTR,#STCR              ; ACKNOWLEDGE INTERRUPT
        MOV     A,#SC0
        MOVX    @DPTR,A

;;      MOV     DPTR,#IRRXMSG           ; DISPLAY INTERRUPT RX  MSG
;;      LCALL   SMSG

;;      MOV     DPTR,#ISTAMSG           ; DISPLAY INTERRUPT STATUS REG
;;      LCALL   SMSG
;;      MOV     DPTR,#ISTA
;;      LCALL   DISP_REG

MOV     DPTR,#ISTA              ; READ INTERRUPT REGISTER
        MOVX    A,@DPTR

; DON'T BOTHER TO  GO ANY FURTHER IF THE LINE HAS DROPPED
        JB      LINEUP,RD_DATA          ; IF SET GO AHEAD
        LJMP    INT_EXIT                ; JUST EXIT

RD_DATA
;               ; READ AND DISPLAY B1 & B2 DATA
        MOV     DPTR,#BXC2              ; READ AND SAVE B2 DATA
        MOVX    A,@DPTR
        MOV     B,A                     ; PUT IT IN B FOR NOW

MOV     DPTR,#BXC1              ; READ AND SAVE B1 DATA
        MOVX    A,@DPTR

;       MOV     DPTR,#TIMR
;       MOVX    @DPTR,A                 ; SAVE IT IN A TIMER REGISTER

; DISPLAY B1 DATA HERE FOR NOW
;       PUSH    A
;       MOV     DPTR,#B1MSG
;       LCALL   SMSG
;       MOV     DPTR,#TIMR
;       LCALL   DISP_REG
;       POP     A

CJNE    A,B1_HIS,B1_LED_ON      ; CHECK IF DIFFERENT THAN BEFORE
        LJMP    B1_LED_OFF              ; ELSE TURN OFF B1 LED
```

```
CHECK_B2
        ; RESTORE AND DISPLAY B2 DATA
        MOV     A,B                      ; PUT DATA SAVED IN B IN ACC
        CJNE    A,B2_HIS,B2_LED_ON       ; CHECK IF DIFFERENT THAN BEFORE
        LJMP    B2_LED_OFF               ; ELSE TURN OFF B2 LED

B1_LED_ON
        MOV     B1_CNT,#B1_CNT_MAX       ; RELOAD OFF DELAY COUNT
        CLR     STAT0_LED                ; TURN IT ON  @@
        MOV     B1_HIS,A                 ; SAVE NEW DATA FOR COMPARE

LJMP    CHECK_B2                 ; ACT ON B2 DATA ALSO

B2_LED_ON
        MOV     B2_CNT,#B2_CNT_MAX       ; RELOAD OFF DELAY COUNT
        CLR     STAT1_LED                ; TURN IT ON  @@
        MOV     B2_HIS,A                 ; SAVE NEW DATA FOR COMPARE
        LJMP    INT_EXIT

B1_LED_OFF
        ; COUNT UP XXX INTERRUPTS BEFORE TURN IT OFF (125us*8)*100 =100ms
;       MOV     A,B1_CNT                 ; LOAD UP PRESENT COUNT
;       DEC     A
;       MOV     B1_CNT,A                 ; SAVE NEW COUNT
;       CJNE    A,#00,CHECK_B2           ; IS IT TIME TO TURN IT OFF

DJNZ    B1_CNT,CHECK_B2          ; IS IT TIME TO TURN IT OFF

SETB    STAT0_LED                ; TURN IT OFF @@
        MOV     B1_CNT,#B1_CNT_MAX       ; RESTORE COUNTER
        LJMP    CHECK_B2                 ; ACT ON B2 DATA ALSO

B2_LED_OFF
        ;COUNT UP 800 INTERRUPTS
;       MOV     A,B2_CNT                 ; LOAD UP PRESESENT COUNT
;       DEC     A
;       MOV     B2_CNT,A                 ; SAVE NEW COUNT
;       CJNE    A,#00,INT_EXIT           ; IS IT TIME TO TURN IT OFF

DJNZ    B2_CNT,INT_EXIT          ; IS IT TIME TO TURN IT OFF
        SETB    STAT1_LED                ; TURN IT OFF @@
        MOV     B2_CNT,#B2_CNT_MAX       ; RESTORE COUNTER
        LJMP    INT_EXIT

INT_EXIT
        MOV     DPTR,#STCR               ; REENABLE INTERRUPT
        MOV     A,#ST0
        MOVX    @DPTR,A

POP     PSW
        POP     DPL
        POP     DPH
        POP     B
        POP     ACC

SETB    IE.7

RET

.END

;**********************************************************************
;               SETUP BAUD RATE SUBROUTINE
;
;**********************************************************************

BAUDRATE
        CLR     SCON.1                   ; CLEAR INTERRUPTS FLAGS
        CLR     SCON.0
        CLR     IE.4                     ; DISABLE INTERNAL UARRT INTERRUPTS
```

```
            MOV     SCON,#42H       ; SETUP UART FOR 1 STOP AND START BIT)
                                    ; MODE 1 AND 8 DATA BITS
            MOV     TMOD,#21H       ; SET TIMER 1 TO AUTO/MODE 2
            CLR     TCON.4          ; DISABLE TIMER  0 ALSO

MOV     TH1,#0F4H       ; LOAD T1
            MOV     TL1,#00H        ; 2400 BAUD

SETB    TR1             ; LET IT FLY

MOV     A,#50H          ; LET IT SETTLE BFORE WE USE IT

WAIT4BAUD
            DEC     A
            CJNE    A,#00H,WAIT4BAUD

RET

;****************************************************************
;                 TX CHAR OUT SUBROUTINE
;
;    THIS PROCEDURE TX THE CHAR PASSED TO IT IN ACC.
;****************************************************************
SOUT
            JNB     TXI,$           ; WAIT FOR TX TO FINISH
            CLR     TXI             ; CLEAR TX INTERRUPT BIT
            MOV     SBUF,A          ; LOAD TX BUFFER
            JNB     TXI,$           ; WAIT FOR TX TO FINISH

RET

;****************************************************************
;                 SEND MESSAGE TO RS232 PORT ROUTINE
;
;****************************************************************
SMSG
            CLR     A               ; CLEAR MESSAGE POINTER
            MOVC    A,@A+DPTR       ; GET CHARACTER

CJNE    A,#0FFH,SENDIT  ; CHECK IF DONE
            INC     DPTR            ; POINT TO NEXT CHAR ON EXIT

RET                     ; DONE

SENDIT
            LCALL   SOUT            ; WRITE TX BUFFER
            INC     DPTR            ; POINT TO NEXT CHAR
            LJMP    SMSG            ; DO IT AGAIN

;****************************************************************
;                 HEX TO ASCII ROUTINE
;
; ON ENTRY:
;        R4 - # OF BYTES TO CONVERT
;        @R1 - POINTER TO BYTES THAT ARE TO BE CONVERTED
;
;****************************************************************
SDHEX
            MOV     R3,04H          ; SAVE BYTE COUNT
CONV
            MOV     A,@R1           ; GET THE BYTE
            SWAP    A               ; GET UPPER FOUR NIBBLES FIRST
            ANL     A,#0FH          ; MASK OUT

ADD     A,#13H          ; ADJUST FOR OFFSET TO HEX TABLE
            MOVC    A,@A+PC         ; POINT TO ASCII CODE FOR THIS NIBBLE

LCALL   SOUT            ; SEND IT OUT FIRST NIBBLE

MOV     A,@R1           ; GET THE BYTE AGAIN
            ANL     A,#0FH          ; MASK BITS
            ADD     A,#0AH          ; ALLOW OFFFSET
            MOVC    A,@A+PC         ; POINT TO ASCII CODE
```

```
            LCALL     SOUT            ; SEND IT OUT SECOND NIBBLE

INC       R1              ; POINT TO NEXT BYTE TO CONVERT
            DJNZ      R4,CONV         ; CHECK IF ALL BYTES ARE CONVERTED
            MOV       R4,03H          ; RESTORE BYTE COUNT
            RET

ASCTBL
            .TEXT     '0123456789ABCDEF'

;***********************************************************************
;                    DISPLAY ISAC REGISTER ROUTINE
;  ON ENTRY:
;           DPTR - POINT TO REGISTER TO BE DISPLAYED
;***********************************************************************
DISP_REG
            MOVX      A,@DPTR         ; READ IN DATA
            MOV       TB2,A           ; PUT IT IN A TEMP REGISTER
            MOV       R1,#TB2         ; LOAD R1 WITH LOCATION

MOV       R4,#01H         ; LOAD BYTE COUNT
            LCALL     SDHEX

RET

;***********************************************************************

ACTMSG    .TEXT     "THE LINE IS ACTIVATED\n\r"
          .BYTE     0FFH
INTMSG    .TEXT     "\n\r INTERRUPT STATUS REG = "
          .BYTE     0FFH
TIMMSG    .TEXT     "\n\r TIMER REG = "
          .BYTE     0FFH
CIRRMSG   .TEXT     "\n\r RX CONTROL REG = "
          .BYTE     0FFH
MONMSG    .TEXT     "\n\r MONITOR MODE ENTERED "
          .BYTE     0FFH
WAITMSG   .TEXT     "\n\r WAITING FOR SPCR "
          .BYTE     0FFH
ISTAMSG   .TEXT     "\n\r INTERRUPT STATUS REG = "
          .BYTE     0FFH
IRRXMSG   .TEXT     "\n\r Interrupt Sensed !!!! "
          .BYTE     0FFH
B1MSG     .TEXT     "\n\r B1 Rx Data ="
          .BYTE     0FFH
B2MSG     .TEXT     "\n\r B2 rX Data ="
          .BYTE     0FFH
MODEMSG   .TEXT     "\n\r MODE = "
          .BYTE     0FFH
B1NEMSG   .TEXT     "  B1 DATA CHANGED !"
          .BYTE     0FFH
B2NEMSG   .TEXT     "  B2 DATA CHANGED !"
          .BYTE     0FFH
B1OFF     .TEXT     "\n\r B1 LED OFF"
          .BYTE     0FFH
B2OFF     .TEXT     "\n\r B2 LED OFF"
          .BYTE     0FFH ; 8051 Equates P0     .EQU   80H    ; PORT 0
SP     .EQU   81H    ; STACK POINTER
DPL    .EQU   82H
DPH    .EQU   83H
PCON   .EQU   87H
TCON   .EQU   88H
TMOD   .EQU   89H
TL0    .EQU   8AH
TL1    .EQU   8BH
TH0    .EQU   8CH
TH1    .EQU   8DH
P1     .EQU   90H    ; PORT 1
SCON   .EQU   98H
```

```
SBUF      .EQU    99H
P2        .EQU    0A0H        ; PORT 2
IEC       .EQU    0B8H
P3        .EQU    0B0H        ; PORT 3
IPC       .EQU    0B8H
PSW       .EQU    0D0H
ACC       .EQU    0E0H
A         .EQU    ACC
B         .EQU    0F0H

; Interrupt Equates
IE.0      .EQU    0A8H
IE.1      .EQU    0A9H
IE.2      .EQU    0AAH
IE.3      .EQU    0ABH
IE.4      .EQU    0ACH
IE.5      .EQU    0ADH
IE.6      .EQU    0AEH
IE.7      .EQU    0AFH
EA        .EQU    IE.7

; BIT EQUATES

P0.0      .EQU    80H         ; PORT 0 BIT 0
P0.1      .EQU    81H         ;
P0.2      .EQU    82H
P0.3      .EQU    83H
P0.4      .EQU    84H
P0.5      .EQU    85H
P0.6      .EQU    86H
P0.7      .EQU    87H

P1.0      .EQU    90H
P1.1      .EQU    91H
P1.2      .EQU    92H
P1.3      .EQU    93H
P1.4      .EQU    94H
P1.5      .EQU    95H
P1.6      .EQU    96H
P1.7      .EQU    97H

P2.0      .EQU    0A0H
P2.1      .EQU    0A1H
P2.2      .EQU    0A2H
P2.3      .EQU    0A3H
P2.4      .EQU    0A4H
P2.5      .EQU    0A5H
P2.6      .EQU    0A6H
P2.7      .EQU    0A7H

P3.0      .EQU    0B0H
P3.1      .EQU    0B1H
P3.2      .EQU    0B2H
P3.3      .EQU    0B3H
P3.4      .EQU    0B4H
P3.5      .EQU    0B5H
P3.6      .EQU    0B6H
P3.7      .EQU    0B7H

; REGISTER DEFINATIONS
R0        .EQU    00H
R1        .EQU    01H
R2        .EQU    02H
R3        .EQU    03H
R4        .EQU    04H
R5        .EQU    05H
R6        .EQU    06H
R7        .EQU    07H

; SCON bit equates
SCON.0    .EQU    098H
SCON.1    .EQU    099H
TXI       .EQU    SCON.1
```

```
;TCON BIT EQUATES
TCON.0    .EQU    088H
TCON.1    .EQU    089H
TCON.2    .EQU    08AH
TCON.3    .EQU    08BH
TCON.4    .EQU    08CH
TCON.5    .EQU    08DH
TCON.6    .EQU    08EH
TR1       .EQU    TCON.6

;****************************************************************
;     2085 ISDN SUBSCRIBER ACCESS CONTROLLER (ISAC-S) EQUATES
;****************************************************************

ISACBASE     .EQU    8000H            ; BASE ADDRESS

;               2085 Read Only Registers

RFIFO        .Equ    ISACBASE + 00h   ; D Channel Receive Fifo (00 - 1Fh)
ISTA         .Equ    ISACBASE + 20h   ; Interrupt Status Register
RME   .Equ   10000000B                ; Rx Message End bit
RPF   .Equ   01000000b                ; Rx Pool Full bit
RSC   .Equ   00100000b                ; Rx Status change
XPR   .Equ   00010000b                ; Tx Pool Ready
TIN   .Equ   00001000b                ; Timer Interrupt status bit
CIC   .Equ   00000100b                ; C/I Code Change
SIN   .EQU   00000010B                ; SYNC TRANS INDICATION BIT
EXI   .Equ   00000001b                ; Extended Interrupt MASK         .EQU    ISTA             ; INTERUPT MASK REGISTER
STAR         .Equ    ISACBASE + 21h   ; Status Register
EXIR         .Equ    ISACBASE + 24h   ; Extended Interrupt Register
RFBC         .Equ    ISACBASE + 25h   ; Receive Frame Byte Counter
RSTA         .Equ    ISACBASE + 27h   ; Receive Status Register
RDA   .Equ   10000000b                ; Data Rx in FIFO
RDO   .Equ   01000000b                ; Rx Data Overflow
CRC   .Equ   00100000b                ; CRC check OK
RAB   .Equ   00010000b                ; Rx message aborted RHCR         .Equ    ISACBASE + 29h   ; Receive HDLC Control Register
CIRR         .Equ    ISACBASE + 31h   ; Control/Indicate Receive Register ; TE INDICATIONS
PU    .Equ   07h                      ; IOM clocking provided indicator
DR    .EQU   00H                      ; DEACTIVATION REQUEST BY S
SD    .EQU   02H                      ; SLIP DETECTED
DIS   .EQU   04H                      ; DISCONNECTED
RSY   .EQU   04H                      ; SIGNAL RECEIVED
EI    .EQU   06H                      ; ERROR INDICATION
NTRDY .Equ   04h                      ; Level received
ARD   .Equ   08h                      ; Info 2 received
TI    .EQU   0AH                      ; TEST LOOP 3 OR CONTINUES ZEROS TX
AI8   .Equ   0Ch                      ; Info 4 received, priority 8
AI10  .Equ   0Dh                      ; Info 4 received, priority 10
DID   .Equ   0Fh                      ; Deactive indication ; NT INDICATIONS
LSL   .EQU   01H                      ; NO RX SIGNAL
RSYU  .EQU   04H                      ; LOST FRAMING
ARU   .EQU   08H                      ; INFO 1 RECEIVED
AIU   .EQU   0CH                      ; ACTIVATED INDICATION
DIU   .EQU   0FH                      ; DEACTIVATION INDICATION CODRMASK  .Equ   0Fh                  ; Receive code mask SSGR         .Equ    ISACBASE + 33h   ; SLD Signalling Register Receive
BCR1         .Equ    ISACBASE + 37h   ; B1-Channel Receive Register
BCR2         .Equ    ISACBASE + 38h   ; B2-Channel Receive Register ;             2085 Write Only Registers XFIFO        .Equ    ISACBASE + 00h   ; D Channel Transmit FIFO (00 - 1Fh)
```

```
IntMask      .Equ     ISACBASE + 20h   ; Interrupt Mask Register
TimMask .Equ     00001000b        ; Timer Mask bit
CMDR         .Equ     ISACBASE + 21h   ; Command Register
RMC     .Equ     10000000b        ; Rx message complete
RHR     .Equ     01000000b        ; Reset HDLC Receiver
RNR     .Equ     00100000b        ; Receiver not ready
StrTim  .Equ     00010000b        ; Start Timer Bit
XTF     .Equ     00001000b        ; Tx Transparrent frame
XIF     .Equ     00000100b        ; Tx I Frame
XME     .Equ     00000010b        ; Tx message End
XRES    .Equ     00000001b        ; Tx Reset XAD1         .Equ     ISACBASE + 24h   ; Transmit Address 1
XAD2         .Equ     ISACBASE + 25h   ; Transmit Address 2
SAP1         .Equ     ISACBASE + 26h   ; SAPI Address Register 1
SAP2         .Equ     ISACBASE + 27h   ; SAPI Address Register 2
TEI2         .Equ     ISACBASE + 29h   ; TEI Register Address 2
CIXR         .Equ     ISACBASE + 31h   ; Control/Indicate Transmit Register
TBC     .Equ     01000000b        ; Tx C/I bit
AR8     .Equ     08h              ; Activate request, priority 8
AR10    .Equ     09h              ; Activate request, priority 10
AI      .EQU     0CH              ; SEND INFO 4

SSGX         .Equ     ISACBASE + 33h   ; SLD Signalling Register Transmit

STCR         .Equ     ISACBASE + 37h   ; Synchron Transfer Control Register
ST1     .EQU     00001000b        ; SYNC TRANSFER MODE 1
ST0     .EQU     00000100b        ; SYNC TRANSFER MODE 0
SC1     .EQU     00000010b        ; SYNC TRANS COMPLETE
SC0     .EQU     00000001b        ; SYNC TRANS COMPLETE ADFR         .Equ     ISACBASE + 38h   ; Additional Feature Register ;            2085 Read/Write Registers MODE         .Equ     ISACBASE + 22h   ; Mode Register
ExtTran .Equ     11000000b        ; Extended Transparent Mode selected
ADM     .Equ     00100000b        ; Extended Mode 1
THD     .Equ     00010000b        ; External Timing
RAC     .Equ     00001000b        ; Rx active
HDLCMode .Equ    00000111b        ; Interface Mode = HDLC TIMR         .Equ     ISACBASE + 23h   ; Timer Register
TEI1         .Equ     ISACBASE + 28h   ; TEI Register 1
SPCR         .Equ     ISACBASE + 30h   ; Serial Port Control Register
MONR         .Equ     ISACBASE + 32h   ; Monitor Register
SFCR         .Equ     ISACBASE + 34h   ; Signalling Feature Control Register
SPM    .Equ 20H  ; Serial Port Timing Mode
SPU     .Equ     80h              ; Software Power Up bit set
CSPU    .Equ     00h              ; Clear Power up bit
B2_IOM_LP .EQU   03H              ; B2 IOM LOOP MODE
B1_IOM_LP .EQU   0CH              ; B1 IOM LOOP MODE BXC1         .Equ     ISACBASE + 35h   ; B1-Channel Transmit Register
BXC2         .Equ     ISACBASE + 36h   ; B2-Channel Transmit Register ;************************************************************************
;                 ISAC/BRITE INDICATION CODES
;************************************************************************

; NT MODE INDICATIONS
LOST_SIG        .EQU     01H     ; NT LOST RX SIGNAL  (0001)
LOST_FRM        .EQU     02H     ; NT LOST FRAMING (0100)
ACT_IND         .EQU     03H     ; ACT INDICATION [SYNCHRONOUS RECEIVER]  (1100)
DEACT_IND       .EQU     04H     ; DEACTIVATION INDICATION (1111)
TE_ACT_REQ      .EQU     05H     ; INFO 1 ACTIVATION REQUEST (1000)

; TE MODE INDICATIONS
DISCON          .EQU     LOST_SIG ; DISCONNECTED (0100)
DEACT_REQ       .EQU     06H     ; DEACTIVATE REQUEST BY S (0000)
SLIP            .EQU     07H     ; SLIP DETECTED (0010)
NT_ACT_REQ      .EQU     08H     ; INFO 2 ACTIVATION REQUEST (1000)
ACT_IND_8       .EQU     09H     ; INFO 4 ACTIVATION INDICATION PRIORTY 8 (1100)
ACT_IND_10      .EQU     0AH     ; INFO 4 ACTIVATION INDICATION PRIORTY 10 (1101)
```

```
TEST_IND         .EQU     0BH        ; TEST INDICATION (1010)
ERR_IND          .EQU     0CH        ; ERROR INDICATION (0110)
.TITLE "ISDN BASIC BATE INTERFACE EQUATES "

.EJECT
;************************ LED INDICATORS ****************************
****

OK_LED           .Equ P1.0   ; LINE ACTIVATED OK LED
GLITCH_LED       .Equ P1.1   ; LINE GLITCH DETECTED
STAT0_LED        .Equ P1.2   ; LINE STATUS LED 0
STAT1_LED        .Equ P1.3   ; LINE STATUS LED 1
SIM_LED          .EQU P3.3   ; SIMULATE MODE LED
PULSE_LED        .EQU P3.4   ; PULSE MODE LED
LPBK_LED         .EQU P3.5   ; LOOPBACK MODE LED
MON_LED          .EQU P3.0   ; MONITOR MODE LED

;*************************** CONTROL PORTS ****************************

IS_RESET         .Equ P1.4   ; ISAC RESET
RELAY            .EQU P3.1   ; RELAY CONTROL

;*************************** MODE SWITCH SELECTORS ********************
*

P_N_SWT          .Equ P1.5   ; PULSE / NORMAL SWITCH SELECT INPUT
M_A_SWT          .Equ P1.6   ; MONITOR / ACTIVATE SWITCH SELECT INPUT
NT_TE_SWT        .Equ P1.7   ; NT / TE SWITCH SELECT INPUT

;*************************** INTERRUPT INPUTS *************************

IS_INT           .Equ P3.2   ; ISAC INTERRUPT (INT0)

.EJECT
; *************************** FLAGS ***********************************

TESEL            .equ 00     ; TE SEL INDICATION FLAG
NTSEL            .equ 01     ; NT SEL INDICATION FLAG
TIMEOUT          .equ 02     ; TIME OUT INDICATOR
LOOPONTST        .equ 03     ; LOOP ON TEST BIT INDICATOR
MODESELECTED     .equ 04     ; INDICATE THAT TE OR NT MODE HAS BEEN SELECTED
LINEUP           .equ 05     ; (1) LINE ACTIVATED ; ************************* GENERAL EQUATES ***********************
LEDOFF           .EQU     0FFH           ; TURN LEDS OFF - ACTIVE LOW
LEDON            .EQU     00H            ; TURN LEDS ON  - ACTIVE HIGH CLRSTAT          .EQU     00H            ; CLEAR LED PATTERN
INFO1            .EQU     01H            ; INFO 1 PATTERN
INFO2            .EQU     02H            ; INFO 2 PATTERN
INFO3            .EQU     03H            ; INFO 3 PATTERN
INFO4            .EQU     00H            ; INFO 4 PATTERN B1_CNT_MAX       .EQU     0A0H           ; INTERRUPT MAX COUNT
B2_CNT_MAX       .EQU     B1_CNT_MAX SWITCHIMAGE      .EQU     23H            ; SWITCH IMAGE STORAGE
FLASHCODE        .EQU     24H            ; FLASH CODE STORAGE
STATHIS          .EQU     25H            ; STATUS HISTORY STORAGE
TB1              .EQU     26H            ; TEMP STORAGE
TB2              .EQU     27H            ; TEMP STORAGE
TB3              .EQU     28H            ; TEMP STORAGE MODE             .EQU     29H            ; MODE SWITCH STORAGE
SIM_MODE         .EQU     00H            ; SIMULATION MODE
MON_MODE         .EQU     03H            ; MONITOR MODE
LPBK_MODE        .EQU     01H            ; LOOPBACK MODE
PULSE_MODE       .EQU     02H            ; PULSE MODE
LAST_MODE        .EQU     MON_MODE
B1_CNT           .EQU     2AH            ; B1 INTERRUPT COUNT
B2_CNT           .EQU     2BH            ; B2 INTERRUPT COUNT
B1_HIS           .EQU     2CH            ; B1 DATA STORAGE
B2_HIS           .EQU     2DH            ; B2 DATA STORAGE
.END
```

What is claimed is:

1. An Integrated Services Digital Network (ISDN) test device comprising:
   (a) connector means for connecting the ISDN test device to an ISDN network, said connector means comprising eight pins characterized as Pins 1–8, wherein Pins 1 and 2 comprise a Pair A, Pins 3 and 6 comprise a Pair B, Pins 4 and 5 comprise a Pair C, and Pins 7 and 8 comprise a Pair D;
   (b) device emulation means connected to said connector means for causing the test device, on command, to emulate either a Terminal Equipment (TE) device or a Network's Termination (NT) device; and
   (c) emulation command means connected to said device emulation means for enabling a user to command the test device to emulate either a TE device or an NT device;
   whereby (1) when said test device is properly connected to a working NT device through said connector means and said test device is commanded to emulate a TE device through said emulation command means, said device emulation means will cause said test device to achieve line activation with said NT device, and (2) when said test device is properly connected to a working TE device through said connector means and said test device is commanded to emulate an NT device through said emulation command means, said device emulation means will cause said test device to achieve line activation with said TE device;
   wherein said test device further comprises switching means interposed between said connector means and said device emulation means for selectively switching the signals, on command, between (1Pair B and Pair C, and/or between (2) Pin 3 and Pin 6, and/or between Pin 4 and Pin 5.

2. A test device according to claim 1 wherein said test device further comprises indication means for indicating if line activation has occurred.

3. An Integrated Services Digital Network (ISDN) test device comprising:
   (a) connector means for connecting the ISDN test device to an ISDN network, said connector means comprising eight pins characterized as Pins 1–8 wherein Pins 1 and 2 comprise a Pair A, Pins 3 and 6 comprises a Pair B, Pins 4 and 5 comprise a Pair C, and Pins 7 and 8 comprise a Pair D;
   (b) device emulation means connected to said connector means for causing the test device, on command, to emulate either a Terminal Equipment (TE) device or a Network Termination (NT) device; and
   (c) emulation command means connected to said device emulation means for enabling a user to command the test device to emulate either a TE device or an NT device;
   whereby (1) when said test device is properly connected to a working NT device through said connector means and said test device is commanded to emulate a TE device through said emulation command means, said device emulation means will cause said test device to achieve line activation with said NT device, and (2) when said test device is properly connected to a working TE device through said connector means and said test device is commanded to emulate an NT device through said emulation command means, said device emulation means will cause said test device to achieve line activation with said TE device;
   wherein said test device further comprises:
   pulse activation means connected to said device emulation means for causing said test device, on command, to automatically terminate line activation a predetermined period of time after line activation is achieved and to thereafter reestablish line activation a predetermined period of time after line activation is terminated, and to repeat the foregoing procedure over and over again; and
   pulse activation command means connected to said pulse activation means for enabling a user to activate said pulse activation means.

4. A test device according to claim 3 wherein said test device further comprises indication means for indicating if line activation has occurred.

5. An Integrated Services Digital Network (ISDN) test device comprising:
   (a) connector means for connecting the ISDN test device to an ISDN network, said connector means comprising eight pins characterized as Pins 1–8, wherein Pins 1 and 2 comprise a pair A, Pins 3 and 6 comprise a Pair B, Pins 4 and 5 comprise a pair C, and Pins 7 and 8 comprise a Pair D;
   (b) device emulation means connected to said connector means for causing the test device, on command, to emulate either a Terminal Equipment (TE) device or a Network Termination (NT) device; and
   (c) emulation command means connected to said device emulation means for enabling a user to command the test device to emulate either a TE device or an NT device;
   whereby (1) when said test device is properly connected to a working NT device through said connector means and said test device is commanded to emulate a TE device through said emulation command means, said device emulation means will cause said test device to achieve line activation with said NT device, and (2) when said test device is properly connected to a working TE device through said connector means and said test device is commanded to emulate an NT device through said emulation command means, said device emulation means will cause said test device to achieve line activation with said TE device;
   wherein said test device further comprises:
   switching means interposed between said connector means and said device emulation means for selectively switching the signals, on command, between (1) Pair B and Pair C, and/or between (2) Pin 3 and Pin 6, and/or between Pin 4 and Pin 5;
   pulse activation means connected to said device emulation means for causing said test device, on command, to automatically terminate line activation a predetermined period of time after line activation is achieved and to thereafter reestablish line activation a predetermined period of time after line activation is terminated, and to repeat the foregoing procedure over and over again; and
   pulse activation command means connected to said pulse activation means for enabling a user to activate said pulse activation means.

6. A test device according to claim 5 wherein said test device further comprises indication means for indicating if line activation has occurred.

7. A method for testing an Integrated Services Digital Network (ISDN), said method comprising:

(1) providing an ISDN test device comprising:
  (a) connector means for connecting said ISDN test device to an ISDN network, said connector means comprising eight pins characterized as Pins 1-8, wherein Pins 1 and 2 comprise a Pair A, Pins 3 and 6 comprise a Pair B, Pins 4 and 5 comprise a Pair C, and Pins 7 and 8 comprise a Pair D;
  (b) device emulation means connected to said connector means for causing the test device, on command, to emulate either a Terminal Equipment (TE) device or a Network Termination (NT) device; and
  (c) emulation command means connected to said device emulation means for enabling a user to command the test device to emulate either a TE device or an NT device;
  whereby (1) when said test device is properly connected to a working NT device through said connector means and said test device is commanded to emulate a TE device through said emulation command means, said device emulation means will cause said test device to achieve line activation with said NT device, and (2) when said test device is properly connected to a working TE device through said connector means and said test device is commanded to emulate an NT device through said emulation command means, said device emulation means will cause said test device to achieve line activation with said TE device;
  wherein said test device further comprises switching means interposed between said connector means and said device emulation means for selectively switching the signals, on command, between (1) Pair B and Pair C, and/or between (2) Pin 3 and Pin 6, and/or between Pin 4 and Pin 5;
(2) connecting said ISDN test device to an ISDN network through said connector means;
(3) commanding said ISDN test device to emulate a TE device through said emulation command means when said test device is connected to an NT device, or commanding said ISDN test device to emulate an NT device through said emulation command means when said test device is connected to a TE device;
(4) commanding said ISDN test device through said device emulation means to attempt to achieve line activation with said NT device if said ISDN test device is connected to an NT device, or to attempt to achieve line activation with said TE device if said ISDN test device is connected to a TE device; and
(5) if line activation is not achieved, commanding said ISDN test device through said switching means to selectively switch the signals between (1) Pair B and Pair C, and/or between (2) Pin 3 and Pin 6, and/or between Pin 4 and Pin 5, so as to attempt to achieve line activation.

8. A method for testing an Integrated Services Digital Network (ISDN), said method comprising:
(1) providing an ISDN test device comprising:
  (a) connector means for connecting the ISDN test device to an ISDN network, said connector means comprising eight pins characterized as Pins 1-8 wherein Pins 1 and 2 comprise a Pair A, Pins 3 and 6 comprise a Pair B, Pins 4 and 5 comprise a Pair C, and Pins 7 and 8 comprise a Pair D;
  (b) device emulation means connected to said connector means for causing the test device, on command, to emulate either a Terminal Equipment (TE) device or a Network Termination (NT) device; and
  (c) emulation command means connected to said device emulation means for enabling a user to command the test device to emulate either a TE device or an NT device;
  whereby (1) when said test device is properly connected to a working N device through said connector means and said test device is commanded to emulate a TE device through said emulation command means, said device emulation means will cause said test device to achieve line activation with said NT device, and (2) when said test device is properly connected to a working TE device through said connector means and said test device is commanded to emulate an NT device through said emulation command means, said device emulation means will cause said test device to achieve line activation with said TE device;
  wherein said test device further comprises:
  pulses activation means connected to said device emulation means for causing said test device, on command, to automatically terminate line activation a predetermined period of time after line activation is achieved and to thereafter reestablish line activation a predetermined period of time after line activation is terminated, and to repeat the foregoing procedure over and over again; and
  pulse activation command means connected to said pulse activation means for enabling a user to activate said pulse activation means;
(2) commanding said ISDN test device to emulate a TE device through said emulation command means when said test device is to be connected to a NT device, or commanding said ISDN test device to emulate an NT device through said emulation command means when said test device is to be connected to a TE device, and
commanding said ISDN test device to activate said pulse activation means through said pulse activation command means;
(3) connecting said ISDN test device to an ISDN network through said connector means so that said ISDN test device will successively establish line activation, terminate line activation a predetermined period of time after line activation is achieved, and reestablish line activation a predetermined period of time after line activation is terminated, and to repeat the foregoing procedure over and over again.

* * * * *

UNITED STATES PATENT AND TRADEMARK OFFICE
CERTIFICATE OF CORRECTION

PATENT NO. : 5,157,665

DATED : October 20, 1992

INVENTOR(S) : Mostafa Fakhraie-Fard et al.

It is certified that error appears in the above-identified patent and that said Letters Patent is hereby corrected as shown below:

Claim 1, column 79, line 13, the word "Network's" should be -- Network --;

Claim 1, column 79, line 34, the term "(1 Pair" should be -- (1) Pair --; and

Claim 8, column 82, line 18, the term "N" should be -- NT --.

Signed and Sealed this

Twenty-eighth Day of September, 1993

Attest:

BRUCE LEHMAN

*Attesting Officer*        *Commissioner of Patents and Trademarks*